(12) United States Patent
Lipowski et al.

(10) Patent No.: US 10,721,779 B2
(45) Date of Patent: Jul. 21, 2020

(54) AGGREGATION NODE FOR WIRELESS ACCESS NETWORK UTILIZING HYBRID BEAMFORMING

(71) Applicant: Starry, Inc., Boston, MA (US)

(72) Inventors: Joseph Thaddeus Lipowski, Norwell, MA (US); Chaitanya Kanojia, West Newton, MA (US); Nicholas John Kalita, Jamaica Plain, MA (US); Joseph Anthony Kaiser, Jr., Hopkinton, MA (US); Daniel Tracy Pond, Boston, MA (US)

(73) Assignee: Starry, Inc., Boston, MA (US)

( * ) Notice: Subject to any disclaimer, the term of this patent is extended or adjusted under 35 U.S.C. 154(b) by 0 days.

(21) Appl. No.: 15/418,278

(22) Filed: Jan. 27, 2017

(65) Prior Publication Data
US 2017/0214448 A1 Jul. 27, 2017

Related U.S. Application Data

(60) Provisional application No. 62/287,605, filed on Jan. 27, 2016.

(51) Int. Cl.
*H04B 7/06* (2006.01)
*H04W 16/28* (2009.01)
(Continued)

(52) U.S. Cl.
CPC .......... *H04W 76/10* (2018.02); *H04B 1/0057* (2013.01); *H04B 7/04* (2013.01); *H04B 7/0452* (2013.01); *H04B 7/0617* (2013.01); *H04B 7/0682* (2013.01); *H04L 41/12* (2013.01); *H04W 16/28* (2013.01); *H04W 24/04* (2013.01); *H04W 72/046* (2013.01);
(Continued)

(58) Field of Classification Search
CPC .. H04B 7/0617; H04B 7/0652; H04B 7/0452; H04B 7/04; H04B 1/0057; H04W 16/28; H04W 84/12; H04W 76/10; H04W 72/0453; H04W 72/046; H04W 88/08; H04W 24/04; H04W 88/10; H04L 41/12
USPC ......................................................... 370/338
See application file for complete search history.

(56) References Cited

U.S. PATENT DOCUMENTS 4,199,723 A * 4/1980 Cummings ............. H03C 1/02
332/155
5,359,337 A 10/1994 Eguchi
(Continued)

FOREIGN PATENT DOCUMENTS

WO 03/017591 A1 2/2003

OTHER PUBLICATIONS

Abbaspour-Tamijani, A., "An Affordable Millimeter-Wave Beam-Steerable Antenna Using Interleaved Planar Subarray," IEEE Transactions on Antennas and Propagation, vol. 51, No. 9, pp. 2193-2202, Sep. 2003. Ten pages.

(Continued)

*Primary Examiner* — Faisal Choudhury
(74) *Attorney, Agent, or Firm* — HoustonHogle LLP

(57) ABSTRACT

A high frequency data network access system leverages commodity WiFi chipsets and specifically multi spatial stream (e.g., 802.11 ac) chipsets in combination with phased array antenna systems at the aggregation nodes. Examples can be very spectrally efficient with both polarization and frequency diversity.

11 Claims, 50 Drawing Sheets

(51) Int. Cl.
*H04W 76/10* (2018.01)
*H04B 7/0452* (2017.01)
*H04B 7/04* (2017.01)
*H04L 12/24* (2006.01)
*H04W 72/04* (2009.01)
*H04W 88/08* (2009.01)
*H04B 1/00* (2006.01)
*H04W 24/04* (2009.01)
*H04W 84/12* (2009.01)
*H04W 88/10* (2009.01)

(52) U.S. Cl.
CPC ....... *H04W 72/0453* (2013.01); *H04W 88/08* (2013.01); *H04W 84/12* (2013.01); *H04W 88/10* (2013.01)

(56) References Cited

U.S. PATENT DOCUMENTS

| | | | |
|---|---|---|---|
| 5,832,389 A | 11/1998 | Dent | |
| 5,870,665 A | 2/1999 | Uchikawa | |
| 6,487,426 B1 | 11/2002 | Haber | |
| 6,568,201 B1 | 5/2003 | Cur et al. | |
| 6,757,268 B1 | 6/2004 | Zendle | |
| 7,545,324 B2* | 6/2009 | Kalian | H01Q 3/26 342/372 |
| 8,948,239 B1 | 2/2015 | Martin et al. | |
| 9,154,217 B1 | 10/2015 | Jain et al. | |
| 9,572,163 B2 | 2/2017 | Negus et al. | |
| 2002/0132642 A1* | 9/2002 | Hines | H01Q 21/0006 455/562.1 |
| 2002/0173268 A1 | 11/2002 | Heinzmann | |
| 2003/0148613 A1 | 8/2003 | Ahn et al. | |
| 2004/0027304 A1 | 2/2004 | Chiang et al. | |
| 2004/0179544 A1* | 9/2004 | Wilson | H01Q 1/246 370/442 |
| 2004/0223476 A1 | 11/2004 | Jose et al. | |
| 2004/0224637 A1* | 11/2004 | Silva | H04B 7/04 455/63.4 |
| 2005/0032531 A1 | 2/2005 | Gong et al. | |
| 2005/0134403 A1 | 6/2005 | Kajiya | |
| 2005/0254442 A1 | 11/2005 | Proctor, Jr. et al. | |
| 2006/0093055 A1 | 5/2006 | Goldberg | |
| 2006/0114158 A1 | 6/2006 | Chiang et al. | |
| 2006/0217098 A1 | 9/2006 | Anderson et al. | |
| 2008/0037512 A1 | 2/2008 | Aljadeff et al. | |
| 2009/0232103 A1 | 9/2009 | Kesselman et al. | |
| 2010/0073260 A1* | 3/2010 | Fujita | H01Q 25/008 343/904 |
| 2010/0127801 A1 | 5/2010 | Adkins | |
| 2010/0151876 A1* | 6/2010 | Park | H04W 72/082 455/452.2 |
| 2011/0053536 A1 | 3/2011 | Friedmann | |
| 2011/0218016 A1* | 9/2011 | Hirakawa | H04B 7/024 455/524 |
| 2012/0052809 A1* | 3/2012 | Wu | H04M 1/0256 455/41.3 |
| 2012/0108188 A1 | 5/2012 | Matsumoto et al. | |
| 2012/0220246 A1 | 8/2012 | Kushnir et al. | |
| 2013/0053079 A1* | 2/2013 | Kwun | H04B 7/024 455/509 |
| 2013/0223251 A1* | 8/2013 | Li | H04W 72/046 370/252 |
| 2013/0230325 A1 | 9/2013 | Chow et al. | |
| 2013/0272437 A1* | 10/2013 | Eidson | H04B 7/0413 375/267 |
| 2013/0314280 A1* | 11/2013 | Maltsev | H01Q 3/34 342/368 |
| 2014/0002187 A1 | 1/2014 | McPartlin et al. | |
| 2014/0029461 A1* | 1/2014 | Kinamon | H04B 7/0857 370/252 |
| 2014/0110840 A1 | 4/2014 | Wojnowski et al. | |
| 2014/0286463 A1 | 9/2014 | Reingold | |
| 2015/0023245 A1 | 1/2015 | Du et al. | |
| 2015/0078422 A1 | 3/2015 | Shen et al. | |
| 2015/0365155 A1* | 12/2015 | Subramanian | H04W 72/0446 370/329 |
| 2016/0119038 A1 | 4/2016 | Thomas et al. | |
| 2016/0192433 A1 | 6/2016 | Deenoo et al. | |
| 2016/0204512 A1* | 7/2016 | Ying | H01Q 9/04 343/893 |
| 2017/0215089 A1 | 7/2017 | Lipowski et al. | |
| 2017/0215090 A1 | 7/2017 | Lipowski et al. | |
| 2017/0215192 A1 | 7/2017 | Lipowski et al. | |
| 2017/0215210 A1 | 7/2017 | Lipowski et al. | |
| 2017/0238287 A1* | 8/2017 | Kusashima | H04W 72/042 370/280 |
| 2017/0311307 A1 | 10/2017 | Negus et al. | |
| 2018/0084434 A1 | 3/2018 | Vuonnala et al. | |
| 2018/0124640 A1 | 5/2018 | Jiang et al. | |

OTHER PUBLICATIONS

"BeamFlex+: The Smart Wi-Fi Antenna Technology That Steers Signals to High-Quality Paths," Ruckus Wireless, Inc., 2005-2016. Downloaded from http://www.theruckusroom.net. Three pages.

Rahimian, A., "Steerable Antennas for Automotive Communication Systems," Dissertation, 2009, University of Birmingham, UK, Apr. 6, 2009. Eighty-two pages.

Rotman, W., et al., "Wide-Angle Microwave Lens for Line Source Applications," IEEE Transactions on Antennas and Propagation, pp. 623-632, Nov. 1963. Ten pages.

Vashist, S. et al., "A Review on the Development of Rotman Lens Antenna," Chinese Journal of Engineering, vol. 2014, Article ID 385385, Jul. 17, 2014. Nine pages.

Zucchelli, G. et al., "Hybrid Beamforming Design for 5G Wireless Communications," http://electronicdesign.com/communications/hybrid-beamforming-design-5g-wireless-communications. Downloaded Oct. 13, 2016. Ten pages.

Partial International Search Report, dated Apr. 25, 2017, from International Application No. PCT/US2017/015323, filed on Jan. 27, 2017. Thirteen pages.

International Search Report and Written Opinion of the International Searching Authority, dated Jun. 21, 2017, from International Application No. PCT/US2017/015323, filed on Jan. 27, 2017. Twenty-two pages.

International Preliminary Report on Patentability, dated Aug. 9, 2018, from International Application No. PCT/US2017/015323, filed on Jan. 27, 2017. Fourteen pages.

* cited by examiner

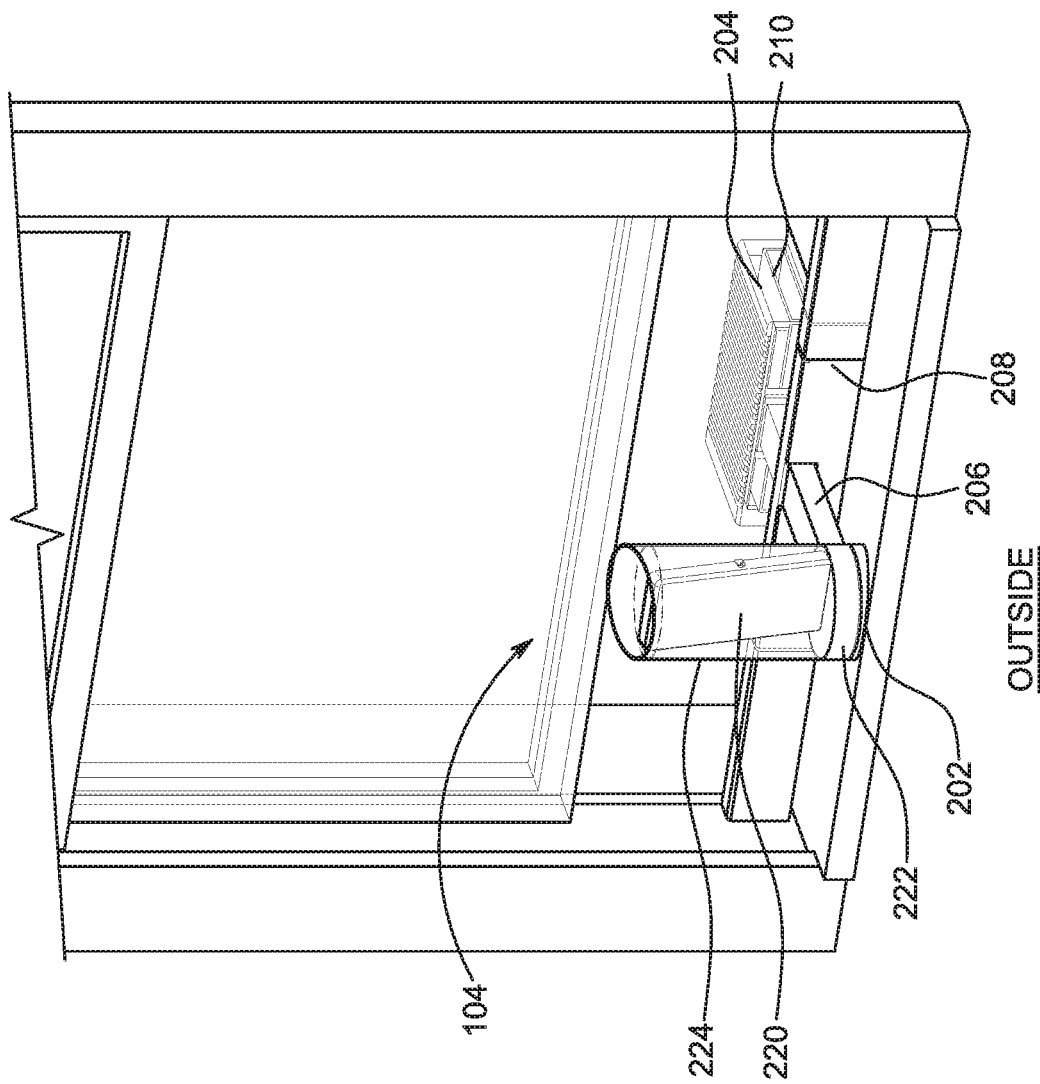

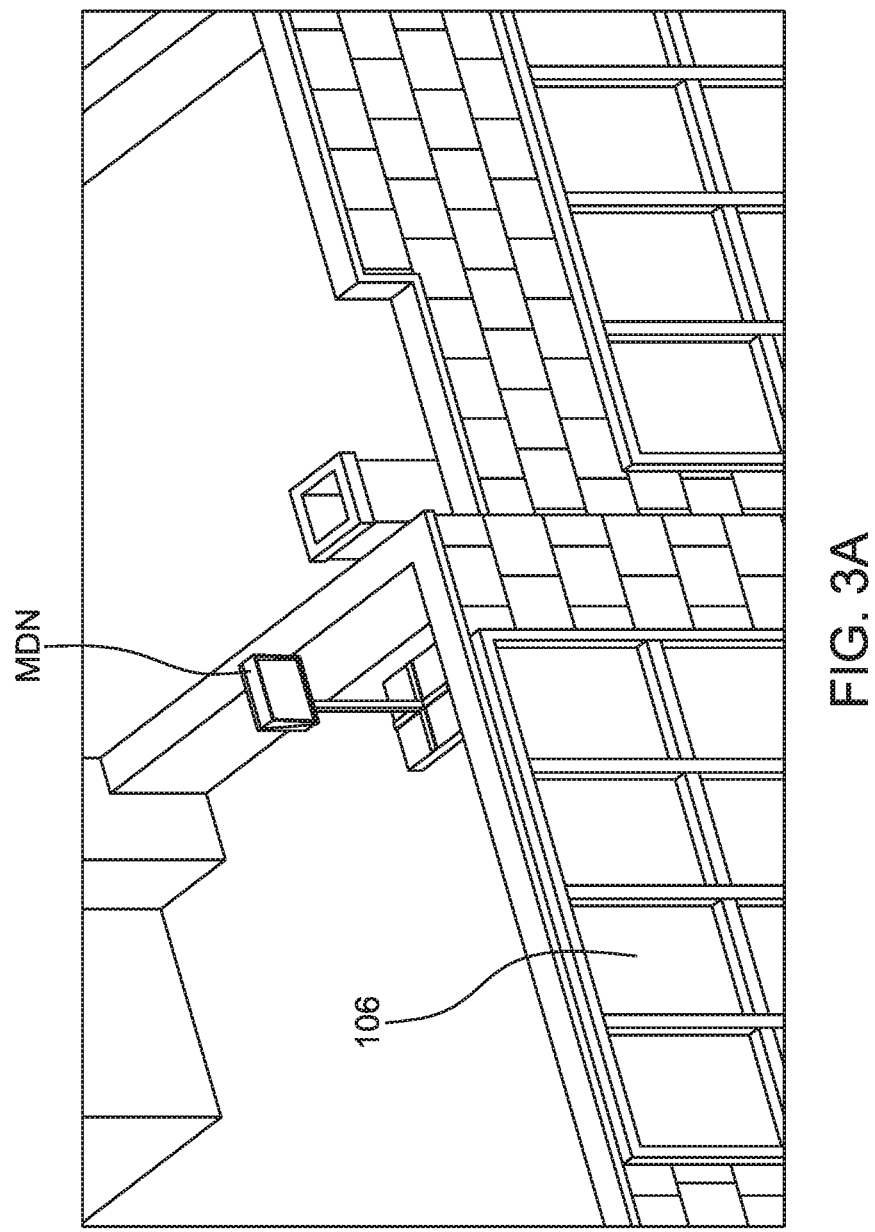

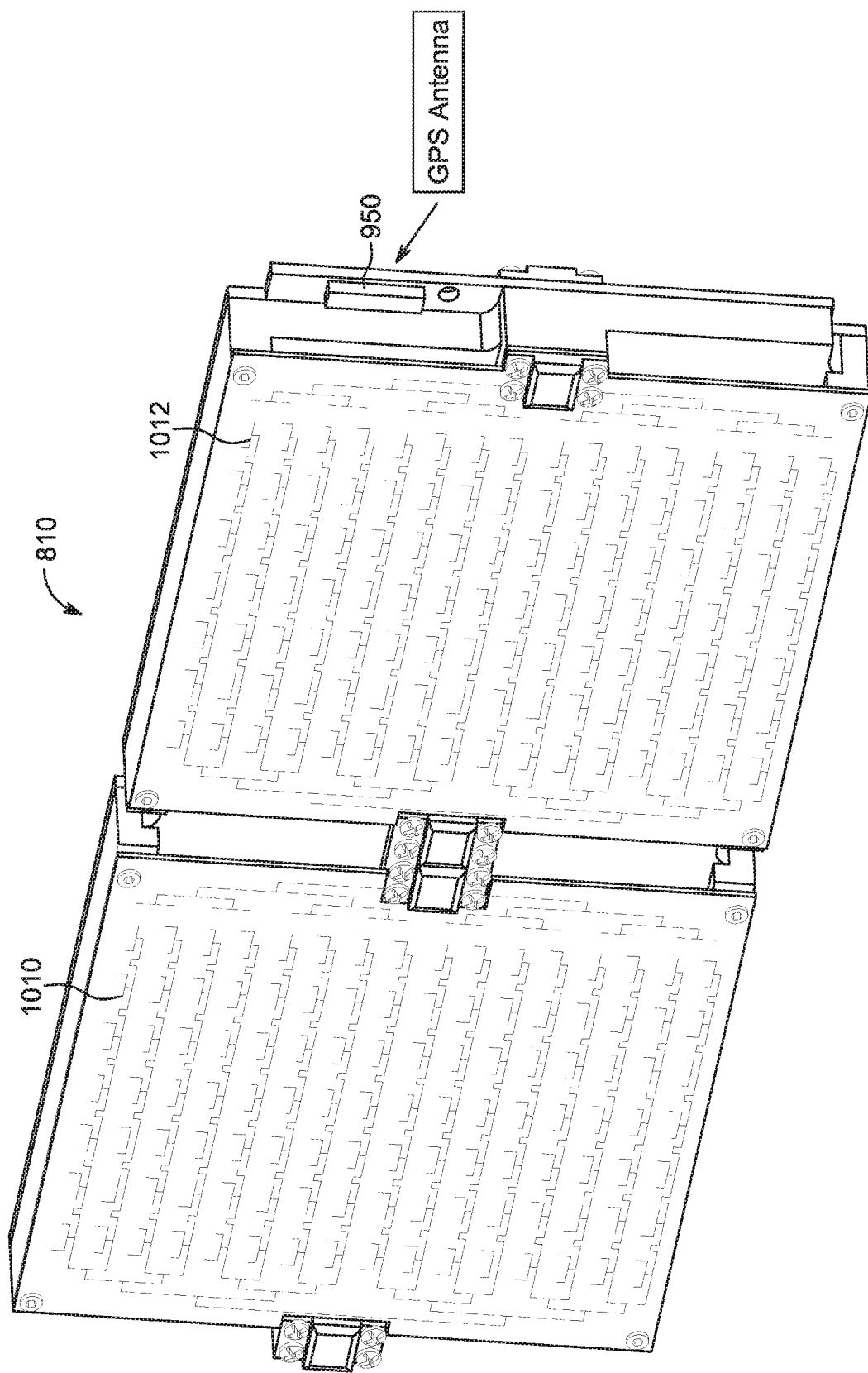

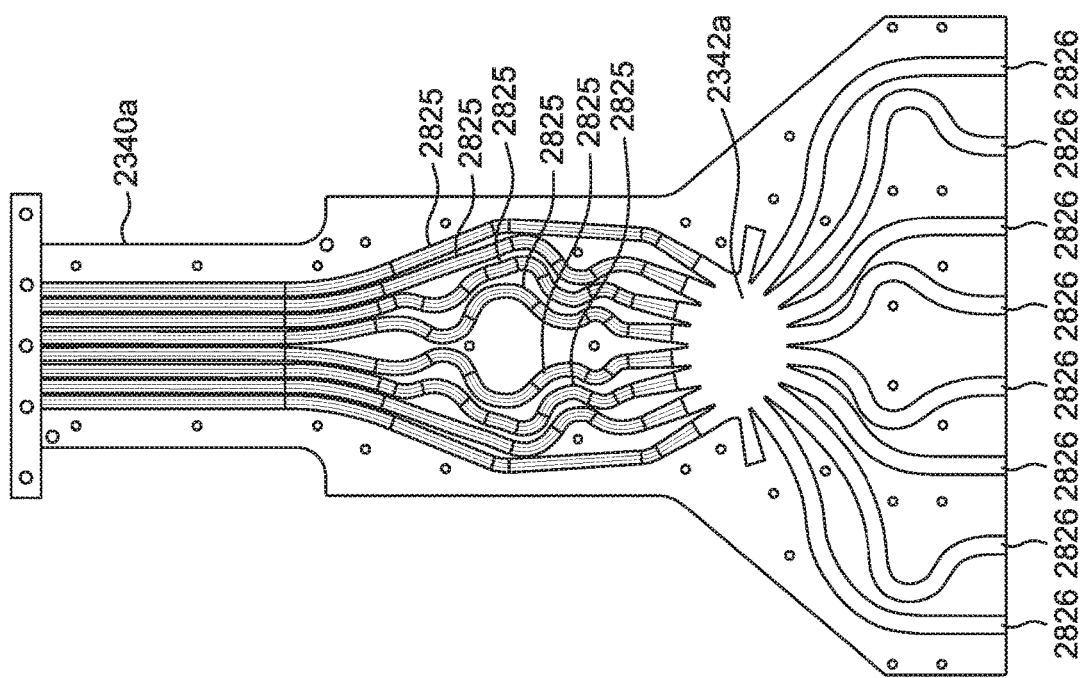

AGGREGATION NODE FOR WIRELESS ACCESS NETWORK UTILIZING HYBRID BEAMFORMING

RELATED APPLICATIONS

This application claims the benefit under 35 USC 119(e) of U.S. Provisional Application No. 62/287,605, filed on Jan. 27, 2016, which is incorporated herein by reference in its entirety.

This application is related to U.S. application Ser. No. 15/418,256 filed on Jan. 27, 2017, entitled "Star topology fixed wireless access network", now U.S. Patent Publication No.: 2017/0215089 A1, U.S. application Ser. No. 15/418,291 filed on Jan. 27, 2017, entitled "Subscriber node for fixed wireless access network with steered antenna", now U.S. Patent Publication No.: 2017/0215090 A1, U.S. application Ser. No. 15/418,303 filed on Jan. 27, 2017, entitled "High frequency fixed wireless access network using multi spatial stream WiFi", now U.S. Patent Publication No.: 2017/0215192 A1, and U.S. application Ser. No. 15/418,317 filed on Jan. 27, 2017, entitled "Nodes for high frequency fixed wireless access network", now U.S. Patent Publication No.: 2017/0215210 A1, all of which are incorporated herein by reference in their entirety.

BACKGROUND OF THE INVENTION

Internet service providers (ISPs) have historically used a number of different technologies in their subscriber or access networks to deliver network connectivity to premises such as homes, multidwelling units, and businesses. Initially premises were connected via dial-up connections over POTS lines, or ISDN. Often businesses used T-1 to T-3 connections.

Nowadays, DSL, cable and optical fiber networks are common in urban and metropolitan areas to provide network access.

Fixed wireless network access is another option in some areas. ISPs providing the wireless network access can transmit and receive data to and from endpoint nodes usually at premises as radio waves via transmission towers. This has been typically used in rural areas where cable and optical fiber networks are not available.

SUMMARY OF THE INVENTION

The systems described herein can be generally utilized in frequency wireless data networks, typically operating in the 10 GHz to 300 GHz band for communications between aggregation nodes and one or more high frequency endpoint nodes such as fixed subscriber nodes and/or multi-dwelling unit nodes, usually in star-topology networks. Nevertheless, the technology also has application to mobile and semi-mobile applications and point-to-points links. This spectral band encompasses millimeter wavelengths (mm-wave) that are typically described as covering the 30 GHz to 300 GHz frequency band.

In many of the systems, the aggregation nodes have at least one phased array antenna that divides an area of coverage into multiple subsectors. In operation, the aggregation nodes transmit and receive high frequency modulated carrier signals to and from the endpoint nodes. These nodes are associated with different subsectors in a preferably azimuthal/horizontal fan pattern of the antennas. By forming beams for these subsectors and towards a specific endpoint nodes or groups of endpoint nodes, and/or simultaneously forming several beams to different endpoint nodes within different subsectors from the same antenna, the aggregation node can communicate with the endpoint nodes, with lower or without interference between nodes. Another advantage of beam forming at the aggregation node is power management for both the aggregation node and the endpoint nodes. Specifically, the transmission power on the downlink from the aggregation node to the endpoint nodes is lower because the aggregation node beam(s) are directed at individual endpoint nodes or small groups of endpoint nodes. On the other hand, the transmission power on the uplink from the endpoint nodes to the aggregation nodes can be lower since the aggregation node's antenna is electronically directed at individual endpoint nodes or groups of endpoint nodes.

In general, according to one aspect, the invention features an aggregation node for a wireless access system. The node comprises an antenna array system for transmitting high frequency signals to and/or receiving high frequency signals from subscriber nodes, a phase control device coupled to the antenna array system via a set of feedlines, and an amplifier system for amplifying the feeds on the between the ante ray system and the phase control device.

In embodiments, the antenna array system can include at least one transmit antenna array for transmitting the high frequency signals to the subscriber nodes and at least one receive antenna array for receiving the high frequency signals from the subscriber nodes. The phase control device can include one or more Rotman lens.

This phase control device controls phases of signals to be fed to the amplifier system and then to the phased array antenna system to direct the high frequency signals to different portions of an area of coverage.

In the receive side, the phase control device controls phases of signals received from the antenna array system to direct high frequency signals received from different portions of an area of coverage to different output ports of the phase control device.

The amplifier system can comprise power amplifiers, possibly separate phase matched amplifiers, at ports of the phase control device.

In general, according to one aspect, the invention features a communication method for an aggregation node and subscriber nodes in a wireless access system. The method comprises generating high frequency signals for different subscriber nodes, feeding the high frequency signals into a transmit phase control device, amplifying feeds at the output ports of the transmit phase control device, and beaming the high frequency signals to different subscriber nodes within an area of coverage.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2C is a perspective view with housing components of the subscriber endpoint node shown in phantom;

FIG. 3A shows an example of a multiple dwelling unit endpoint node located on a rooftop of a building;

FIGS. 10A-10B are partial perspective views showing exemplary patch antenna arrays for the EHF module of the endpoint node;

FIGS. 28A-28B are a front plan scale view of a backplate and a perspective scale view of a front plate, respectively, showing an exemplary receive side of a phased array antenna system;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
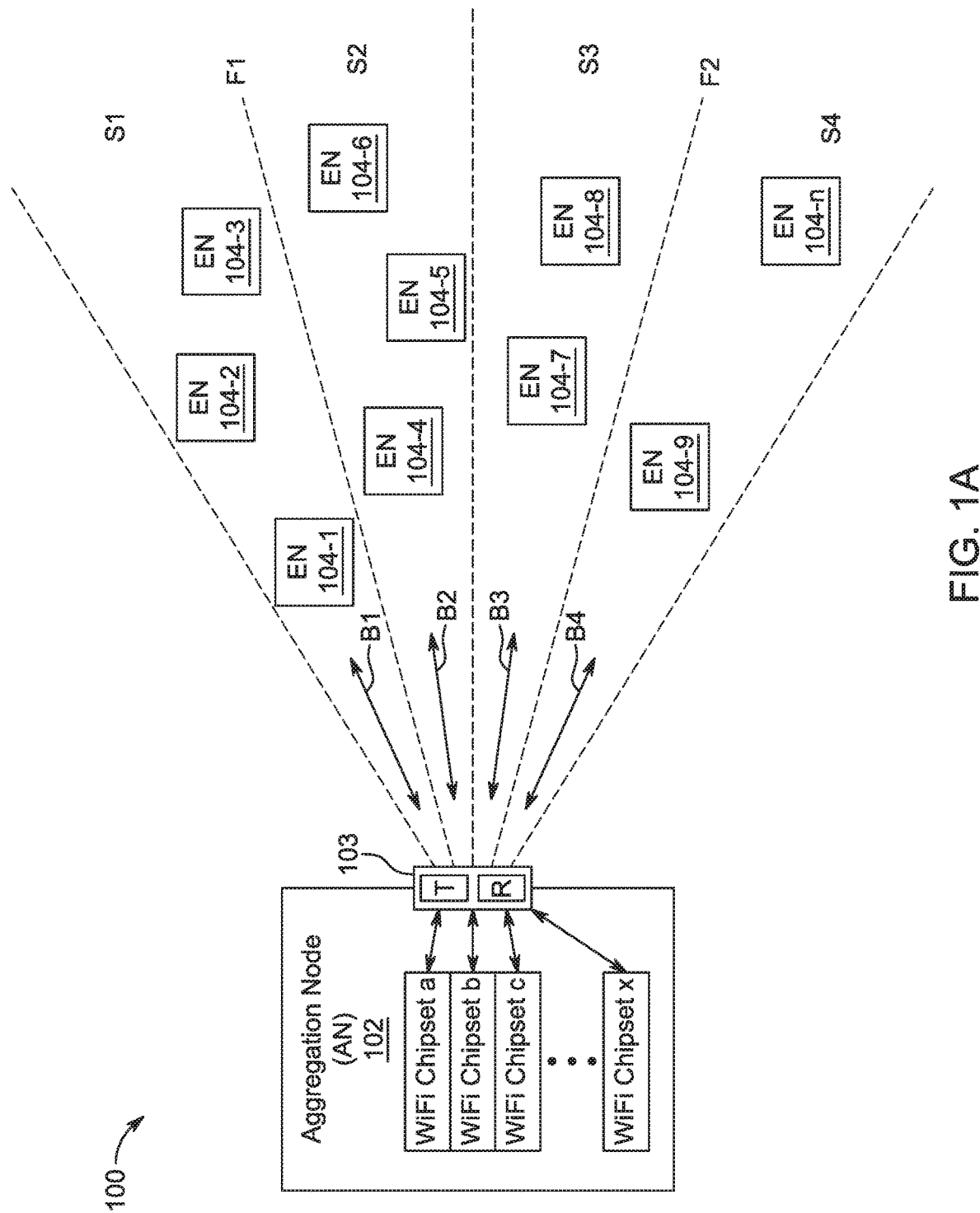
FIGS. 1A-1C are block diagrams showing different deployments of aggregation nodes and endpoint nodes in a fixed wireless access system.

A system 100 illustrated in FIG. 1A shows an aggregation node (AN) 102 and a plurality of high frequency network endpoint nodes (EN) 104, e.g., 104-1, 104-2, . . . , and 104-n.

The aggregation node 102 utilizes a phased array antenna system 103 to communicate with the endpoint nodes 104-1-104-m. The antenna system preferably covers an azimuthal arc of between about 90 degrees and 180 degrees; with about 120 degrees currently being used.

The operation of the phased array antenna system 103 then divides the antenna's area of coverage into multiple subsectors S1, S2, . . . , Sn. In the illustrated example, the subsectors are distributed in an azimuthal fan, with the subsectors adjoining one another. There are at least two subsectors; with some embodiments having four, eight or more subsectors. As a result, in typical implementations, each subsector covers an azimuthal arc of between possibly 8 degrees and 60 degrees. Currently, the subsector arc is between about 10 degrees and 25 degrees.

The phased array antenna system 103 forms transmit and receive beams B1-Bn that correspond to each of the subsectors. In this way, the aggregation node 102 reduces interference between endpoint nodes, conserves power on the downlinks and reduces transmit power requirements by the endpoint nodes on the uplinks.

The endpoint nodes EN are distributed within and thereby associated with different subsectors. For example, subscriber nodes 104-1-104-3 are associated with subsector S1, subscriber nodes 104-4-104-6 are associated with subsector S2, subscriber nodes 104-7-104-8 are associated with subsector S3, and subscriber nodes 104-9 to 104-n are associated with subsector S4.

In some embodiments, the phased array antenna system 103 produces a number of beams for the subscriber node/group of subscriber nodes in each subsector S1, S2, . . . , Sn. The phased array antenna system 103 typically includes one or more transmit phased array antennas T for transmitting data streams to the endpoint nodes 104 and one or more receive phased array antennas R for receiving data streams from the endpoint nodes 104.

Each endpoint node 104 communicates with the aggregation node 102 by means of an electronic assembly or system that provides a wireless ISP (internet service provider) handoff at the premises where the endpoint node 104 is installed. The endpoint node 104 is a residential or business fixed wireless endpoint that communicates with the aggregation node 102 via high frequency network (i.e., using high frequency communication links/radios), In some embodiments, the high frequency network operates between 10 and 300 GHz, or more commonly between about 20 and 60 GHz.

Locally the endpoint node 104, in a typical residential implementation, communicates with a modem/router or access point over possibly a WiFi tunnel (in the 2.4 or 5 GHz bands or the WiGig tri-band in the 2.4, 5 and 60 GHz bands, or IEEE 802.11ac IEEE 802.11ad-2012) or via a wired connection (e.g., 1000BASE-T). This modem/router or access point then maintains the local area network at the subscriber's premises.

In other cases, the endpoint node 104 itself maintains the wired and/or wireless LAN at the premises. It provides typical functions associated with LAN routers, such as Network Address Translation (NAT), guest networks, Parental Controls and other Access Restrictions, VPN Server and Client Support, Port Forwarding and UPnP, and DHCP (Dynamic Host Configuration Protocol) server that automatically assigns IP addresses to network devices on the LAN.

According to a preferred embodiment, the aggregation node includes multiple WiFi chipsets. These are commercially available systems of one or more chips that implement the IEEE 802.11 standard. These chipsets are capable of maintaining multiple spatial streams such as provided by the IEEE 802.11n or 802.11ac versions and follow-on versions of the standard. Each of these WiFi chipsets produce WiFi signals, which are signals that have been encoded according to the IEEE 802.11 standard. These WiFi signals are then upconverted and transmitted to the endpoint nodes 104. In turn, the endpoint nodes transmit high frequency signals back, which signals are downconverted to WiFi signals at the conventional frequencies such as 2.4 or 5 GHz.

These WiFi chipsets are allocated to their own, one or more, subsectors. Further, their WiFi signals are also preferably up and down converted to different carrier frequencies to minimize inter-chipset interference. Thus, for example, WiFi chipset "a" might communicate with nodes in subsectors S1 and S2 at frequency F1, whereas WiFi chipset "b" might communicate with nodes in subsectors S3 and S4 at frequency F2.

Figure 1B:
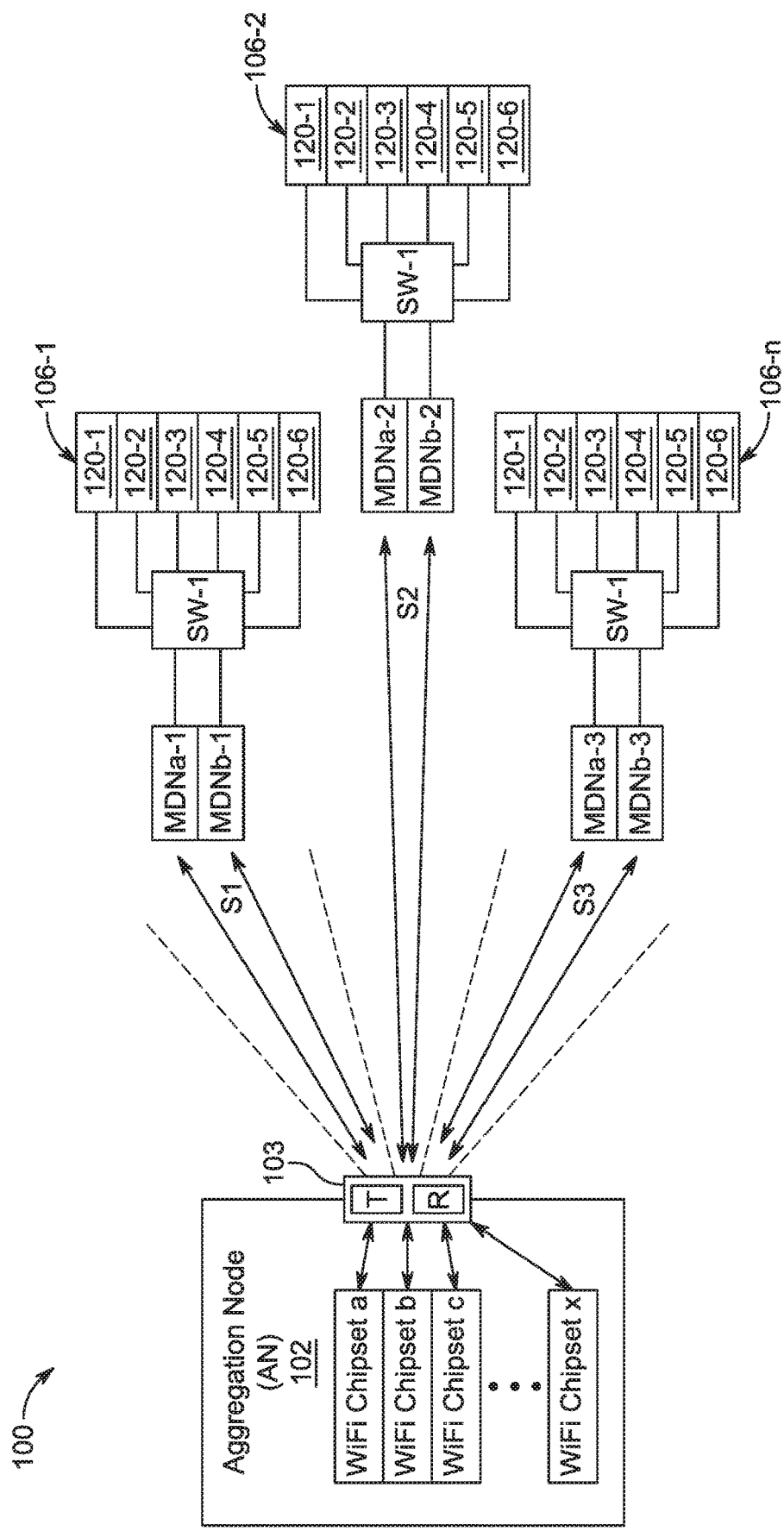

FIG. 1B illustrates the system 100 including the aggregation node 102 with its phased array antenna system 103 providing access to a plurality of multiple dwelling units (MDU) 106 (e.g., 106-1, 106-2, . . . 106-n). In this deployment example, the aggregation node 102 provides a wireless ISP handoff to the multiple dwelling units 106-1, 106-2, 106-n. Each of these multiple dwelling units 106 in turn includes multiple housing units 120 such as apartments or condominiums (e.g., 120-1, 120-2, . . . , 120-6) which typically separately subscribe to the Internet service. In general, MDU is a classification of housing where multiple separate housing units for residential inhabitants are contained within one building or several buildings within one complex (e.g., an apartment building).

In the illustrated exemplary system 100, each multiple dwelling unit MDU 106 (e.g., 106-1, 106-2) has one or more endpoint nodes, called multiple dwelling unit nodes (MDNs). For example, multiple dwelling unit 106-1 has two MDNs, MDNa-1, MDNb-1. Likewise multiple dwelling unit 106-2 has two MDNs, MDNa-2, MDNb-2. The advantage of having a number of multiple dwelling nodes for each multiple dwelling unit is primarily redundancy. If one of the MDNs fails, then the second MDN can take over and provide the link to the aggregation node 102.

In the illustrated example, routers/switches SW-1, SW-2, SW-n are located between the MDNs for a particular multiple dwelling unit 106-1, 106-n and the cabling that provides the wired connections to each of the separate housing units 120, for example. In general, the switches SW-11, SW-2, SW-n monitor the health of the MDNs for the MDU 106 and will switch off to a backup MDN in the case of the failure of the primary MDN. In other cases, the switches SW-1, SW-2, SW-n load balance bandwidth between the MDNs in a situation where the MDNs connect to different aggregation nodes 102 to provide increased data throughput.

Figure 1C:
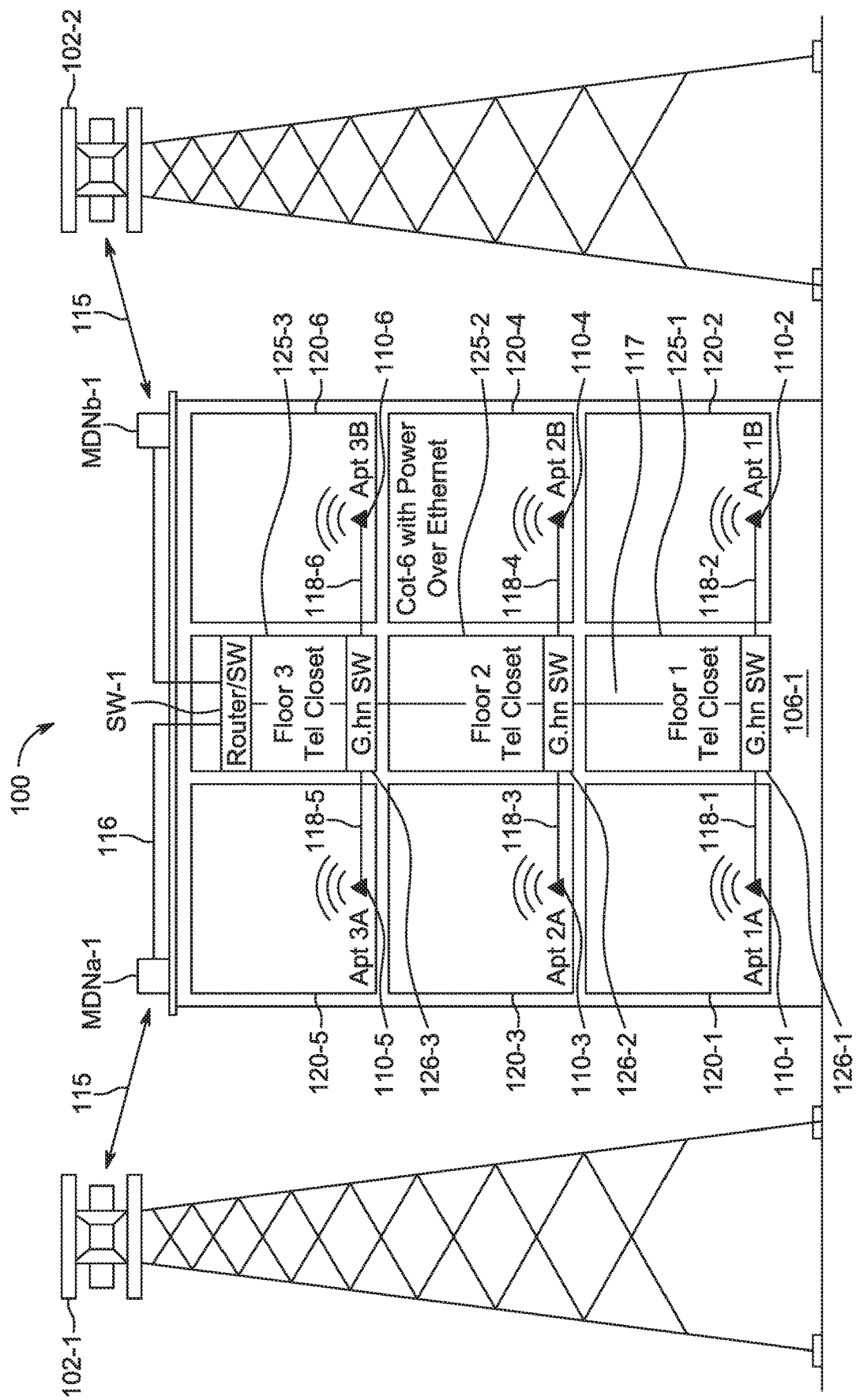

FIG. 1C shows another implementation of the system 100, where MDNs (e.g., MDNa-1, MDNb-1) for the respective MDU 106-1 connect to different aggregation nodes 102 (e.g., 102-1, 102-2) via separate high frequency links 115. This can provide at least two advantages. Firstly, this arrangement provides redundancy against the failure of a particular aggregation node 102. Secondly, throughput to and from the particular multiple dwelling unit 106-1 can also be improved.

Here, a router/switch SW-1 is located between the MDNs (MDNa-1, MDNb-1) and the cabling 118-1 . . . 118-6 that provides wired connections to each of the housing units 120-1, 120-2, . . . , 120-6. In some implementations, the MDNs (MDNa-1, MDNb-1) couple to the switch SW-1 via Category 6 (cat 6) cabling 116 with Power over Ethernet (POE) or high power POE. As a result, the MDN are powered using a common cabling system with data transmission. Other mechanisms for coupling the MDNs to the SW-1 can be deployed without departing from the scope of the invention.

Each floor in the MDU 106-1 will typically have a telephone (wiring) closet (i.e., three closets 125-1, 125-2, and 125-3 for the three floors). In one implementation, Category 5e/category 6 cables 117 run between the telephone closets 125-1, 125-2, and 125-3, although other cabling/coupling means can be utilized. In one example, a G.hn switch (e.g., 126-1, 126-2, 126-3) is installed in each telephone closet. G.hn is a specification for home networking that operates over three types of legacy wires: telephone wiring, coaxial cables, and power lines. The G.hn specification allows data rates of up to 1 Gbit/s. The G.hn switches 126-1, 126-2, 126-3 network over any of the supported wire types. In one implementation, the G.hn switches 126-1, 126-2, 126-3 network over telephone line pairs or Category (cat 3) cable, or Category 5 (cat) cable that serves as the final cabling runs 118-1 . . . 118-6 to each unit 120-1 . . . 120-6, although other networking means can be utilized. In the illustrated example, the LAN for each unit 120-1 . . . 120-6 is maintained by a wireless premises networking device/router 110-1 . . . 110-6.

Figure 2A:
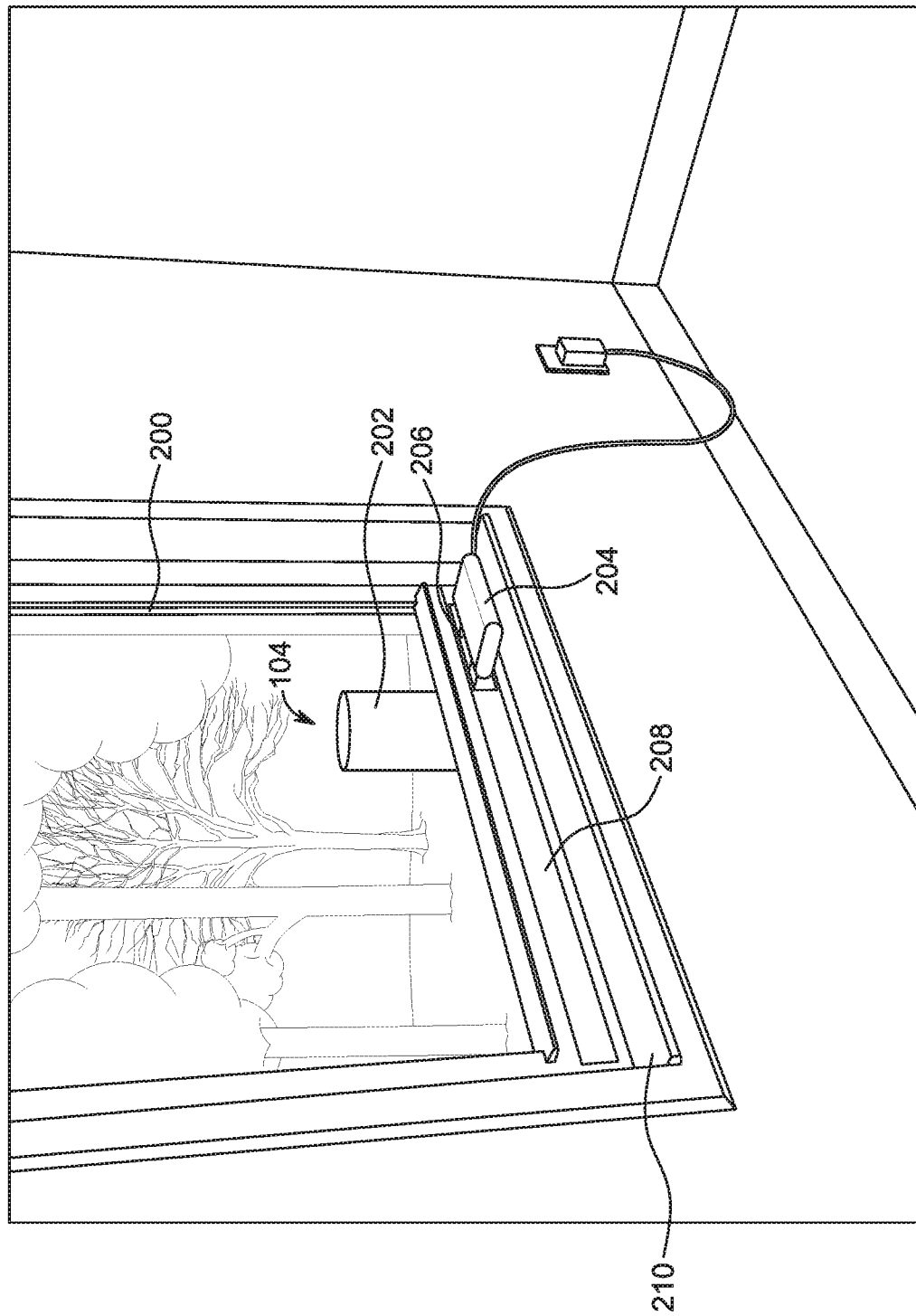
FIGS. 2A-2B are perspective views of a subscriber endpoint node mounted at a window of a subscriber's premise.

FIG. 2A shows an example of the endpoint node 104 mounted at a window of a subscriber's premise, such as a residence.

This illustrated subscriber endpoint node 104 is designed for installation in a window of the residence. It has an outdoor unit (OM) 202 coupled to an indoor unit (IDU) 204 by a bridge unit 206. This exemplary subscriber node 104 is mounted in the manner of a window air-conditioning unit. Specifically, with the illustrated double hung window 200, the subscriber node 104 is placed on the windowsill and then the lower light of the double hung window 200 is closed against a sealing member 208. In particular, a bottom rail 210 of the lower sash of the window 200 clamps the sealing member 208 against the window's sill. This leaves the IDU 204 on the inside of the subscriber's premises and the ODU 202 exposed on the outside of the subscriber's premises (i.e., outside the window 200). The bridge unit 206 extends through the sealing member 208 and mechanically supports both the ODU 202 and the IDU 204 on the windowsill 205, The bridge unit 206 provides structural support for the assembly, as well as acts as a conduit for electrical cables between the ODU 202 and the IDU 204.

In other embodiments, the IDU 204 and ODU 202 are connected by one or more cables, such as ribbon cables that extend under the closed window, but are otherwise physically separated, and can be detached from each other.

The ODU 202 is configured for high frequency communications with the aggregation node 102, and the IDU 204 is configured for WiFi communications (or wired connections or communications over another unlicensed band) with one or more devices inside the subscriber's premise. In some embodiments, the IDU 204 can communicate with a router access point or directly with one or more user devices at the subscriber's premise. The bridge unit 206 includes one or more interconnection cables for coupling the ODU 202 with the IDU 204, and a DC power module, e.g., one that can be powered by a wall outlet.

On the other hand, in still other embodiments, the subscriber nodes 104 are not separated into IDU 204, ODU 202, and bridge units 206. Instead, in one case, all of the necessary electronics are contained within a single housing that is installed on an outer wall or window of the premises. In one specific example, the electronics of the ODU 202 and IDU 204 are contained in weatherproof case, which then magnetically mounts to the glass or glazing of a window.

Figure 2B:
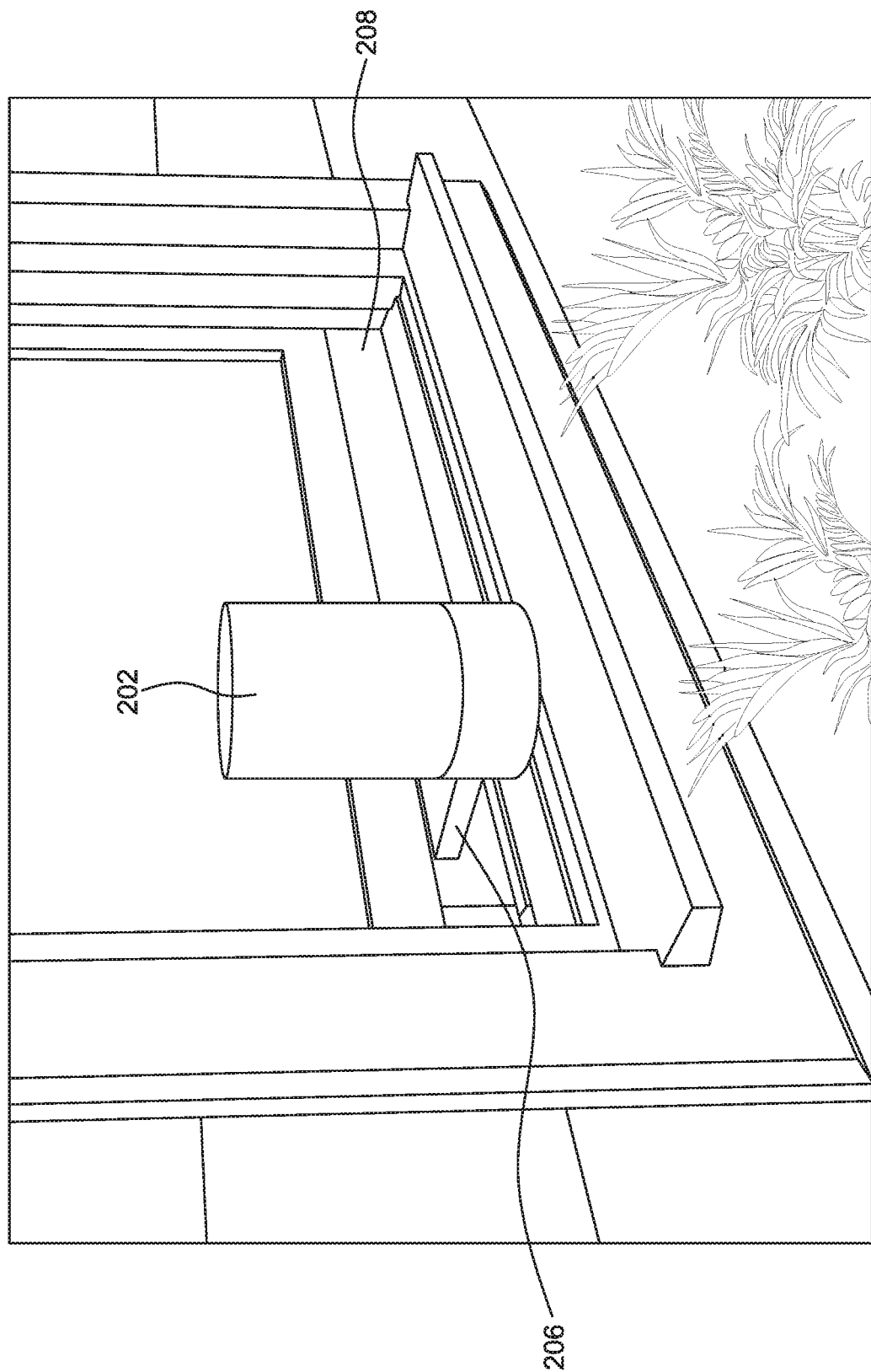

FIG. 2B shows the ODU 202 supported by the bridge unit 206 from a vantage point outside of the subscriber's premises. The ODU 202 is supported by the bridge unit 206, which extends through the sealing member 208.

In other examples, the IDU 204 is located inside the subscriber's premises on the interior side of an outer wall or near an outer wall of the premises. The ODU 202 is located on an exterior side of the outer wall. For example, in some implementations, a hole is drilled through the outer wall such as in the attic of the premises. In other examples, a hole is drilled through the roof. Then, the ODU 202 is mounted on the outside. The IDU 204 is mounted on an adjacent interior surface of the roof or wall, such as mounted between rafters or studs.

FIG. 2C is a diagram of the subscriber node 104, in which the enclosure components of the subscriber node 104 are shown in phantom. The IDU 204 coupled to the ODU 202 via the bridge unit 206 that projects through the sealing member 208. The IDU 204 includes a local wireless and/or wired module 210 that maintains a wireless or wired local area network for the subscriber's premises. In this case, the local wireless module 210 directly transmits and receives information with network devices at the subscriber's premise. In other cases, the local wireless module 210 transmits and receives information with a local wireless access point/router that then maintains the wireless local area network.

The ODU 202 includes an extremely high frequency (EHF) communication module 220 (referred to hereinafter as an EHF module 220) that has one or more integrated patch array antennas with transceivers. The EHF module 220 transmits and receives information in high frequency signals to and from the aggregation node 102. A servo controlled motor unit 222 supports and mechanically steers the EHF module 220 (i.e., steers the patch array antennas of the EHF module 220). A weather hardened enclosure (referred to as a "Radome") 224 is designed for weather and UV protection (i.e., to protect the EHF module 220 and motor unit 222 from weather conditions) but is transparent to the high frequencies. In some embodiments, a heater (not shown) is also installed within the enclosure 224. In some embodiments, the combination of the EHF module 220 and the servo controlled motor unit 222 can be referred to as a steerable antenna module.

The servo controlled motor unit 222 preferably includes a 2-axis pan-tilt mount or gimbal that is controlled by one or more motors. The pan-tilt mount is used to rotate the EHF module 220 so that the integrated patch array antenna can be aligned for communicating with the aggregation node 102. Specifically, the motor unit 222 rotates the EHF module 220 around the vertical axis or in an azimuth direction and further tips the EHF module 220 around a horizontal axis or in the elevation direction. This movement allows the integrated patch array antenna of the EHF module 220 to be pointed at the phased array antenna system 103 of the aggregation node 102. This movement also allows a dynamic repositioning of the network without requiring site visits. For example, in the case of a failure of a particular aggregation node 102 or the addition of a new aggregation node 102 to the overall local network system (e.g., system 100), the EHF module 220 will automatically re-point to a secondary/backup/new aggregation node 102. Additionally, in the case of a site that is served by multiple aggregation nodes 102, a separate path may be extended facilitating redundancy and enabling multi-path network coding to extend at the IP packet level.

In some embodiments, the motors (e.g., stepper motors) of the motor unit 222 are controlled by a microcontroller unit (MCU) on the IDU 204. In one example, the motor unit 222 is capable of moving the EHF module 220 to enable a 75 degree rotation or more in the azimuth direction and a +25 degree rotation or more in the elevation direction.

FIG. 3A shows an example of a MDN endpoint node located on a roof top of an apartment building (e.g., MDU 106). The MDN will communicate with the aggregation node 102 via high frequency links and couples with the switches (e.g., SW) to provide connectivity to each of the apartments in the apartment building 106.

Figure 3B:
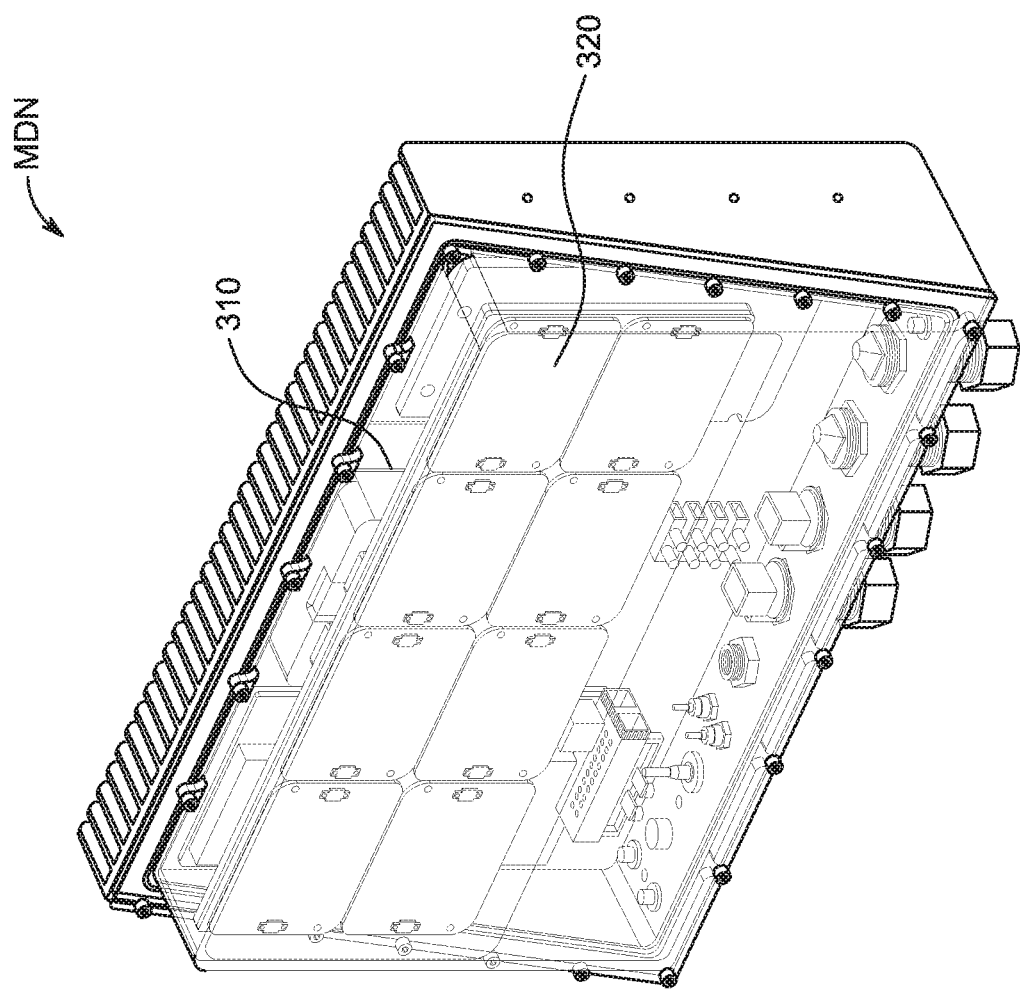
FIG. 3B is a diagram of the mechanical arrangement of the multiple dwelling unit endpoint node.

FIG. 3B is a diagram of the enclosure mechanical arrangement of an exemplary MDN. The MDN includes similar components to the subscriber node 104. In particular, FIG. 3B depicts an EHF module 310 for the MDNa-1 with a number of patch array antennas 320 for high frequency communication with the aggregation node 102. These antennas are not actively steered, but a couple of separate patch array antennas are connected in parallel to increase gain, in this specific embodiment. In other embodiments, however, mechanically or electrically steered antennas are used.

Figure 4A:
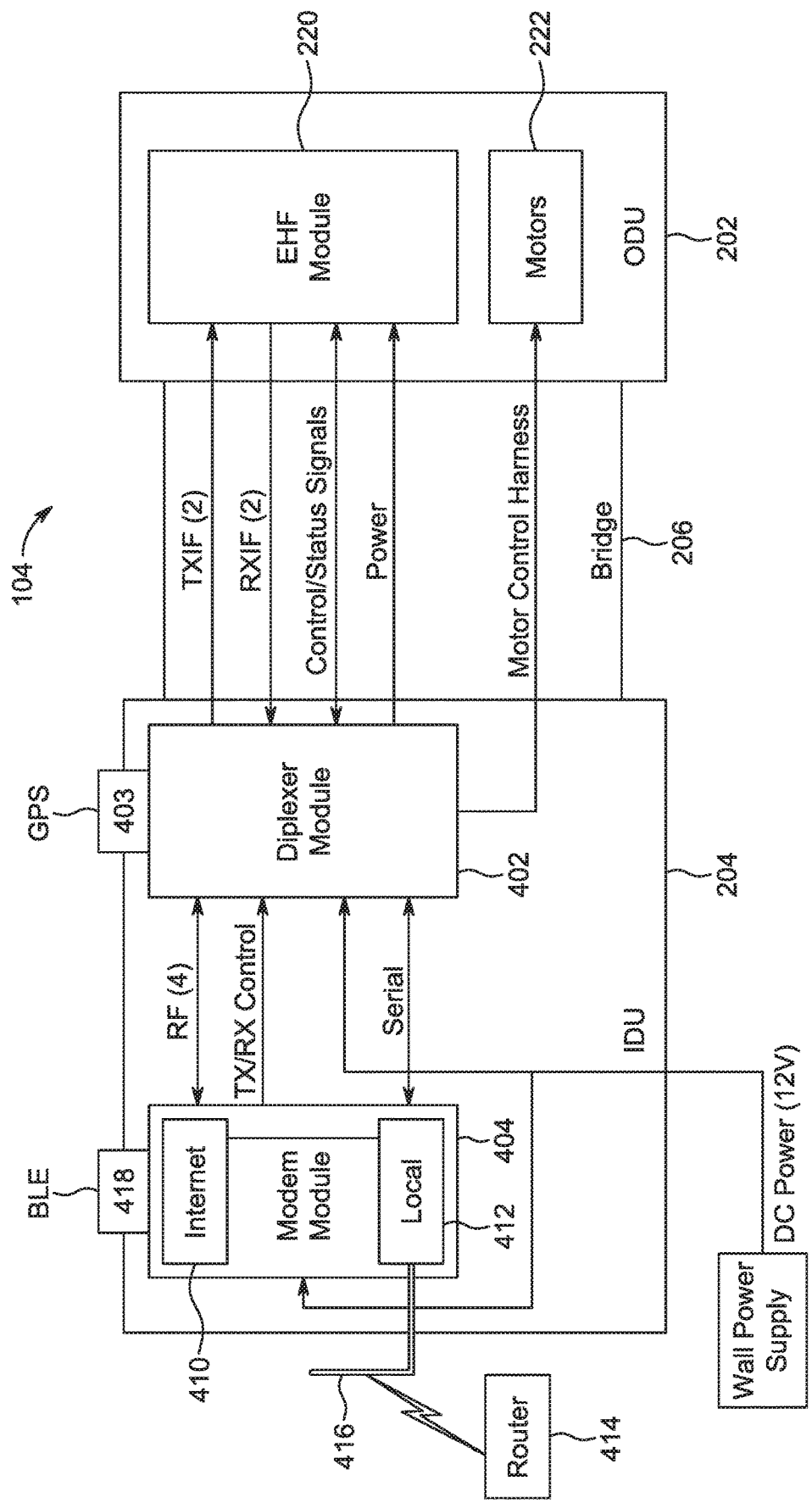
FIG. 4A is a block diagram that shows components of the subscriber endpoint node.

FIG. 4A is a block diagram of the endpoint node 104, with its components or modules. The components are arranged between the DU 204, bridge unit 206 and ODU 202. In this way, it is illustrative of the subscriber endpoint node discussed in FIG. 2A-2C. That said the electronic construction is relevant to the MDU endpoint unit discussed in FIGS. 3A and 3B.

In more detail, the IDU 204 contains electronic circuits, primarily on two printed circuit board assemblies (PCBAs) referred to as a Win modem module 404 and a diplexer module 402.

According to some embodiments, the WiFi modem module 404 is a printed circuit board assembly, which includes: 1) a 802.11ac 4×4 radio chipset for the internet (referred to herein as internet WiFi chipset 410), 2) a 802.11ac n×n chipset, such as, (3×3) radio chip set (referred to herein as local WiFi chipset 412 or local wireless module 210) for establishing a wireless data connection to a wireless router or access point 414 via WiFi antennas 416 on the IDU 204, and 3) and a Bluetooth low energy (BLE) radio 418 for system configuration. Preferably, the modem module 404 also include one or more wired and or optical network jacks such an optical data connections or RJ-45 jacks.

In one embodiment, off-the-shelf printed circuit board assemblies (PCBAs) are used for the WiFi modem module 404 e.g., AP148 with 2 radio PCIe (Peripheral Component Interconnect Express) modules. In some embodiments, the local WiFi chipset 412 is mounted directly on the main PCB without interconnections through inter-board connectors. In some embodiments, a QCA9980 PCIe card that has a ~5 GHz operating frequency is used for the internet chipset 410.

The diplexer module 402 includes a frequency diplexer for WiFi signals (e.g., 802.11ac signals) from the internet WiFi chipset 410 of the modem module 404, clock sources for low frequency local oscillator (LO) signals, a global positioning system (GPS) receiver 403, a 100 MHz reference synthesizer, and a microcontroller for managing various functions, e.g., local functions, functions of the EHF module 220, and gimbal functions of the servo controlled motor unit 222.

The diplexer module 402 communicates with the internet WiFi chipset 410 and the EHF module 220 via the WiFi signals. The EHF module 220 is configured to: i) perform frequency conversions between intermediate frequencies (IF), WiFi or near WiFi frequencies (associated with the WiFi signals from the diplexer module 402) and high frequencies, and ii) communicate with one or more aggregation nodes 102 at the high frequencies.

The ODU 202 includes the EHF module 220 and the servo controlled motor unit 222. The ODU 202 contains circuitries for the high frequency antennas, frequency conversion, amplifiers, and LNBs (low noise block down converters) on the EHF module 220. The LNB is a combination of low-noise amplifier, frequency mixer, local oscillator and intermediate frequency amplifier.

Extending through the bridge unit 206 are cables supporting two or more transmit intermediate frequency connections TXIF and cables supporting two or more receive intermediate frequency connections RXIF, electrical connections for control and status signals, power to the EHF module 220, and a motor control harness between the diplexer module 402 and the servo controlled motor unit 222.

In some implementations, the radio on the modem module 404 has a TX Enable control signal that is asserted while the radio is transmitting. The diplexer module 402 buffers this signal, and passes it along to the EHF module 220. In one embodiment, the radio on the modem module 404 also has a RX Enable control signal that is used to control the RX path of the SPDT (single pole double throw) switch between the radio and its antenna. The diplexer module 402 buffers this signal and passes it along to the EHF module 220.

In some implementations, T/R switches connect the uni-directional transmission lines on the diplexer module 402 to the bi-directional transmission lines used on the modem module 404.

Figure 4B:
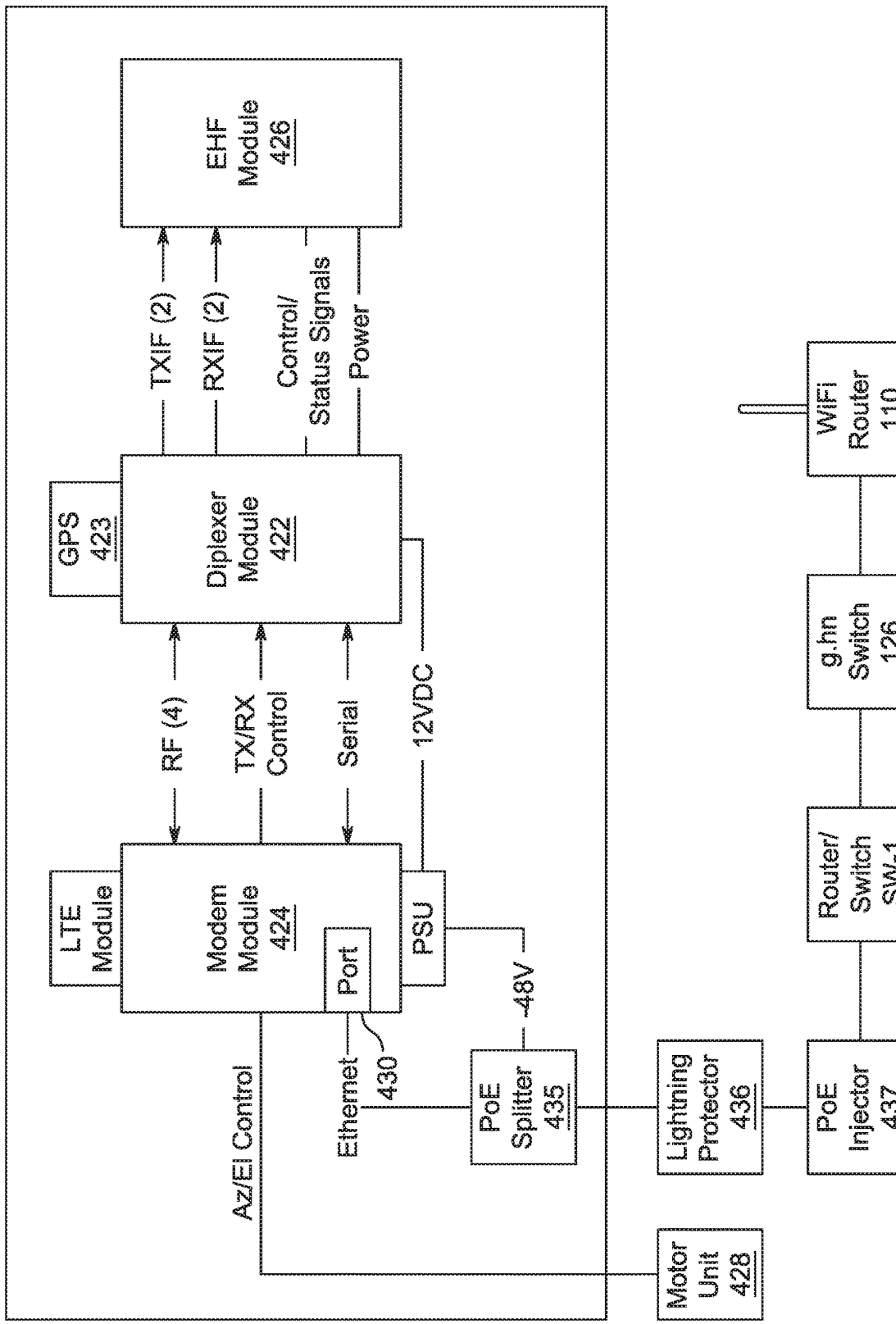
FIG. 4B is a block diagram that shows the components of the multiple dwelling unit endpoint node.

FIG. 4B is a block diagram of the MDN version of the endpoint node. The various component/modules of the MDN are similar to and perform the same functions as modules of the subscriber node 104 as described in FIG. 4A. Diplexer module 422 communicates with WiFi modem module 424 and the EHF module 426 via the WiFi signals (i.e., 802.11ac signals). The diplexer module 422 includes a frequency diplexer for the WiFi signals from the modem module 424, clock sources for LO signals, GPS receiver 423, a 100 MHz reference synthesizer, and a microcontroller for managing various functions, e.g., functions of the EHF module 426, and gimbal functions of the motor unit 428.

The EHF module 426 performs frequency conversions between WiFi/IF frequencies and high frequencies and communicates with the aggregation node 102 at the high frequencies. An optional motor unit 428 is used to rotate the EHF module 426 so that patch array antennas associated with the EHF module 426 can be aligned for communicating with the aggregation node 102. Specifically, the motor unit 428 rotates the EHF module 426 around the vertical axis or in an azimuth direction and further tips the EHF module 426 around a horizontal axis or in the elevation direction. This movement allows the patch array antennas of the RIF module 426 to be pointed at the phased array antenna system 103 of the aggregation node 102.

The modem module 424 of the MDU (e.g., MDU 106-1) couples to the router/switch SW-1) via an Ethernet port 430, a PoE splitter 435, a lightning protector 436 and a PoE injector 437. The PoE injector 437 is used to add PoE capability to existing cabling used in MDUs. The router/switch SW-1 couples to one or more G.hn switches e.g., 126-1, 126-2, 126-3. Wired data connections are maintained between the G.hn switch and WiFi router 110, where the WiFi router provides wireless connectivity for a number of network devices in a particular unit (e.g., apartment) of the MDU.

Figure 5:
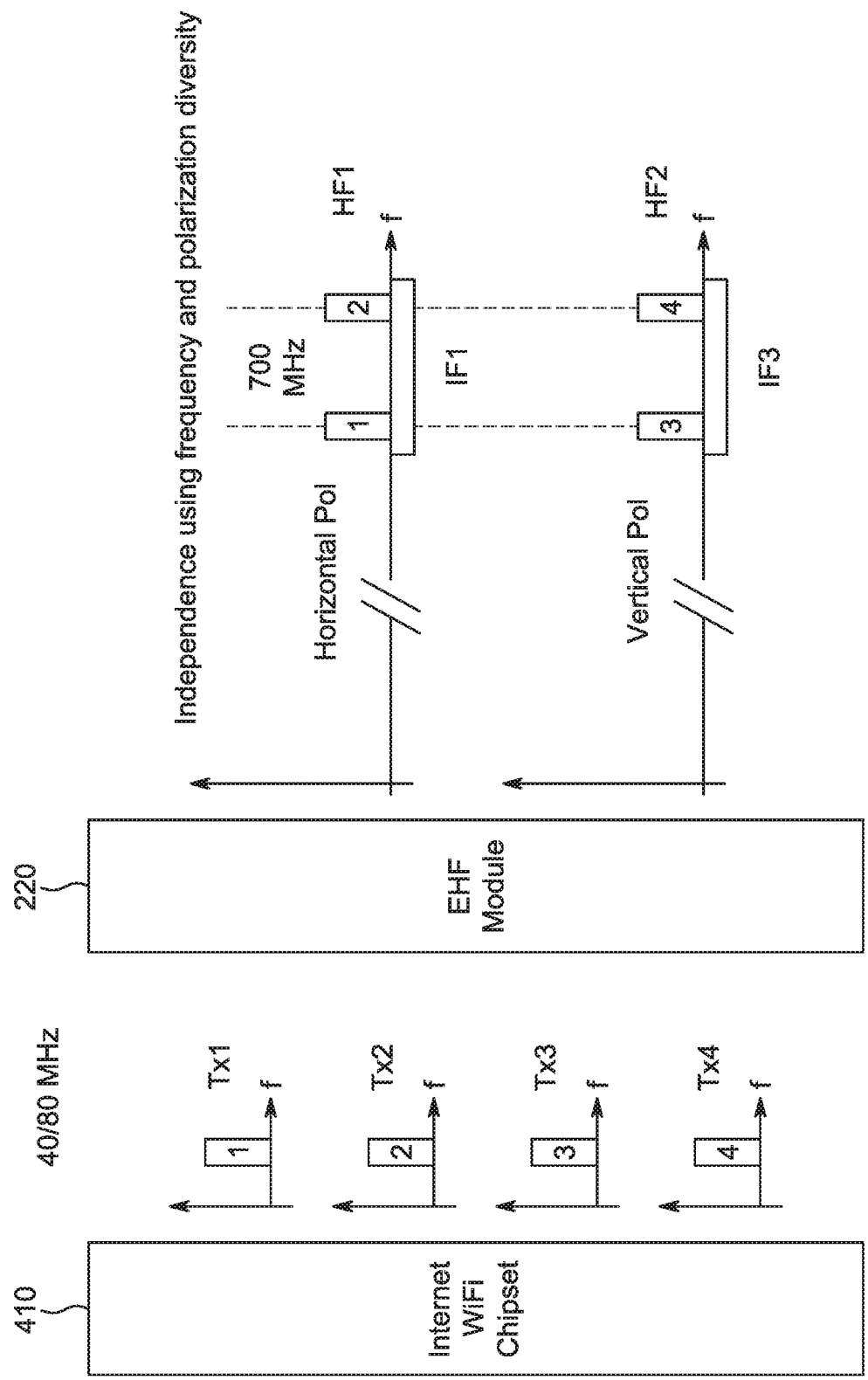
FIG. 5 is schematic diagram showing a frequency plan utilized for wireless communications between the aggregation node and the endpoint nodes according to one embodiment.

FIG. 5 shows an exemplary frequency plan utilized for high frequency wireless communications between the aggregation node 102 and the subscriber nodes 104. In the transmit direction, four RF WiFi signals from the internet chipset 410 are translated to IF signals in the 2-3.5 GHz range by the diplexer module 402 of the IDU 204, for example. In the receive direction, the received high frequency signals are translated to the IF signals at the EHF module 220.

In particular, in the transmit direction, 4 MIMO outputs of the internet WiFi chipset 410 are multiplexed and compressed to two signals using the frequency plan. Specifically, at the diplexer module 402, two outputs (e.g., Tx1 and Tx2) are combined into IF1 signal and two additional outputs (e.g., Tx3 and Tx4) are combined into IF3 signal. At the EHF module 220, the IF1 signal is upconverted into a high frequency signal HF1 that is transmitted with a horizontal polarization (HTx) and the IF3 signal is upconverted to a high frequency signal HF2 that is transmitted with a vertical polarization (VTx). Similarly, in the receive direction and at the EHF module 220, received high frequency signals are downconverted into IF signals IF2 and IF4. These IF signals are converted to WiFi signals (e.g., Rx1, Rx2, Rx3, and Rx4) at the diplexer module 402, where the WiFi signals can be decoded by the internet WiFi chipset 410. Each signal path (transmit or receive) in the EHF module 220 passes two simultaneous carriers (e.g., IF1, IF3 for transmit and IF2, IF4 for receive) via horizontal and vertical polarization, where each carrier contains 802.11ac modulation of bandwidths (either 100 MHz or 50 MHz in total).

Figure 6A:
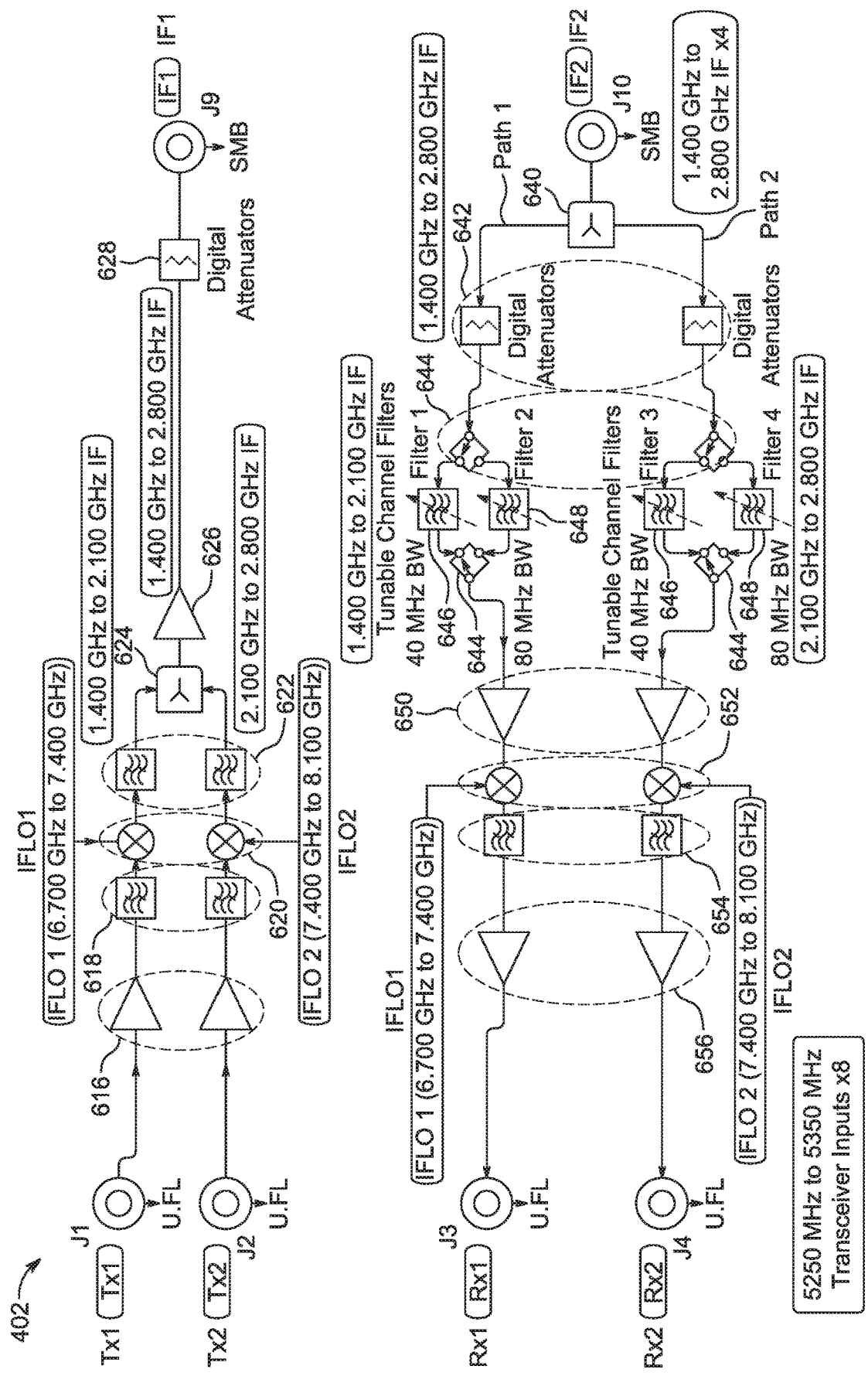
FIGS. 6A and 6B are block diagrams of a diplexer module for the endpoint node.
Figure 6B:
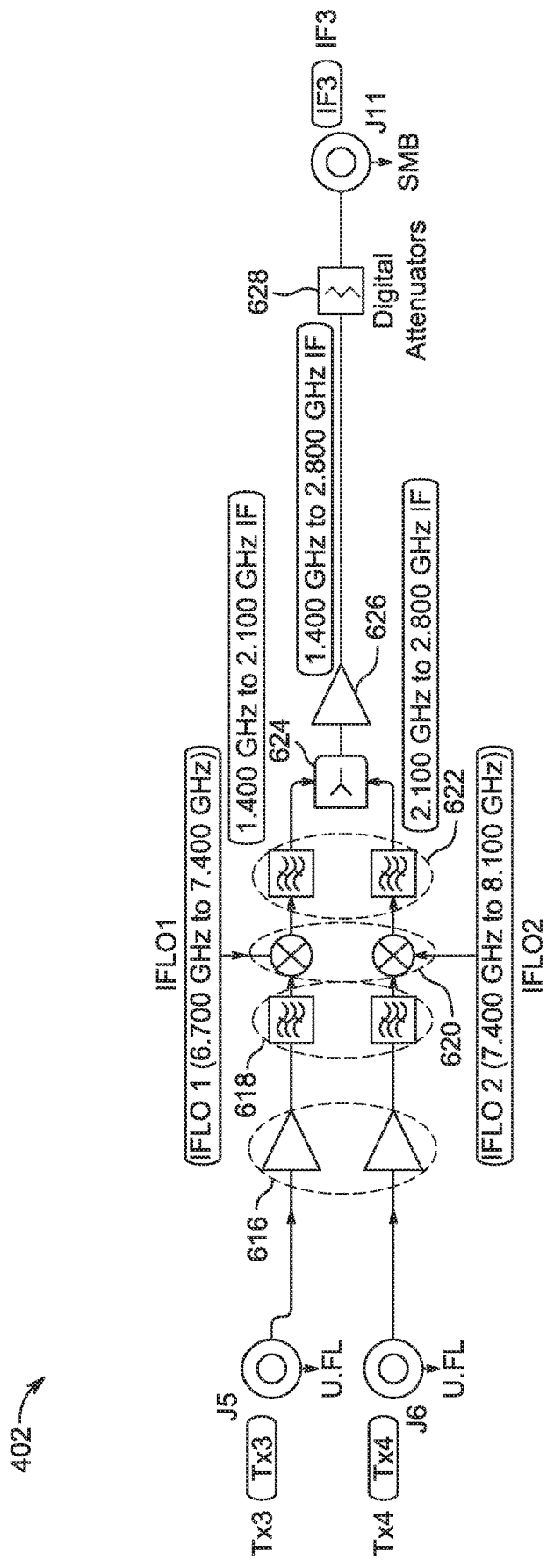
Figure 6B:
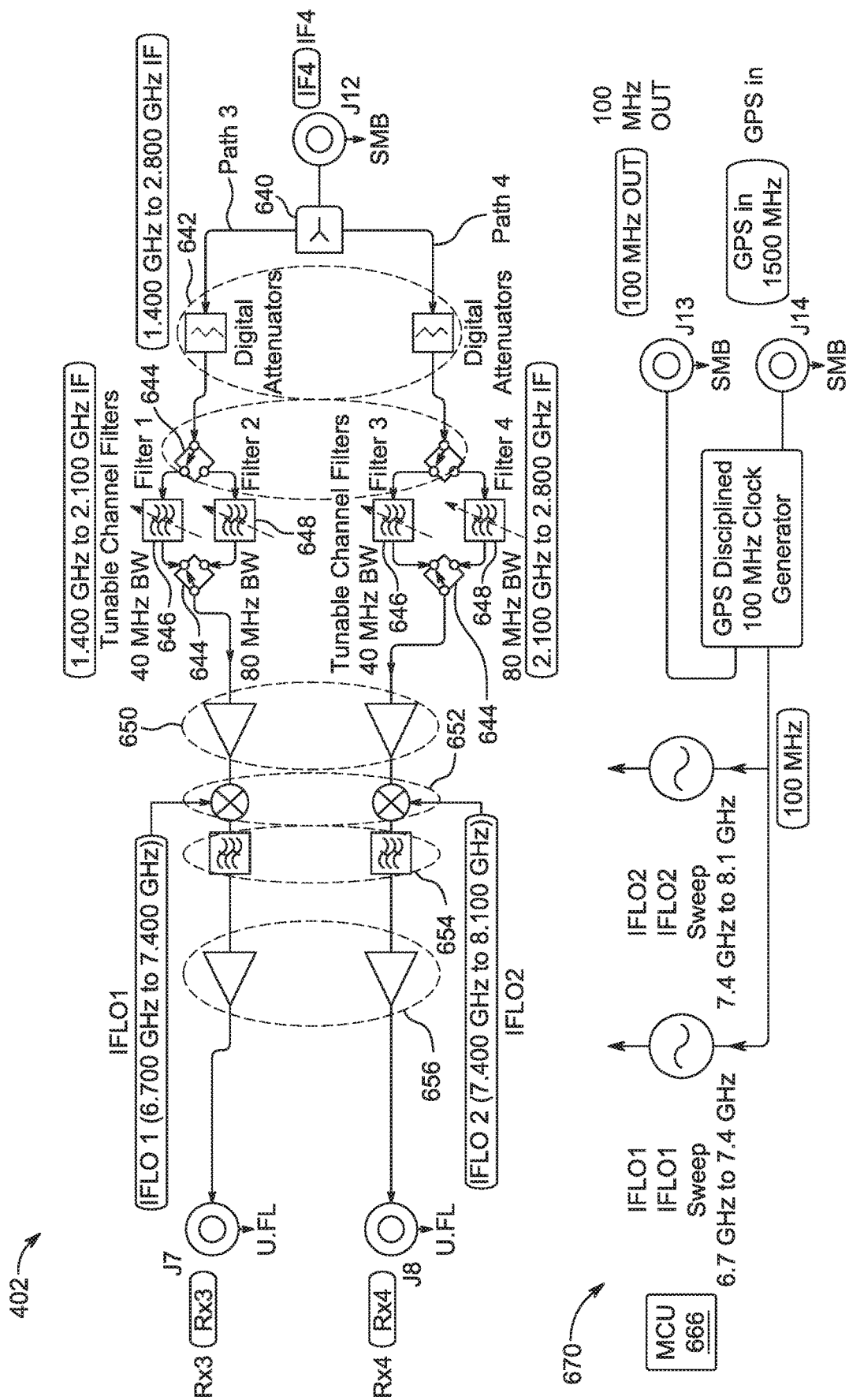

FIGS. 6A and 6B depict a block diagram of an exemplary embodiment of the diplexer module 402 of the MU 204. In the transmit direction, multi spatial stream WiFi signals (e.g., four RF signals—Tx1, Tx2, Tx3, and Tx4, in the 5 GHz WiFi band) are received from the internet WiFi chipset 410. These signals are down-converted using two local oscillator (LO) frequencies (IFLO1, IFLO2) and combined onto two signal streams (IF1, IF3). Tx1, Tx2, Tx3 and Tx4 have carrier frequencies in the 5 GHz band. They are mixed with IFLO1, IFLO2 respectively followed by combining to yield diplexed signals IF1, IF3 with frequencies at 1.4 GHz and 2.1 GHz.

In more detail, as shown in FIG. 6A, Tx1, Tx2 signals from the internet WiFi chipset 410 are amplified in respective amplifiers 616. They are then bandpass filtered by respective bandpass filters 618 to remove any out of band interference. Tx1, Tx2 are then respectively mixed with local oscillator (LO) frequencies (IFLO1, IFLO2) in the mixers 620. In some embodiments, IFLO1 operates at 6.7 to 7.4 GHz, and IFLO2 operates at 7.4-8.1 GHz. The outputs of the mixers 620 are filtered by respective bandpass filters 622. These bandpass filters 622 pass the difference components of the mixers 620.

A Y combiner 624 combines the outputs from the bandpass filters 622 to yield the signal IF1. A subsequent amplifier 626 and attenuator 628 adjust the level of the signal IF1. The attenuator 628 is used for automatic level control (ALC). There is programmable attenuation in each transmit (TX) path to provide the ALC function based on temperature and measured RF power from II-IF module 220. This function is performed by the local microcontroller unit MCU 666 (including direct control of the attenuators 628).

As shown in FIG. 6B, Tx3, Tx4 signals from the internet WiFi chipset 410 are similarly mixed and combined to produce IF3 using local oscillator (LO) frequencies (IFLO1, IFLO2) in the mixers 620. Attenuator 628 is similarly used for the ALC function.

These two streams IF1 and IF3 are transmitted using different polarizations for diversity. These streams are sent to the EHF module 220 for: i) up-conversion to high frequency signals, ii) amplification, and iii) wireless transmission to the aggregation node 102.

In the receive direction, two diplexed streams (IF2, IF4) are converted into multi spatial stream WiFi signals (e.g, four RF signals—Rx1, Rx2, Rx3 and Rx4) at the appropriate frequency for reception and decoding by the internet WiFi chipset 410. Each receive path includes a splitter 640 followed by two different band-pass filters 646, 648 followed by separate mixers 652.

Consider IF2 signal as an example. As shown in FIG. 6A, IF2 signal is received at the diplexer module 402. The signal ranges between 1.4-2.8 GHz in frequency. The signal is split in a Y splitter 640. Two digital attenuators 642 are provided to adjust each divided signal.

Switches 644 for each receive path are used depending on the mode of operation. For example, if the signal quality of the link between the aggregation node 102 and the subscriber node 104 is low, then more robust 40 MHz bandwidth channels are used. However, if the signal quality of the link is good/strong, then 80 MHz bandwidth modulation and channels are used. In other examples, 160 MHz channels are used. A 40 MHz bandwidth bandpass filter 646 is provided for each path. In addition, two 80 MHz bandwidth bandpass filters 648 are provided depending on the type of modulation used. The four switches 644 are set based on which of the two modulation modes is being used. The output from the selected bandpass filters for each path is amplified in two amplifiers 650.

The local oscillator (LO) frequencies (IFLO1, IFLO2) in the mixers 652 convert the 1.4-2.8 GHz IF2 signal to the 5250-5350 MHz frequencies that are expected by the Internet WiFi chipset 410. These 5 GHz frequencies are then provided on Rx1 and Rx2 through amplifiers 656.

A similar series of components 640, 642, 644, 646, 648, 650, 652, 654, and 656 convert IF4 into Rx3 and Rx4, as shown in FIG. 6B.

In some embodiments, the local oscillator (LO) frequencies (IFLO1, IFLO2) used by mixers 620, 652 are generated from the GPS carrier signals using a synthesizer 670 (shown in FIG. 6B) on the diplexer module 402. In one embodiment, a 1.5 GHz GPS signal is received from the EHF module 220. The GPS carrier is used to control/discipline a 100 MHz oscillator 407. This 100 MHz signal is used to synchronize the various LO signals used on the diplexer module 402 and the EHF module 220. In some embodiments, a GPS antenna (e.g., GPS antenna 403 of the diplexer module 402 or other GPS antenna provided at the EHF module 220) is included that receives the 1.5 GHz GPS carrier.

The diplexer module 402 provides two LO signals (IFLO1, IFLO2) frequency-locked to the 100 MHz reference signal. In one embodiment, one LO signal (e.g., IFLO1) is in the range of about 6.7-7.4 GHz, and the other LO signal (e.g., IFLO2) is equal to the first frequency plus 700 MHz (i.e., IFLO2 is in the range of 7.4-8.1 GHz). This can be realized in multiple ways including two fully independent synthesizers, as will be appreciated.

In some implementations, the programmable attenuators 642 in each RX path are controlled directly by the local MCU 666, under direction of central processing unit (CPU) of the modem module 404. The CPU of the modem module 404 uses RSSI (received signal strength indicator) information from the radio to make adjustments to RX gain.

In some embodiments, the microcontroller (MCU) 666 is used to handle the real-time management of the diplexer module 402, the EHF module 220, and Gimbal functions of the motors associated with the motor unit 222. In one implementation, the MCU 666 controls two servo motors associated with the motor unit 222. The motors are controlled in order to maximize the received signal strength RSSI of the high frequency signals from the aggregation nodes.

Figure 7:
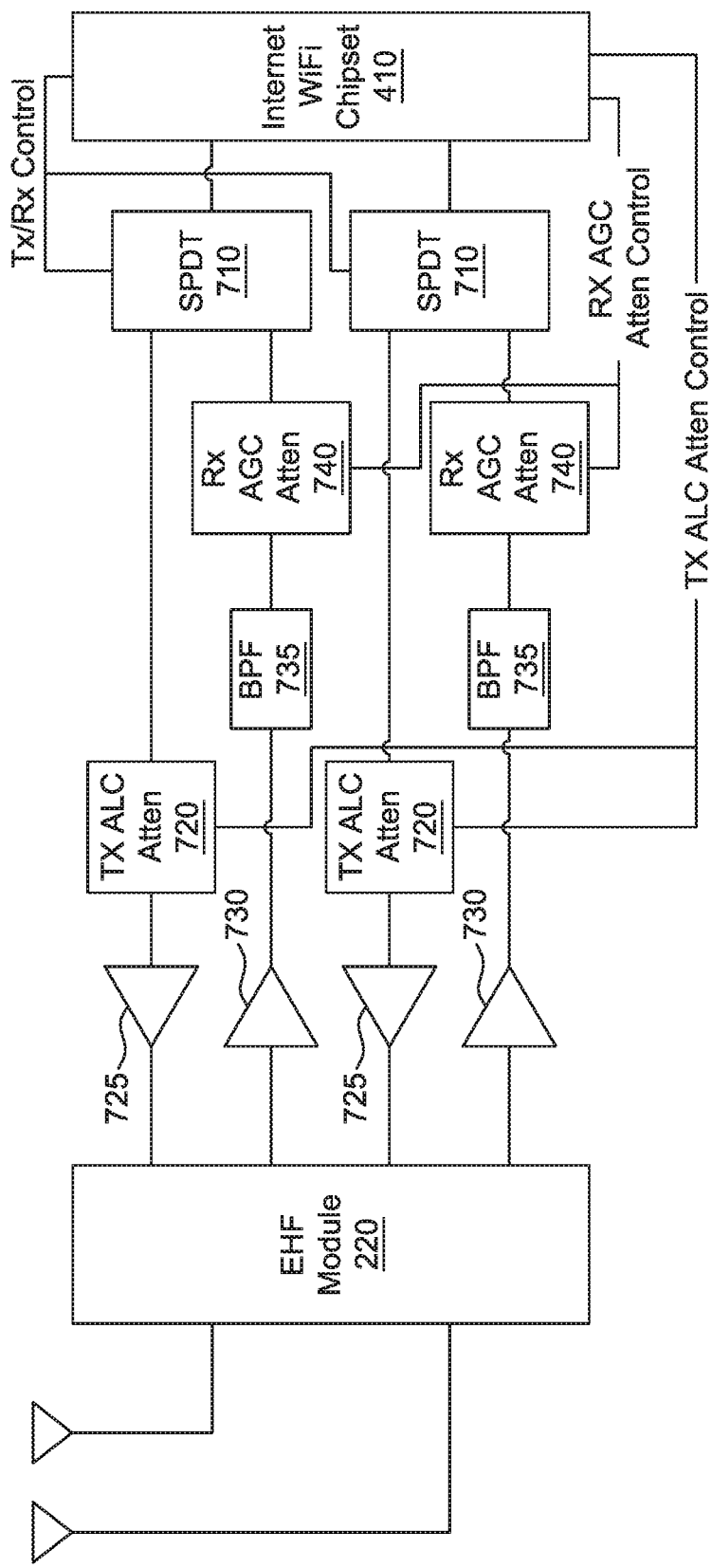
FIG. 7 is a block diagram that shows direct conversion between WiFi and high frequency signals at the endpoint node according to another embodiment.

FIG. 7 shows an embodiment where WiFi signals from the internet WiFi chipset 410/modem module 404 are directly communicated to the EHF module 220 without conversion to IF frequencies. On the transmit side, WiFi signals from a 2×2 WiFi 801.11 ac chipset are passed through an automatic level control (ALC) attenuator 720 and amplifier 725 prior to being communicated to the EHF module 220 for up-conversion to high frequency signals. On the receive side, at the EHF module 220, the received high frequency signals are down-converted to WiFi signals that can be decoded by the WiFi chip set 410. The WiFi signals from the EHF module 220 are amplified at amplifier 730. The amplified signals are passed through a band pass filter 735 and an automatic gain control (AGC) attenuator 740 prior to being communicated to the WiFi chipset 410. In some implementations, single pole double throw (SPDT) switches 710 enable transmission or reception control (whether radios are transmitting or receiving) based on Tx/Rx control signals from the WiFi chipset 410.

Figure 8A:
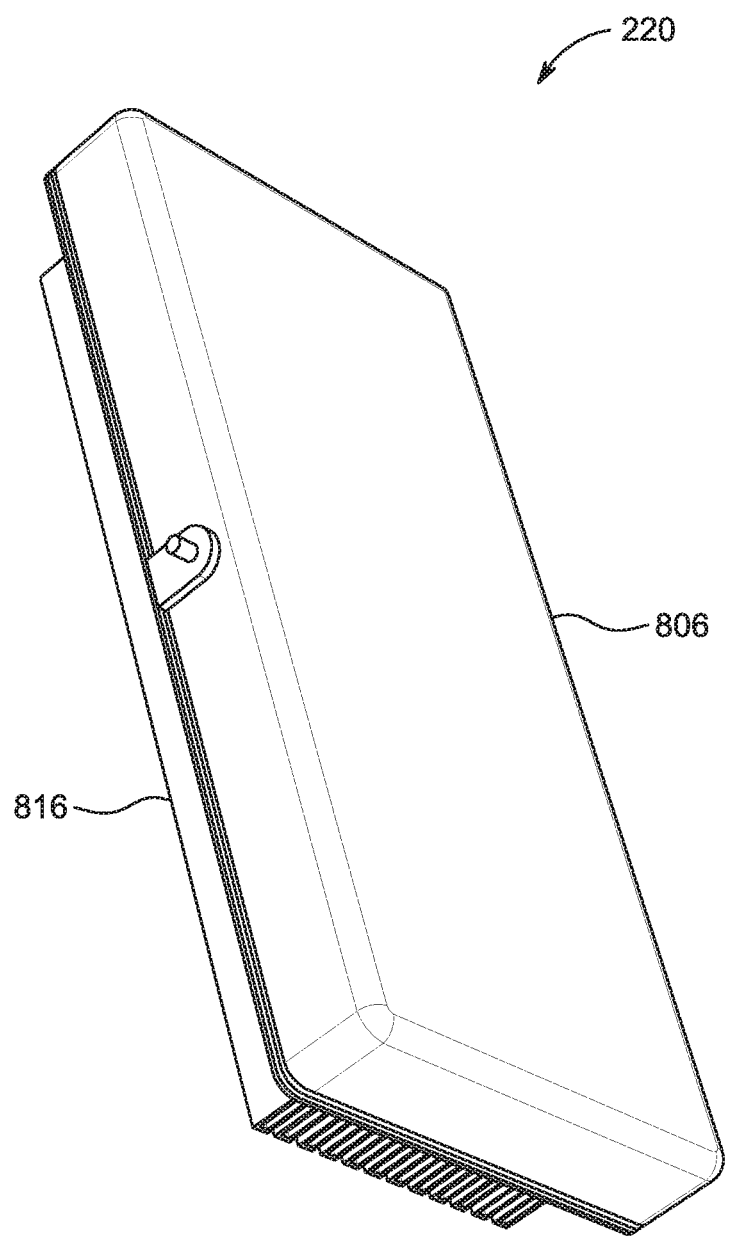
FIGS. 8A-8B are a perspective view and a perspective exploded view showing an extremely high frequency (EHF) module of the endpoint node.
Figure 8B:
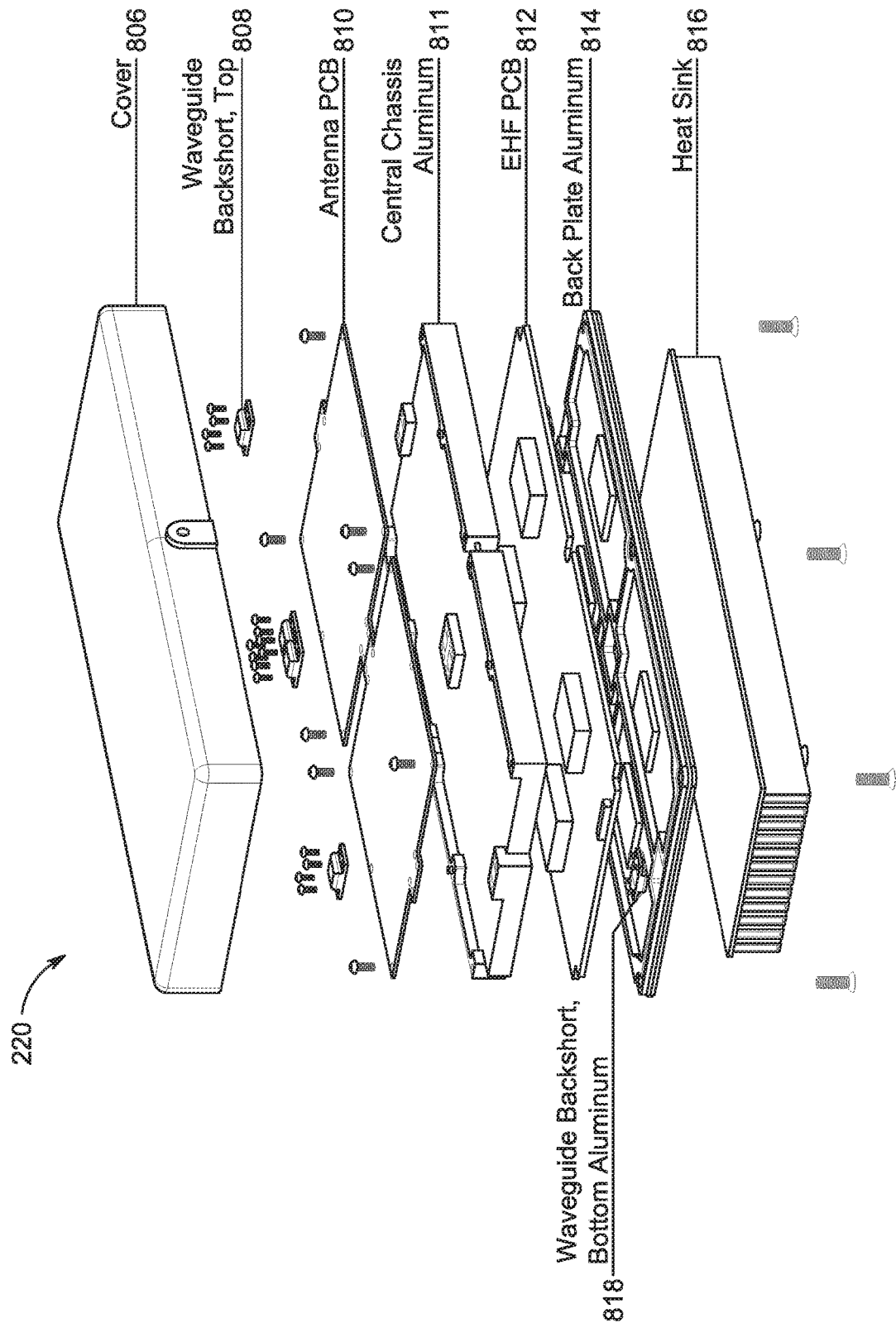

FIGS. 8A and 8B show exemplary views of the EHF module 220 of the ODU unit 202. The EHF module 220 includes components for frequency conversion between WiFi/IF frequencies and high frequencies, one or more power amplifiers, a high frequency LO generation unit (from 100 MHz), a GPS antenna, transmission power detectors, and/or temperature sensors.

The EHF module 220 manages the high frequency communications for the subscriber node 104. It contains transmit and receive antennas and all up and down frequency conversion circuitry. There are possibly two or three printed circuit boards (PCBs): antenna PCB(s)/module 810 and RF circuitry EHF PCB 812, as shown in FIG. 8B, in one example. These boards are integrated into a brick-like assembly that is placed in the ODU 202 and mounted on the servo controlled motor unit 222 to form a steerable antenna module.

As shown in FIG. 8B (from top to bottom of figure), the EHF module 220 assembly includes:
1. Cover 806 that is transparent to the frequencies.
2. Waveguide Backshort, Top 808.
3. antenna PCB(s)/module 810.
4. Central Chassis 811.
5. EHF PCB 812.
6. Waveguide Backshort, Bottom 818.
7. Back Plate 814.
8. Heat Sink 816.

The EHF PCB 812 is completely enclosed in an aluminum housing formed by the back plate 814 and the central chassis 811, except for provisions for cable entry. Connections between the antenna PCB(s)/module 810 and the UHF PCB 812 are accomplished using waveguide channels integrated into the central chassis component 811 as well as bottom aluminum backshorts 818 affixed to the bottom surface of the EHF PCB 812 and top aluminum backshorts 808 on the top surface of the antenna PCB(s)/module 810. The EHF PCB 812 contains all of the active circuitry used in the EHF module 506. The various circuits and their functions are described below in detail with respect to FIGS. 9A and 9B.

Some of the characteristics of one embodiment of the antenna PCB(s)/module 810 include the following:

Operating frequency: 38.6 GHz-40.0 GHz,

Number of ports: 4 (2 for vertical polarization/2 for horizontal polarization), and 3 dB beamwidth: 6 degrees (both in azimuth and elevation)

Figure 9A:
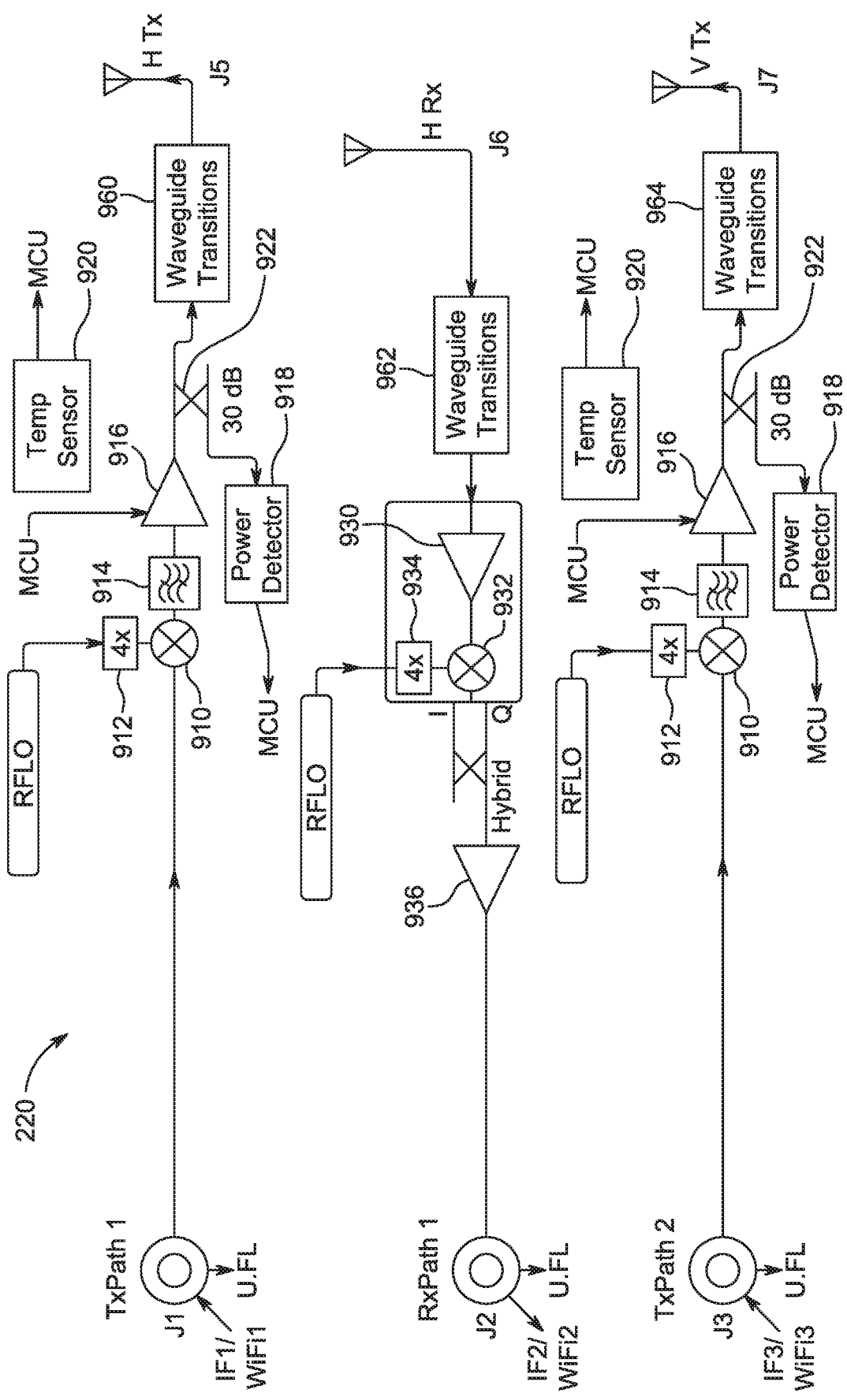
FIGS. 9A-9B are circuit diagrams of the EHF module of the endpoint node.
Figure 9B:
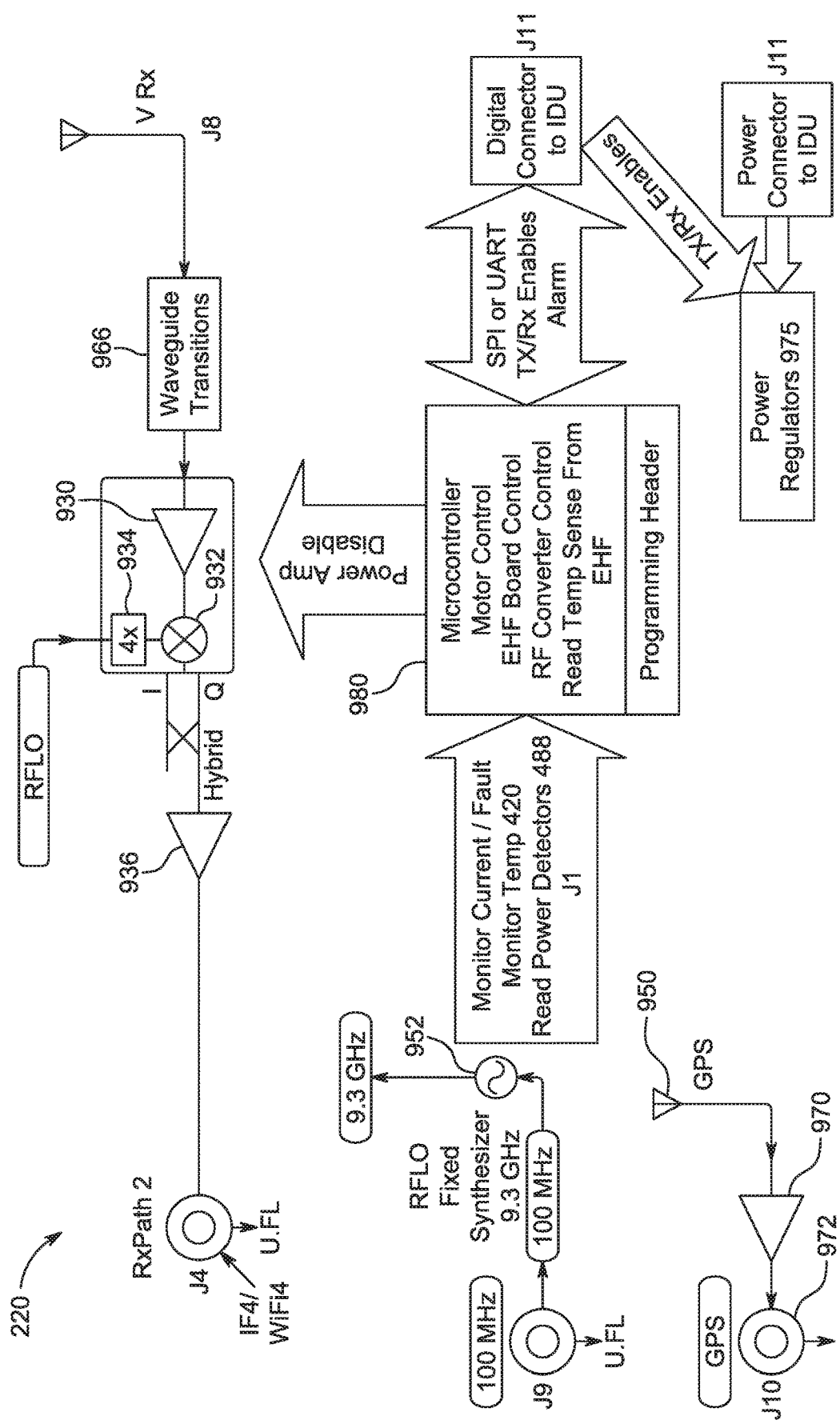

FIGS. 9A and 9B illustrate a block diagram depicting some of the components of the EHF module 220 implemented on the EHF PCB 812, for example.
1. Phase Locked Oscillator (PLO) or RFLO synthesizer 952 to create LO frequency signals/RFLO synthesizer signals (for example, RFLO at 9.3 GHz). In one embodiment, the 100 Megahertz signal received from the disciplined 100 MHz clock generator 407 is converted to the RFLO synthesizer signal by driving the RFLO synthesizer 952.
2. Two Tx paths with filtering (TxPath1, TxPath2).
3. Two Rx paths with image rejection (RxPath1, RxPath2).
4. Waveguide transitions 960, 964 to transmit antennas and waveguide transitions 962, 966 from the receive antennas.
5. Track and Hold Power Detectors 918 on the outputs of the power amps 916 to monitor Tx levels.
6. Power regulators 975 and/or inverters.
7. Microcontroller (MCU) 980 to monitor sensors, signal, and/or other circuits.
8. GPS antenna 950, GPS amplifier 970, and GPS signal pass-through 972 to the diplexer module 402.

The transmit paths (TxPath1, TxPath2), as depicted in FIG. 9A, correspond to two polarizations. Each transmit path receives an IF signal (e.g., IF1 or IF3 in FIGS. 6A and 6B) from the diplexer module 402. The IF signals are in the range of 1.4 GHz to 2.8 GHz. The IF signals are up-converted to high frequency signals (e.g., in a range of 38.6 GHz to 40 GHz) and amplified on the EHF PCB 812. After amplification, the signal waveguide transitions 960, 964 provide the signals to the antenna PCB(s)/module 810 via a short section of the waveguide.

Specifically, IF1 is received on to TxPath1. IF1 is mixed in a mixer 910 with RFLO at 9.3 GHz, which is frequency quadrupled, in multiplier 912 prior to mixing. The mixer output is amplified in amplifier 916. A power detector 918 detects the output power. The high frequency signal is then sent to the antenna PCB(s)/module 810 that transmits the high frequency signal with a horizontal polarization HTx.

Similarly, IF3 is received onto TxPath2. It is also mixed in a mixer 910 with RFLO at 9.3 GHz, which is frequency quadrupled in multiplier 912 prior to mixing. The mixer output is amplified in amplifier 916. A second power detector 918 measures output power. The high frequency signal is then sent to the antenna. PCB(s)/module 810 that transmits the high frequency signal with a vertical polarization VTx.

A temperature sensor 920 is placed in proximity to each of the transmit paths TxPath1, TxPath2. The MCU 980 reads the monitored temperature that can be used for automatic level control (ALC) functions.

Each high frequency transmit path (TxPath 1, TxPath2) has a directional coupler 922 located immediately after the final power amplifier 916. Each directional coupler 922 feeds the respective power detector 918 that converts the RF power to a DC voltage. The local MCU 980 performs ADC conversion on the two DC signals associated with each transmit path and calculates actual transmit power in dBm.

The two receive paths (RxPath1, RxPath2), as depicted in FIGS. 9A and 9B, correspond to the two polarizations. Each receive signal (e.g., in a range of 38.6 GHz to 40 GHz) associated with the receive path is received from the antenna PCB(s)/module 810 via waveguide transitions 962, 966. The receive signal passes through to an LNB for frequency down conversion. The resulting IF signal (e.g., in a range of about 1.400 to 2.800 GHz) is transmitted over coax to the diplexer module 402.

In more detail, the HRx signal (i.e., high frequency signal with horizontal receive polarization) associated with RxPath1 is amplified in an amplifier 930. A mixer 932 mixes the signal with RFLO at 9.3 GHz which is frequency quadrupled in multiplier 934 prior to mixing. The resulting signal is sent through amplifier 936.

Similarly, the VRx signal (i.e., high frequency signal with vertical received polarization) associated with RxPath2 in amplified in amplifier 930. Mixer 932 mixes the signal with RFLO at 9.3 GHz which is frequency quadrupled in multiple 934 prior to mixing. The resulting signal is sent through amplifier 936.

In some embodiments, the signals obtained after amplification via amplifier 936 in the two receive paths (RxPath1, RxPath2) correspond to the IF2, IF4 signals, depicted in FIGS. 6A and 6B, that are transmitted to and received by the diplexer module 402.

The local MCU 980 performs management and status checking of the various components of the EHF module 220. The MCU 980 measures RF Transmit power via the power detectors 918. In particular, two RF_POWER analog voltages from the power detectors 918 are measured.

A serial (UART) connection is provided to the diplexer module 402 in the illustrated example. The MCU 980 detects, for each transmit path, the EHF temperature using temperature sensors 920. The temperature information (and/or the power measurement information) can be used by the diplexer module 402 to implement the automatic level control (ALC) via the programmable attenuators 628 of the diplexer module 402.

The MCU 980 can also manage the TX_ENABLE signal from the internet WiFi chipset 610. The MCU 980 also monitors the synthesizer operation of the RFLO synthesizer 952 via a PLL Lock Status (digital input).

The local RFLO synthesizer 952 is synchronized to a 100 MHz reference signal (which, in turn is GPS disciplined). The RFLO synthesizer signal is used for all four mixers 910, 932 (two on the transmit paths and two on the receive paths) found on the EHF PCB 812.

The EHF PCB 812 has local voltage regulators and a single DC input voltage. Two power control inputs are provided to the EHF PCB 812. These inputs are used to power down the transmitters and/or receivers during periods when they are not needed (e.g., as decided by an outside controller).

In some implementations, each transmit path receives WiFi signals (e.g., WiFi1 and WiFi3) directly from the internet WiFi chipset 410 as described in FIG. 7. In this scenario, the WiFi signals (e.g., in a range of 5250-5350 MHz) are up-converted to high frequency signals (in the range of 38.6 GHz to 40 GHz) and amplified on the EHF PCB 812. In particular, on the transmit side, WiFi signals (WiFi1, WiFi3) are mixed in respective mixers 910 with RFLO signals (having an appropriate frequency for WiFi to high frequency conversion), which are frequency quadrupled, in multiplier 912 prior to mixing. The mixer outputs are amplified in respective amplifiers 916. The respective high frequency signals (e.g., in a range of 38.6 GHz to 40 GHz) are then sent to the antenna PCB(s)'module 810 that transmits the high frequency signals with corresponding horizontal and vertical polarizations HTx, VTx.

On the receive side, the high frequency signals associated with the two polarizations are received from the antenna PCB(s)/module 810. These high frequency signals (e.g., in a range of 38.6 GHz to 40 GHz) are down-converted to WiFi signals (e.g., in a range of 5250-5350 MHz) without IF conversion. In particular, the high frequency signals associated with the two receive paths (RxPath1, RxPath2) are amplified in respective amplifiers 930 and mixed in respective mixers 932 (where the signals are mixed with RFLO signals having an appropriate frequency for high frequency to WiFi conversion). The resulting signals are amplified in respective amplifiers 936 prior to communication to the internet WiFi chipset 410.

Figure 10B:
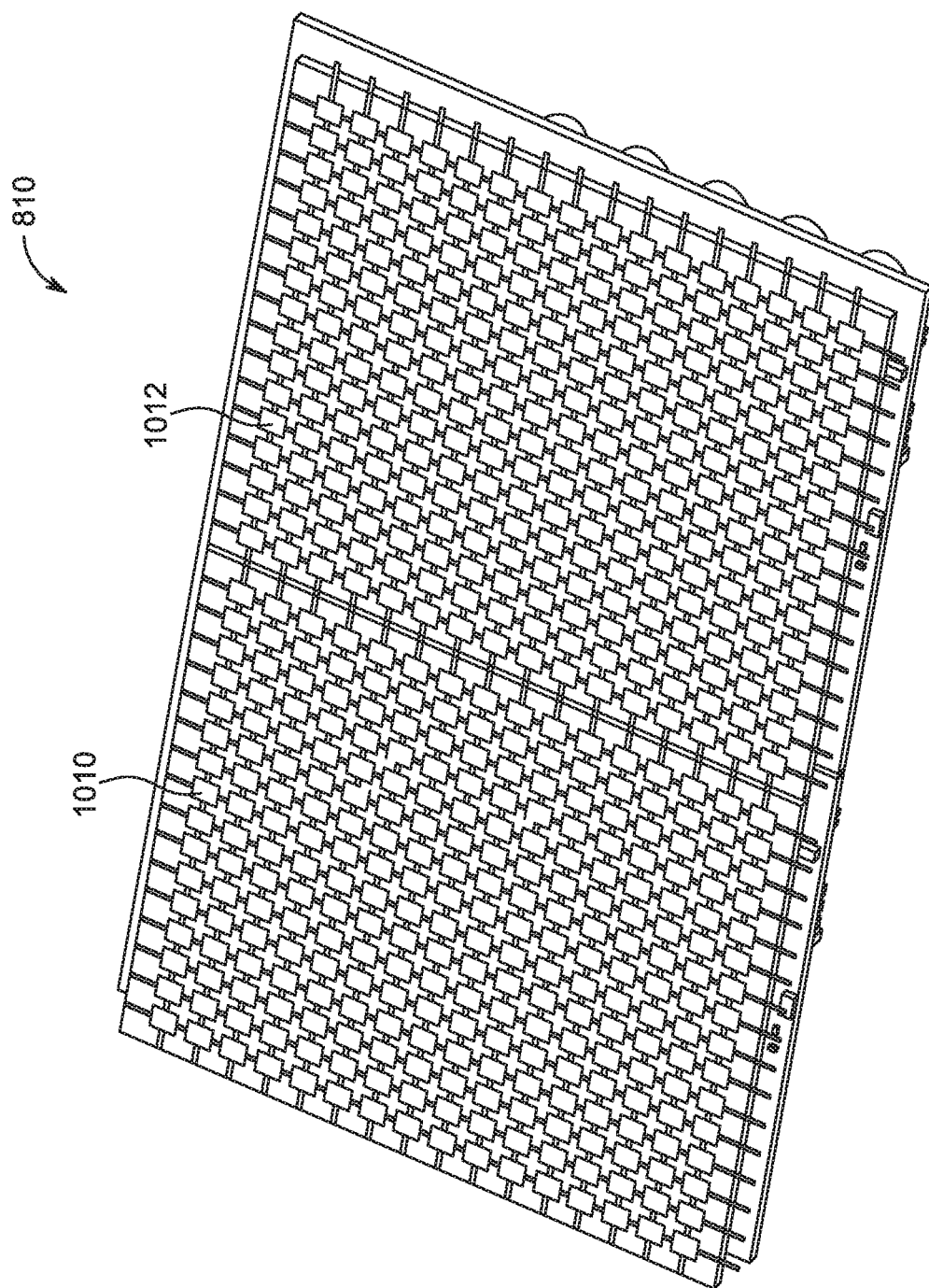

FIGS. 10A and 10B depict exemplary patch antenna array modules 810.

FIG. 10A shows a first embodiment. Here, two 16×16 dual polarized serially fed patch array antennas 1010, 1012, on respective circuit boards, are placed side by side. The antenna module 810 also includes the GPS antenna 950.

The array columns of the patch array antennas 1010, 1012 can be excited via a feed network (which is not shown in the FIG. 10A). The overall size of printed circuit board module is approximately 80×185 mm. The antenna elements of each 16×16 patch array antenna 1010, 1012 are printed on a substrate and the antenna output terminals are waveguide transitions (e.g., waveguide transitions 960-966 depicted in FIGS. 9A and 9B).

FIG. 10B shows a second embodiment of the antenna module 810. Here, the two 16×16 dual polarized serially fed patch array antennas 1010, 1012 integrated on a single board substrate 1014 within the module 810.

Figure 11A:
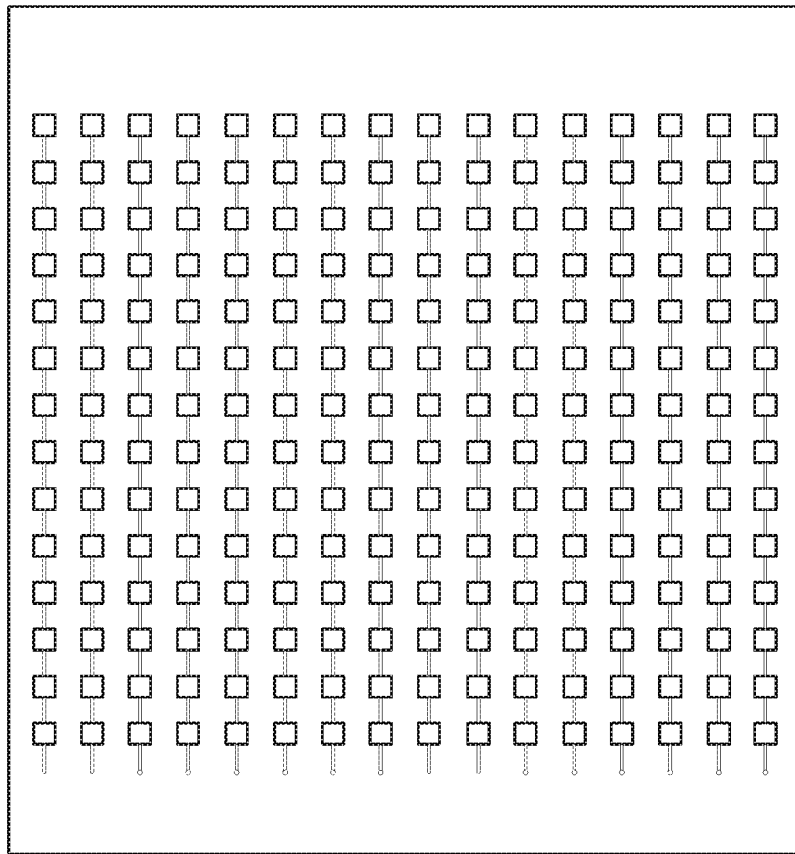
FIG. 11A shows another example of a patch antenna array for the EHF module of the endpoint node.

FIG. 11A shows another example of a patch array antenna 1010, 1012.

Figure 11B:
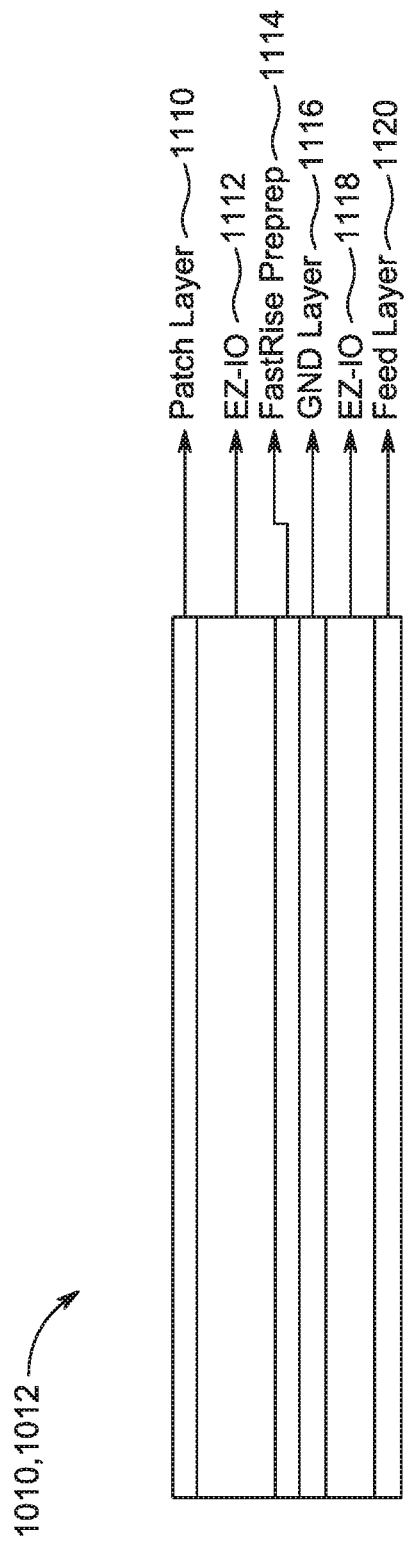
FIG. 11B is a cross-sectional view of a patch antenna for the EHF module.

FIG. 11B shows a cross-sectional view of exemplary material layers of the patch array antennas 1010, 1012. The topmost patch layer 1110 is patterned with antenna patch elements of the patch array antennas 1010, 1012. The copper weight utilized for the patch layer 1110 is 0.5 ounce (oz) copper. A ground layer 1116 is sandwiched between two dielectric layers 1112 and 1118. The dielectric layer 1112 has 20 mils thickness and the dielectric layer 1118 has 5 mils thickness. The copper weight utilized for the ground layer 1116 is 0.5 oz copper. A prepreg layer 1114 (e.g., a fastRise™ prepreg of 1.9 mils thickness) is provided between the dielectric layer 1112 and the ground layer 1116 to eliminate differential skew. A feed layer 1120 includes the feeding network/feed lines of the patch array antennas 1010, 1012. The copper weight utilized for the feed layer 1120 is 0.5 oz copper.

Figure 12A:
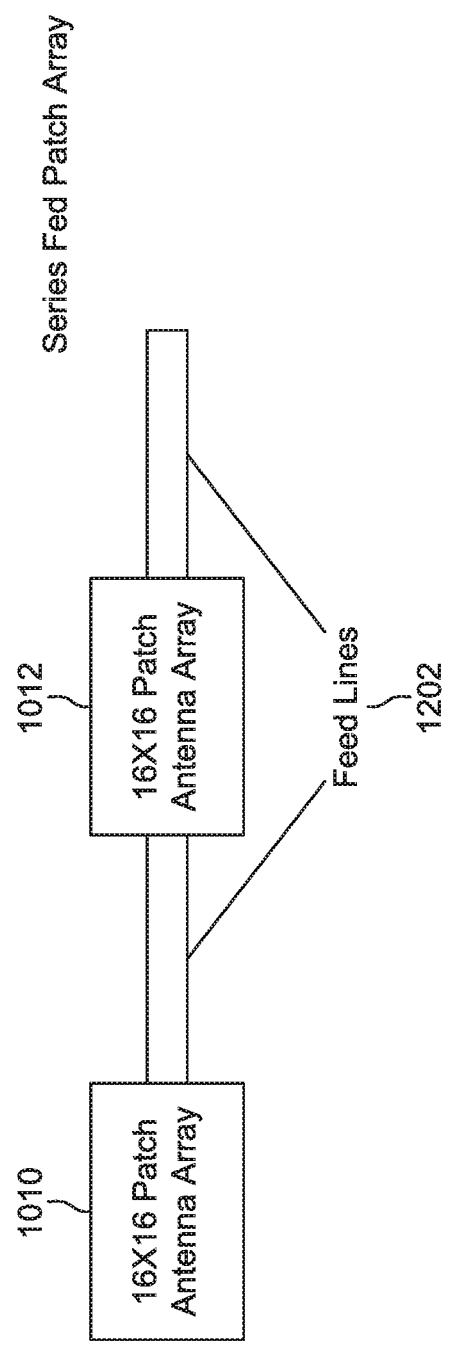
FIGS. 12A-12B show different feeding techniques for the patch antenna arrays at the endpoint node.

For example, FIG. 12A depicts two 16×16 patch array antennas 1010, 1012 being fed using a feeding network comprising feed lines 1202 in series with antenna patch elements.

Figure 12B:
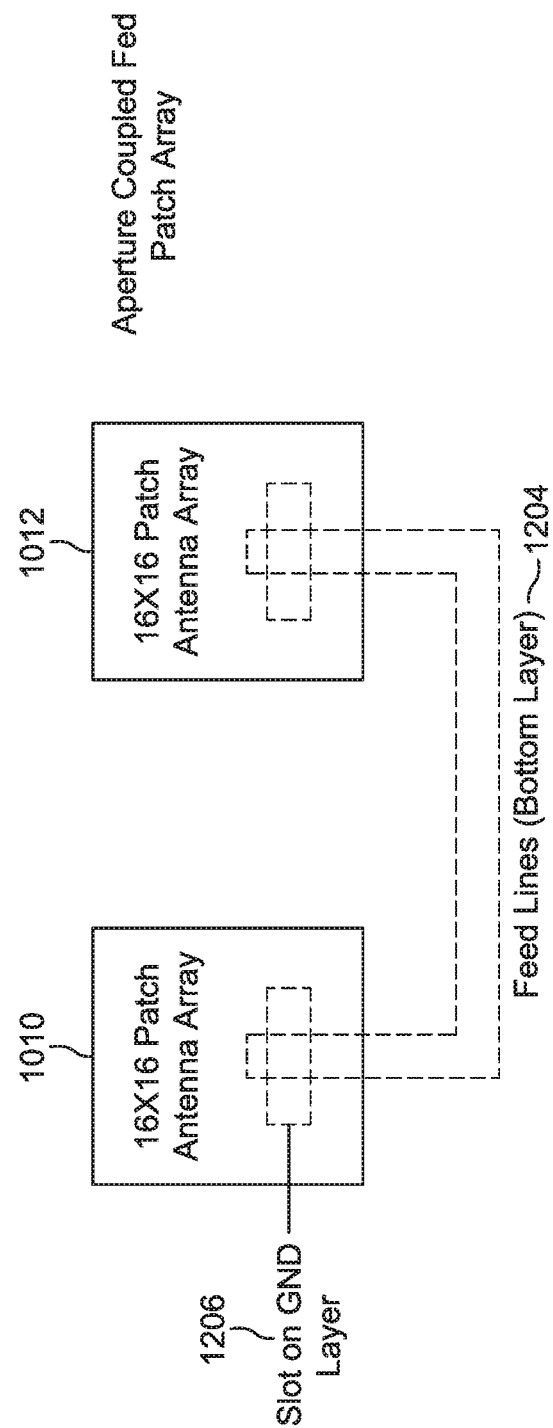

FIG. 12B depicts two 16×16 patch array antennas 1010, 1012 being fed using an aperture coupled feeding network such that fields on the feed lines 1204 (bottom layer) couples to the slots 1206 on the ground layer 1116 and then couples to the antenna patch elements on the patch layer 1110.

Figure 13:
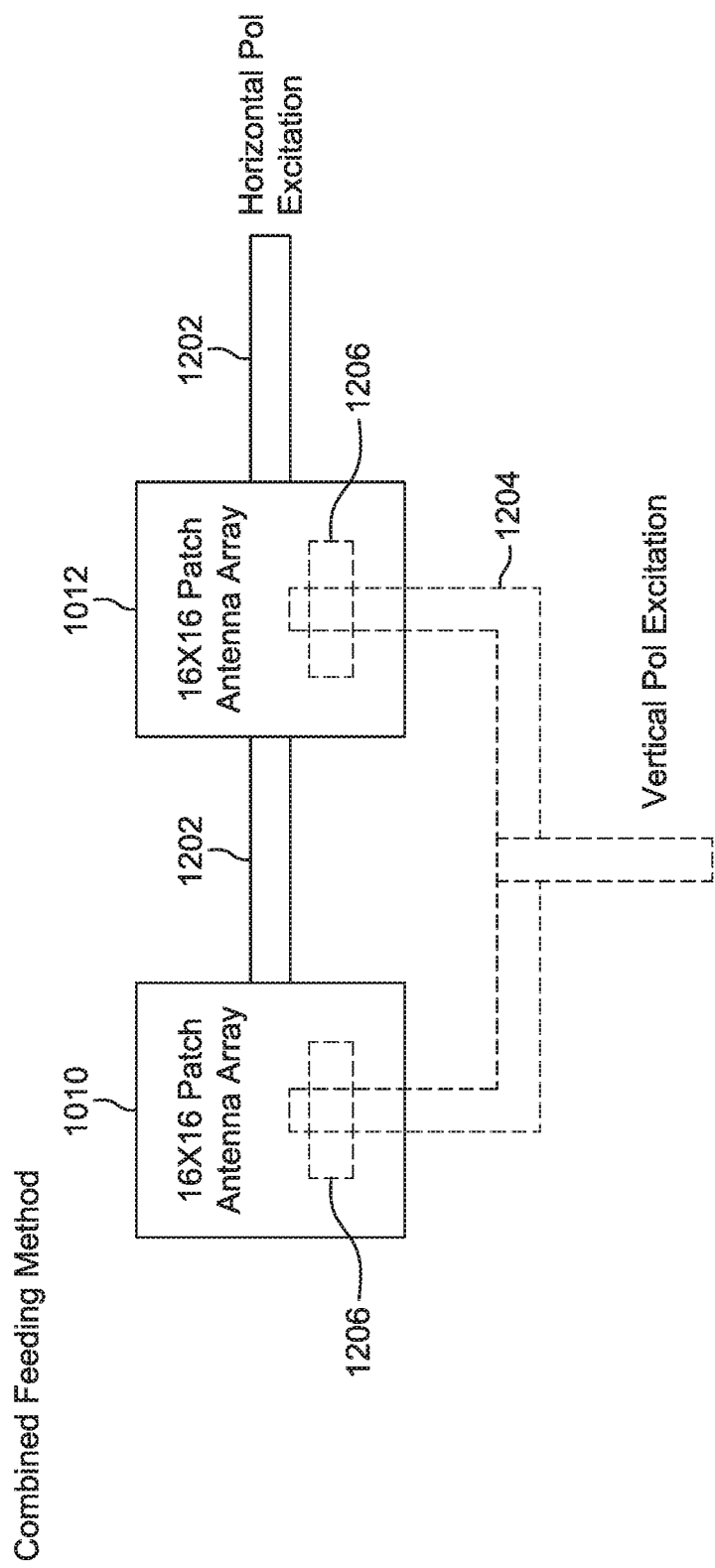
FIG. 13 shows a combined feeding technique for the patch antenna arrays at the endpoint node.

FIG. 13 shows the configuration in which the above two feeding techniques of FIGS. 12A and 12B are combined to excite vertical and horizontal polarized waves simultaneously for improved isolation. For example, the combined feeding technique at the EHF module 220/antenna PCB 810 can be used to transmit high frequency signals with horizontal polarization HTx and vertical polarization VTx, simultaneously from the antennas 1010, 1012.

Figure 14A:
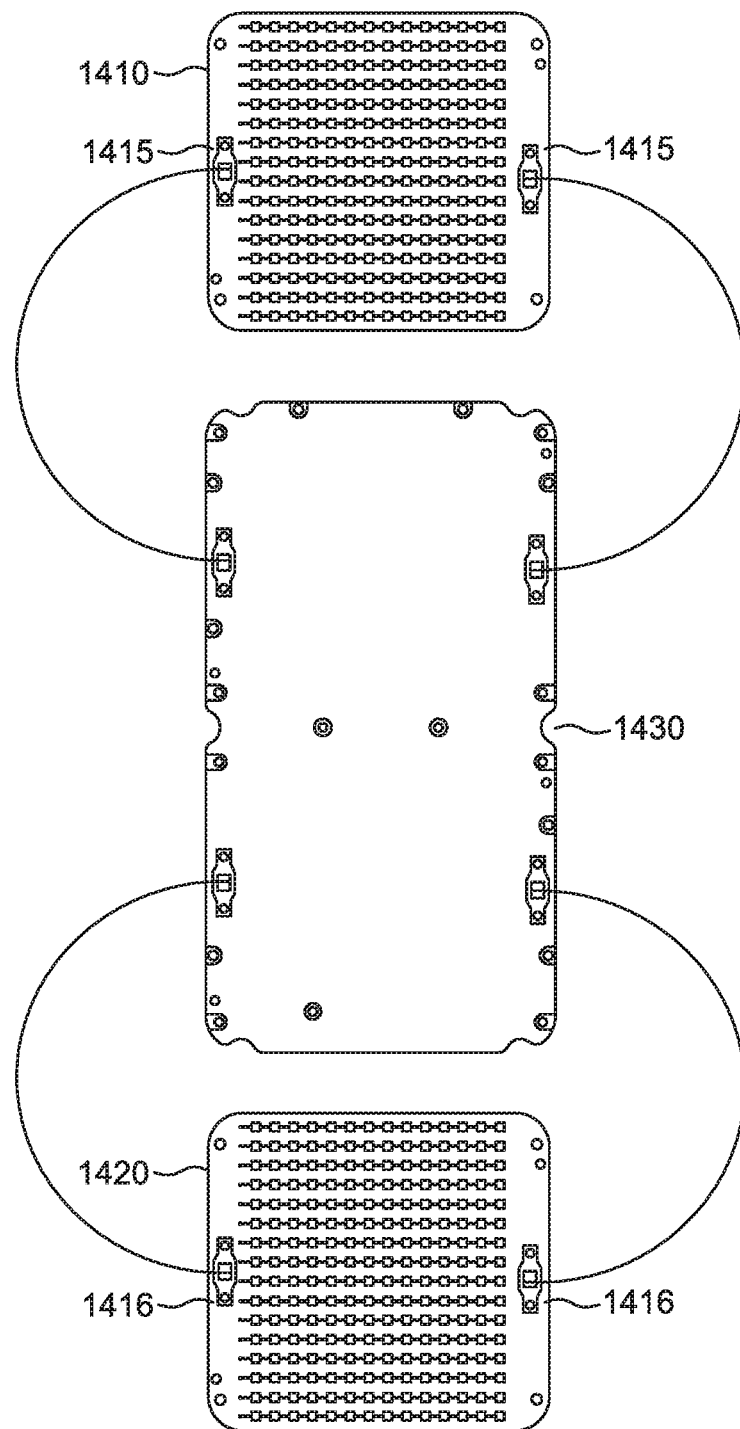
FIGS. 14A-14B are schematic drawings illustrating techniques for coupling patch antenna arrays at the multiple dwelling unit endpoint node.
Figure 14B:
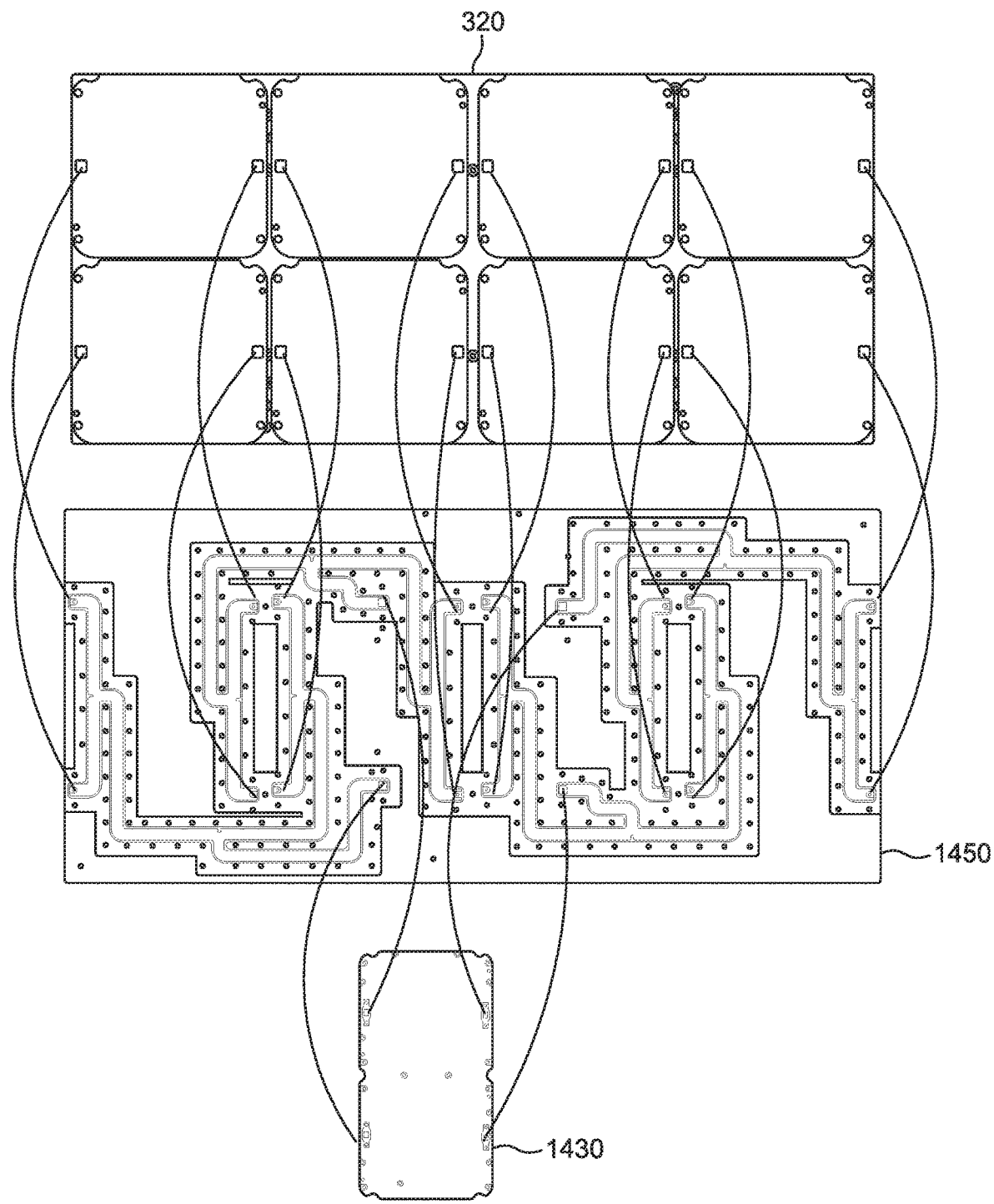

FIGS. 14A and 14B illustrate embodiments for coupling patch antenna arrays 320 (as shown in FIG. 3B) for a MDN (e.g., MDNa-1) of a MDU 106-1, for example.

FIG. 14A illustrates two patch antenna arrays 1410, 1420, where each patch antenna array has two polarization inputs/ports 1415, 1416. The ports 1415, 1416 of the two patch antenna arrays 1410, 1420 are coupled to a feed plate 1430. FIG. 14B illustrates a mechanism for connecting a small antenna with the big antenna using a distribution plate. Ports of a feed plate 1430 (for the two patch antenna arrays) are coupled to a distribution plate 1450. The distribution plate 1450 splits/combines each port by 4 and routes to a larger array. In particular, the outputs of the distribution plate 1450 couple to an array of 8 patch antenna arrays 320. Each port of the 8 patch antenna arrays 320 is coupled to the distribution plate 1450.

Figure 15A:
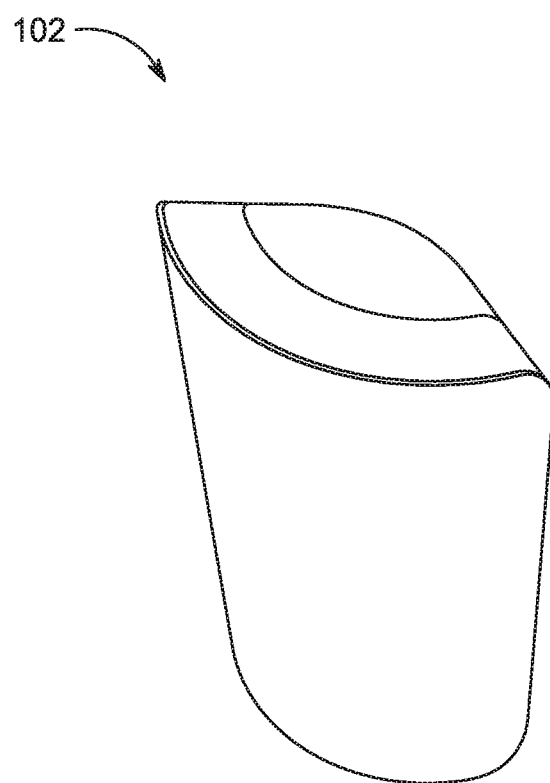
FIGS. 15A-15B are perspective views showing sector head of the aggregation node.
Figure 15B:
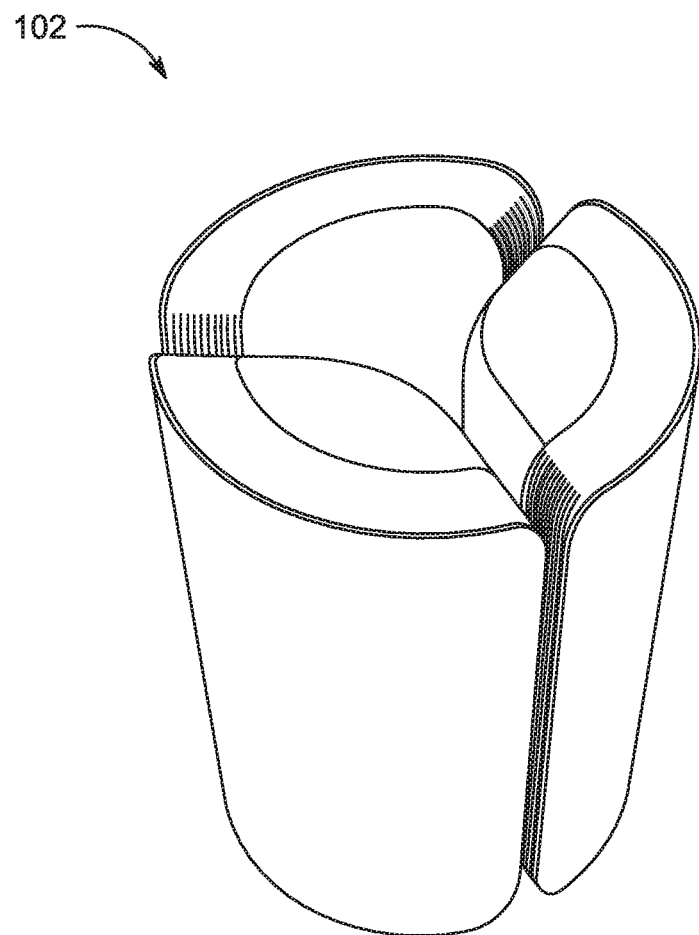

FIGS. 15A and 15B illustrate renderings of sector heads of the aggregation node 102. In particular, FIG. 15A illustrates a 120-degree sector head aggregation node 102, and FIG. 15B illustrates a 3-sectorhead aggregation node 102 (without mounting hardware). The aggregation node 102 can be located on a roof top or other vertical assets or locations suitable for transmitting and receiving high frequency signals to and from multiple subscriber nodes 104.

In general, the aggregation nodes 102 are installed at locations similar to where cellular phone base station antennas are installed. Preferably, this would be a high point in a city or town or neighborhood. This point would provide open line-of-sight or near open line-of-sight path to each of the subscriber nodes 104.

In still another embodiment, the aggregation nodes 102 are mounted on top of telephone poles at the neighborhood level. In contrast, in cities, the aggregation nodes 102 in some cases are installed on tall buildings within neighborhoods. In the case of apartment buildings and possibly multiple apartment buildings, the aggregation nodes 102 can be positioned to have good line of sight access down streets so that there would be line of sight paths to subscriber nodes 104 installed as window units in each apartment in large apartment buildings.

Figure 16:
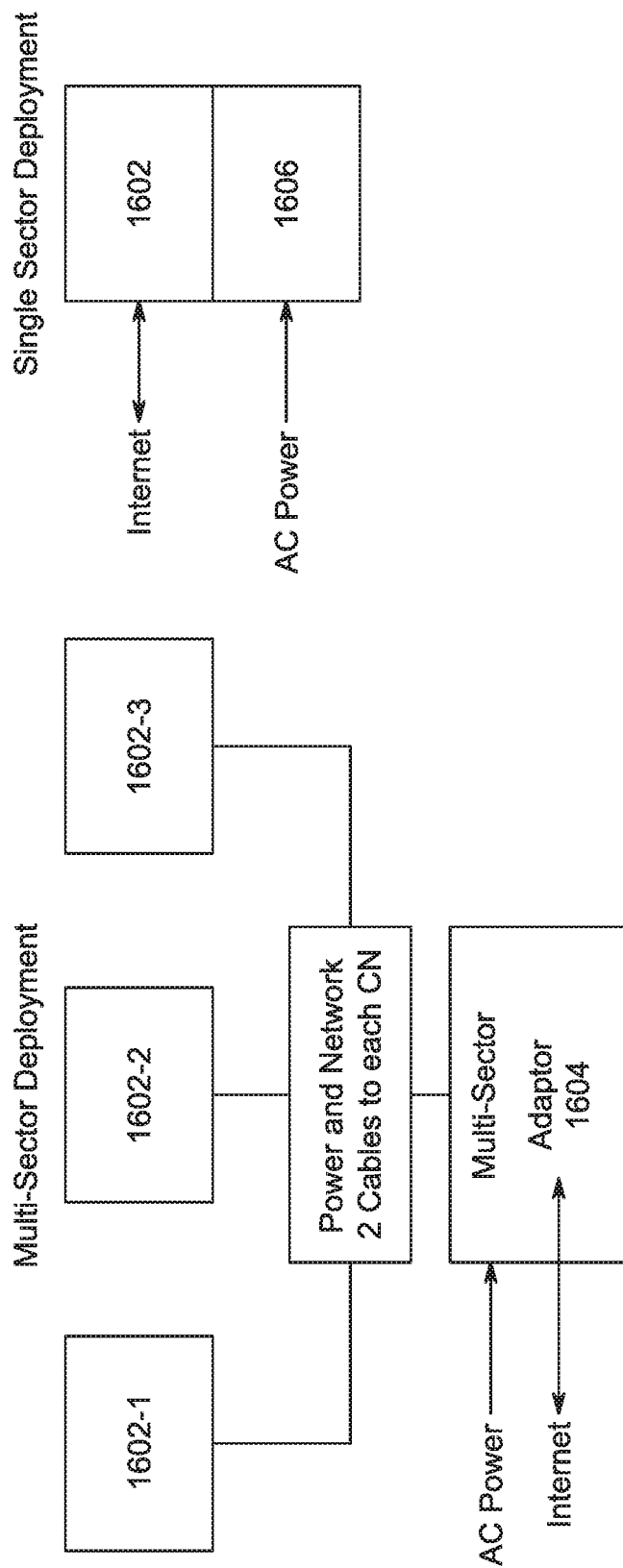
FIG. 16 is a block diagram showing two deployment examples for the aggregation node.

FIG. 16 illustrates two deployment examples for the aggregation node 102. The first example corresponds to a multi-sector deployment for the aggregation node 102 and the second example corresponds to a single sector deployment for the aggregation node 102. In either deployment example, the sector head(s) 1602 contains the bulk of the circuitry and devices that are used in the aggregation node 102, which are provided in an enclosure. For example, the sector head(s) 1602 can include RF circuitry, modern circuitry, networking circuitry, DC power input, small form-factor pluggable modules (SFP+, SFP) and RS232 ports.

The multi-sector deployment of the aggregation node 102 illustrates three sector heads 1602-1, 1602-2, and 1602-3 coupled to a multi-sector adaptor 1604. Power and network cables are run between each sector head 1602-1, 1602-2, 1602-3 and the multi-sector adaptor 1604. In some embodiments, the multi-sector adaptor 1604 provides power and networking support to two or more sector heads. The multi-sector adaptor 1604 functions as a power/network aggregator for the sector heads 1602-1, 1602-2, and 1602-3. The multi-sector adaptor 1604 includes AC power input, DC power output, and small form-factor pluggable modules (e.g. SFP+ for the Internet and sector heads, and SFP for service).

In the single-sector deployment, a single sector head 1602 is coupled to a single sector adaptor 1606 that provides power to the single sector head 1602.

Figure 17:
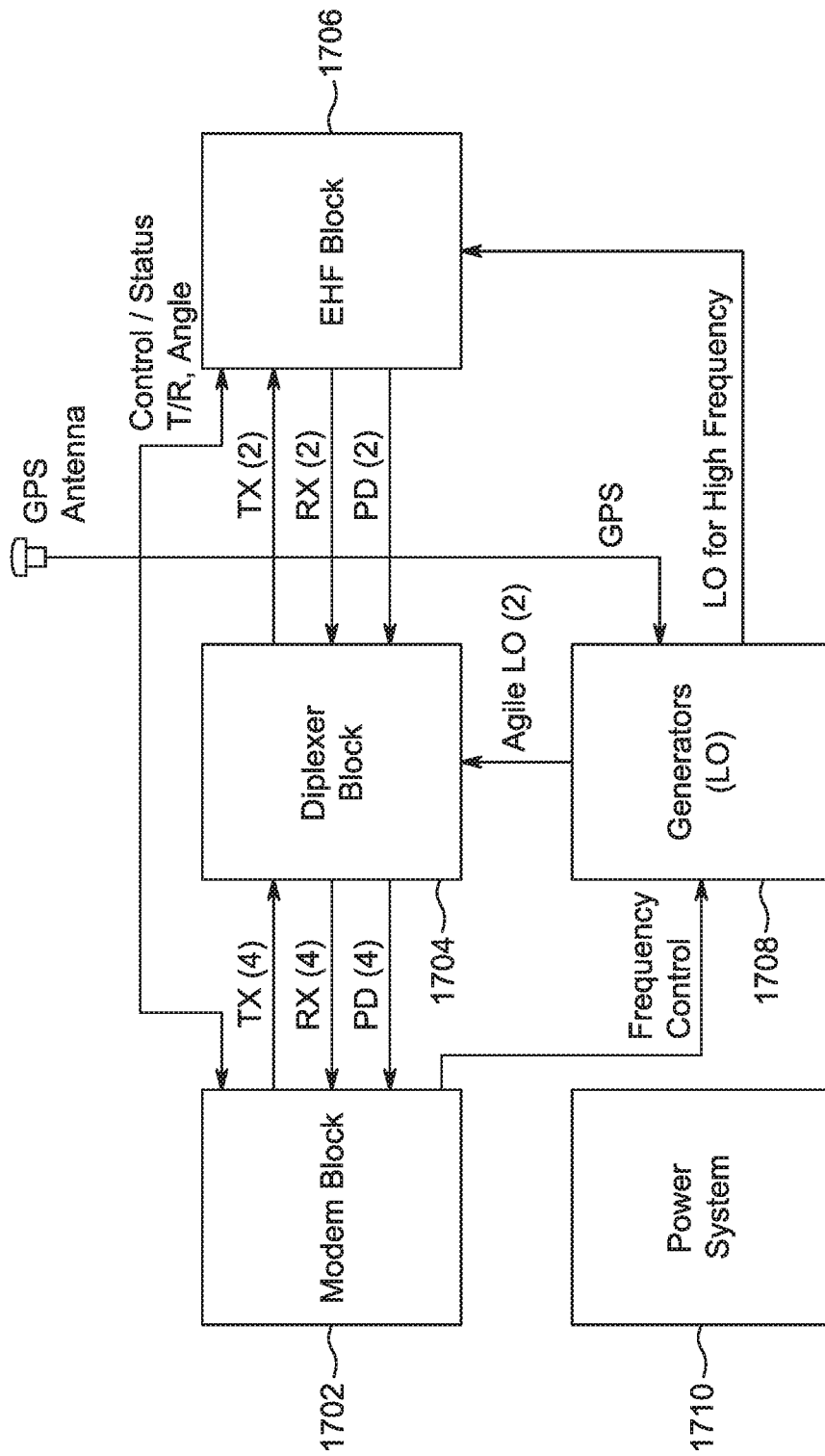
FIG. 17 is a block diagram showing components of a sector head of the aggregation node.

FIG. 17 depicts components of an exemplary sector head 1602 in more detail. The sector head 1602 includes circuitry for performing conversions between i) WiFi and IF frequencies, and ii) IF and high frequencies. In particular, the sector head 1602 includes the following components and functions:

1) SH modem block 1702 includes 802.11ac radios (transceivers) chipsets, network processor(s), network interfaces, and system control circuitry.

2) SH diplexer block 1704 includes circuitry for performing up/down frequency conversion (i.e., WiFi to IF conversion and vice versa), duplexing, and filtering. The SH diplexer block 1804 also contains a LO network for distributing LO signals.

3) SH RIF block 1706 includes high frequency up/down converters (for performing IF to high frequency conversion and vice versa), beam forming network, RF switches, power amplifiers, LNBs, antennas, and a LO network for distributing LO signals.

4) SH LO generators block 1708 include high fidelity clock sources for up/down frequency conversion, where a GPS carrier is used to discipline a 100 MHz oscillator. The SH LO generators 1708 includes 3 clock sources, 3 agile oscillators and 1 fixed oscillator. The SH LO generators block 1708 generates IFLO signals for WiFi—IF conversion and RFLO signals for IF—high frequency conversion.

5) SH power system 1710 that includes DC power supplies and filtering as required for the other component blocks.

Figure 18:
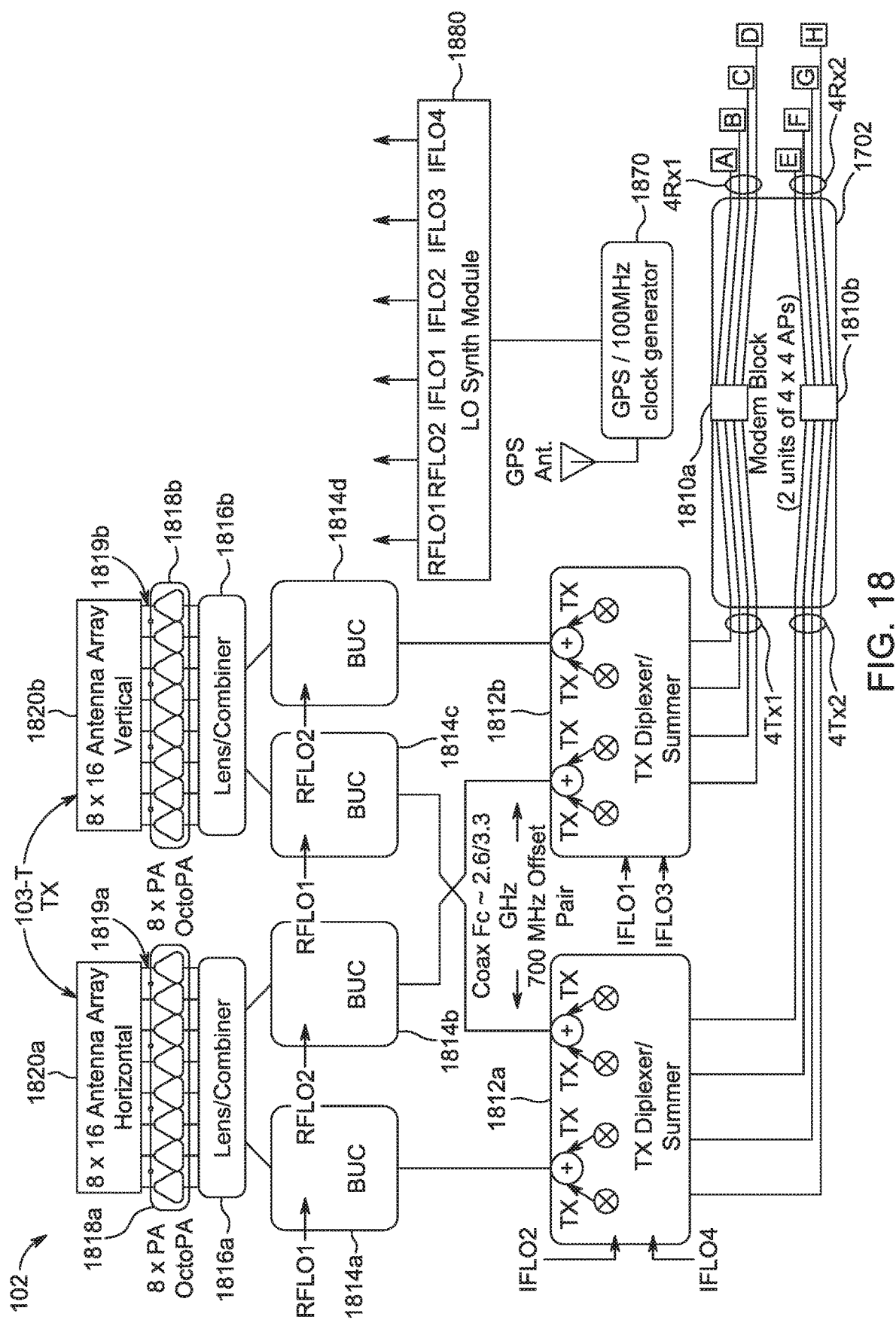
FIG. 18 is a schematic diagram for the aggregation node of a first embodiment.
Figure 18:
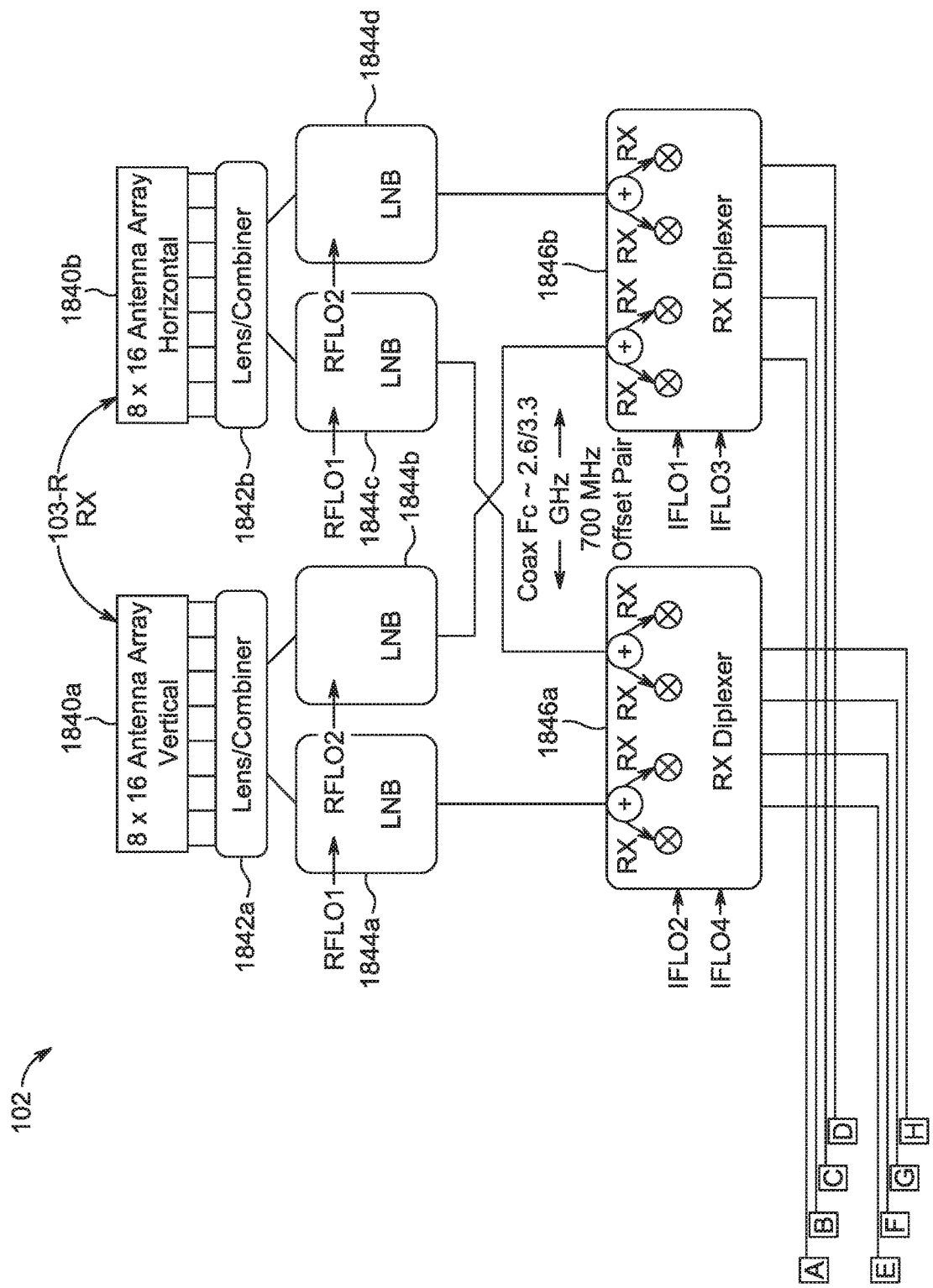

FIG. 18 illustrates an exemplary schematic for the aggregation node 102 that utilizes the phased array antenna system 103T, 103R to communicate with multiple subscriber nodes 104, where the phased array antenna system 103 divides an area of coverage into multiple subsectors. This aggregation node 102 uses a frequency plan as discussed in connection with FIG. 5.

The embodiment leverages multiuser MIMO WiFi chipsets (mu-MIMO) that implement the IEEE 802.11ac version of the standard and follow-on versions. Multi-user MIMO (mu-MIMO) relies on spatially distributed transmission resources. In particular, mu-MIMO WiFi chipsets encode information into and decode information from multi spatial stream WiFi signals associated with multiple users.

Considering the transmission side/path, data to be transmitted (e.g., data from a fiber coaxial backhaul) is provided to two 4-port mu-MIMO WiFi chipsets 1810a, 1810b. These chipsets are implemented on a modem board at the SH modem block 1702.

The WiFi chipsets 1810a, 1810b produce eight 5 to 6 GHz WiFi signals that are output on two signal paths Tx1, Tx2 (i.e., 4 WiFi signals on Tx1 and other 4 WiFi signals on Tx2). The WiFi sign re provided to two transmit diplexers 1812a, 1812b of the SH diplexer block 1704.

Each of the two transmit diplexers 1812a, 1812b uses fixed local oscillator signals (IFLO1, IFLO2, IFLO3, IFLO4) to down-convert the 5 to 6 GHz WiFi signals to intermediate frequency (IF) signals (IF1, IF2, IF3, IF4) in a range of 2 to 3 GHz. In some implementations, the IFLO signals are in the range of 7.8-8.2 GHz.

At each transmit diplexer, IF1 and IF2 signals are combined (summed/added) to form one IF signal, and IF3 and IF4 signals are combined to form another IF signal. In this way, the WiFi signal are multiplexed into IF signals. Preferably the IF signals are offset by over 100 MHz, such as by 700 MHz.

These combined IF signals from the two diplexers 1812a, 1812b are provided to four block-up convertors (BUCs) 1814a, 1814b, 1814c, 1814d.

The BUCs 1814a, 1814b, 1814c, 1814d upconvert the combined IF signals to high frequency signals. The upconverted IF signals are provided as inputs to a phase control device that includes one or more 8-port Rotman lens 1816a, 1816b, in this specific implementation. The phase control device is configured to feed the transmit phased array antenna system 103T (e.g., transmit antenna arrays 1820a, 1820b of the phased array antenna system) via a set of feedlines 1819a, 1819b. In particular, Rotman lens 1816a feeds a horizontal polarization transmit antenna array 1820a and Rotman lens 1816b feeds a vertical polarization transmit antenna array 1820b. In some implementations, the upconverted IF signals are combined at a combiner associated with each Rotman lens 1816a, 1816b.

The Rotman lens 1816*a*, 1816*b* vary phases of the upconverted high frequency signals to, in combination with the transmit antenna arrays 1820*a*, 1820*b*, steer the high frequency signals towards one or more subsectors in the area of coverage. Specifically, the upconverted signals are directed to different ports of the Rotman lens 1816*a*, 1816*b*. The Rotman lens 1816*a*, 1816*b* control phases of the upconverted signals to be fed to an amplifier system and then to the transmit antenna arrays 1820*a*, 1820*b*. The amplifier system includes power amplifiers 1818*a*, 1818*b* provided at output ports of the Rotman lens 1816*a*, 1816*b*. The amplifier system amplifies the feeds on the feedlines 1819*a*, 1819*b* to the transmit antenna arrays 1820*a*, 1820*b*.

The BUCs 1814*a*, 1814*b*, 1814*c*, 1814*d* use a first frequency local oscillator signal RFLO1 or a second frequency local oscillator signal RFLO2 that are frequency shifted from each other by 380 MHz. These local oscillator signals are utilized to convert the IF signals received from the diplexers 1812*a*, 1812*b* to the high frequency signals for transmission. The center frequencies of the high frequency signals, however, are shifted with respect to each other.

In more detail, BUCs 1814*a*, 1814*c* receive RFLO1 and BUCs 1814*b*, 1814*d* receive RFLO2. This arrangement results in the two WiFi chips sets operating at different center frequencies that are shifted with respect to each other in the high frequency signals for transmission. This occurs because the 4 Tx1 signals from the first WiFi chipset 1810*a* are routed from the TX diplexer 1812*b* to BUCs 1814*b*, 1814*d*. In contrast, the 4 Tx2 signals from the second WiFi chipset 1810*b* are routed from the TX diplexer 1812*a* and to BUCs 1814*a*, 1814*c*.

A 100 megahertz signal received from GPS disciplined 100 MHz clock generator 1870 is converted to RFLO synthesizer signals (RFLO1, RFLO2) by driving a synthesizer module 1880. Preferably, generator module 1870 and the synthesizer module 1880 also generate the IFLO signals used by the transmit diplexers 1812*a*, 1812*b* to convert WiFi signals to IF signals. In some implementations, the modules 1870 and 1880 are part of the SH LO generators block 1708.

The output ports of each of the two Rotman lenses 1816*a*, 1816*b* feed into eight parallel amplifiers 1818*a*, 1818*b* for each antenna array 1820*a*, 1820*b*. These eight amplifiers 1818*a*, 1818*b* for each of the Rotman lenses 1816*a*, 1816*b* feed into the two 8×16 antenna arrays 1820*a* and 1820*b*. However, 8×8, 8×10, 8×12, 8×18 antenna arrays might otherwise be selected depending on the link budget requirement.

One of the transmit antenna arrays 1820*a* then transmits the high frequency signals associated with Rotman lens 1816*a* with a horizontal polarization and the other transmit antenna array 1820*b* transmits the high frequency signals associated with Rotman lens 1816*b* with a vertical polarization. The polarization diversity can be achieved by adding a polarizing sheet in front of one of the antennas to rotate its emissions.

On the receive side/path, two 8×16 receive antenna arrays 1840*a*, 1840*b* of the receive phased array antenna system 103R are provided. 8×8, 8×10, 8×12, 8×18 antenna arrays might be used in the alternative, however. Antenna array 1840*a* operates at a horizontal polarization and the other antenna array 1840*b* operates at a vertical polarization. The eight output ports of each of the two antenna arrays 1840*a*, 1840*b* feed into the phase control device that includes one or more 8-port Rotman lens 1842*a*, 1842*b*.

The Rotman lens phase control devices 1842*a*, 1842*b* receive high frequency signals from one or more subsectors and/or different directions associated with the one or more subsectors simultaneously. In particular, Rotman lens 1842*a*, 1842*b* receives high frequency signals at one or more of its input ports and controls the phases of the received signals to produce outputs to low noise block-down converters (LNBs) 1844*a*, 1844*b*, 1844*c*, 1844*d*, in which pairs of outputs corresponds to a unique subsector of the corresponding receive antenna array 1840*a*, 1840*b*. Each of the two Rotman lenses 1842*a*, 1842*b* produces two outputs that feed into two LNBs. For example, Rotman lens 1842*a* feeds into LNBs 1844*a*, 1844*b*, and Rotman lens 1842*b* feeds into LNBs 1844*c*, 1844*d*. Outputs from LNBs 1844*a* and 1844*c* (with different polarizations) correspond to one subsector and the outputs from LNBs 1844*b* and 1844*d* (with different polarizations) correspond to another subsector.

The received high frequency signals at receive antenna arrays 1840*a*, 1840*b* are combined at a combiner associated with each Rotman lens 1842*a*, 1842*b*. The combiner vectorially sums the received high frequency signals present at the antenna ports to be presented to one LNB input, such that each LNB 1844*a*, 1844*b*, 1844*c*, 1844*d* then receives one formed beam. However, an alternative method of beam forming can be utilized where each signal is provided to the LNB and the outputs from the LNB can be summed to form a beam.

The LNBs 1844*a*, 1844*b*, 1844*c*, 1844*d* also use the local oscillator signals RFLO1 and RFLO2 generated by the synthesizer module 1880 for converting the high frequency signals received at the antenna arrays 1840*a*, 1840*b* to IF signals. Each subsector is handled by only one of the WiFi chipsets 1810*a* or 1810*b*, and also operates at a different center in the high frequencies. LNBs 1844*a* and 1844*c* receive RFLO1. In contrast, LNBs 1844*b* and 1844*d* receive RFLO2. As a result, despite the WiFi signals from two WiFi chipsets being upconverted and transmitting at different high frequency center frequencies, they are down-converted to the same If frequencies.

The four low noise block-down converters 1844*a*, 1844*b*, 1844*c*, 1844*d* feed into two receive diplexers 1846*a*, 1846*b* of the SH diplexer block 1704. The inputs to the diplexers 1846*a*, 1846*b* are the IF signals of 2 to 3 GHz. The diplexer demultiplexs the two offset signals in each IF signal. Specifically, receive diplexer 1846*a* produces four Rx2 WM signals that will be processed by the second mu-MIMO WiFi chipset 1810*b*. In contrast, receive diplexer 1846*b* produces four Rx1 WiFi signals that will be processed by the first mu-MIMO WiFi chipset 1810*a*.

In some implementations, the block-up converters, the block-down converters, the Rotman lens on the transmit and receive side, the amplifiers on the transmit side, and the antenna arrays on the transmit and receive side are part of the SH EHF block 1706 discussed with reference to FIG. 17, for example.

Figure 19:
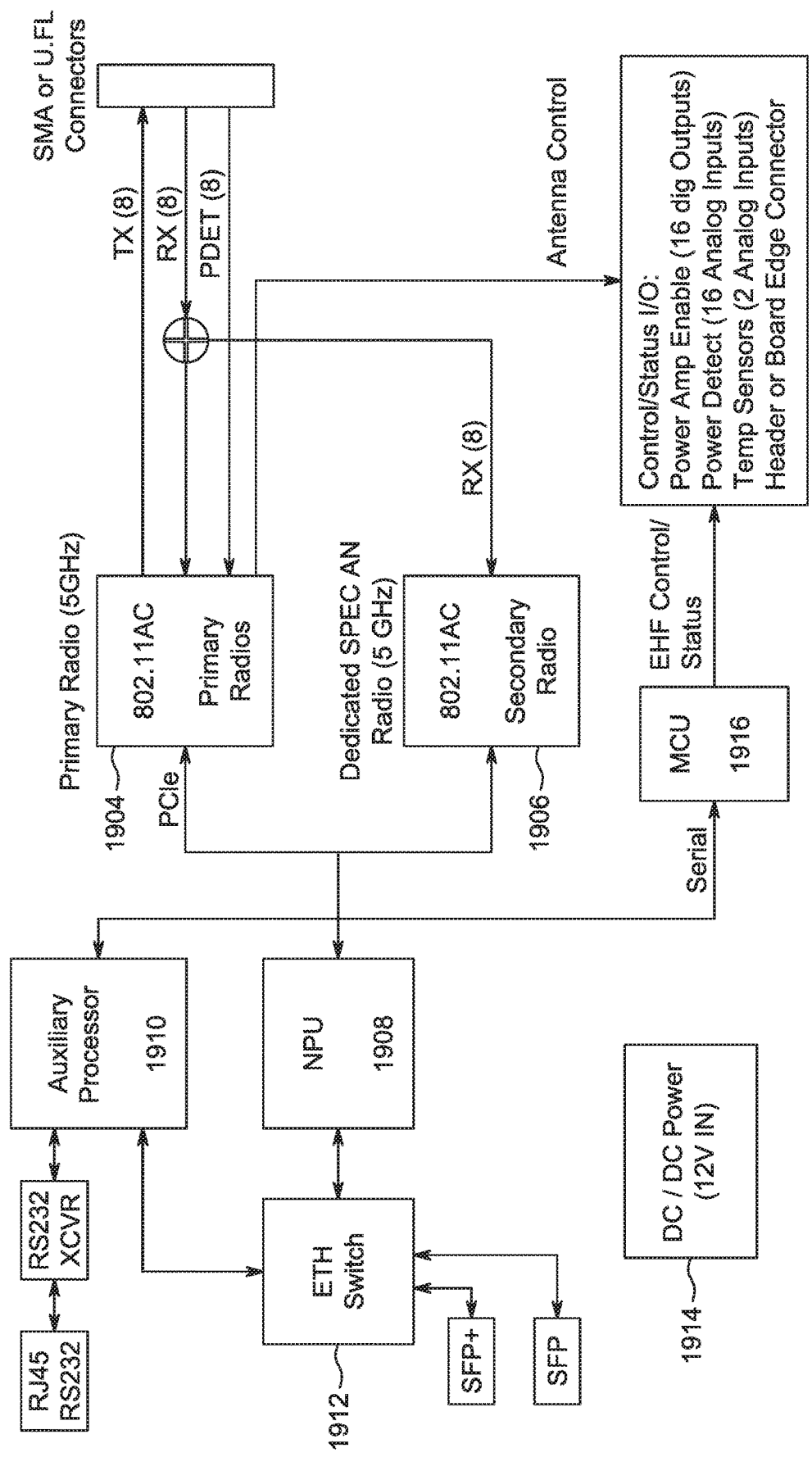
FIG. 19 is a block diagram showing a modem block for the sector head.

FIG. 19 is an exemplary block diagram of the SH modem block 1702 used for the embodiment described in FIG. 18. The SH modem block 1702 can implement a radio/processor architecture based on QCOM AP148 design, or other commercial AP design, such as by Marvell Semiconductor, Inc. The SH modem block 1702 includes the following components and functions.

1) 1904: Two units of 4×4 802.11ac 4×4 MIMO) Primary Radios 1810*a*, 1810*b* with TX, RX, and PDET signals connected to coax connectors. The Primary Radios 1810*a*, 1810*b* (also referred to as WiFi chipsets herein) produce WiFi signals that are encoded according to the 802.11ac wireless networking standard. The two units of Primary Radios 1810*a*, 1810*b* are collectively configured to transmit/receive eight 5-6 GHz WiFi signals. In some embodiments, QCA9980 or Marvell 8964 can be used. The Primary Radios 1810*a*, 1810*b* are multiuser MIMO WiFi chipsets that encode/decode information associated with multiple users in multiple spatial streams. In other words, the WiFi signals carry information associated with multiple users simultaneously. While the current implementations utilizes the 802.11ac standard, other subsequent wireless networking standards in the 802.11 family can be employed to provide multiple spatial stream WiFi signals associated with multiple users using multiple antennas, as would be appreciated. Furthermore, while WiFi signals in the 5-6 GHz frequency band (according to the 802.11ac standard) are utilized by the current implementations, WiFi signals in other frequency bands associated with other standards in the 802.11 family can be used.

2) One 4×4 802.11ac 4×4 MIMO) Secondary Radio 1906 for dedicated use as a spectrum analyzer. RX inputs are shared (divided) with the primary radios 1904. In some embodiments, QCA9980 or Marvell 8964 can be used.

3) A first Network Processor 1908 configured to provide processing capabilities for the various functions of the SH modem block 1702. In some embodiments, IPQ8064, which is a Qualcomm Technologies, Inc. internet processor, but another network processor can be used.

4) Auxiliary network processor 1910 is used for system control, and connects to the Ethernet (ETH) switch 1912. In some embodiments, IPQ8064, or other network processor can be used.

5) ETH Switch 1912 is coupled to fiber optic or copper networking cables via small form factor pluggable transceivers (SPF).

6) Power System 1914 with input voltage at 12V, and all necessary rails are generated on-board.

The physical interfaces of the SH modem block 1702 include various sockets, connectors and ports, as well as inputs/outputs from a microcontroller unit (MCU) 1916 that are used to control other modules in the sector head 1602, such as SH EHF block 1706, SH diplexer block 1704, and SH LO generators block 1708. In some implementations, the SR modem block 1702 is provided inside an EMI/EMC enclosure.

Figure 20:
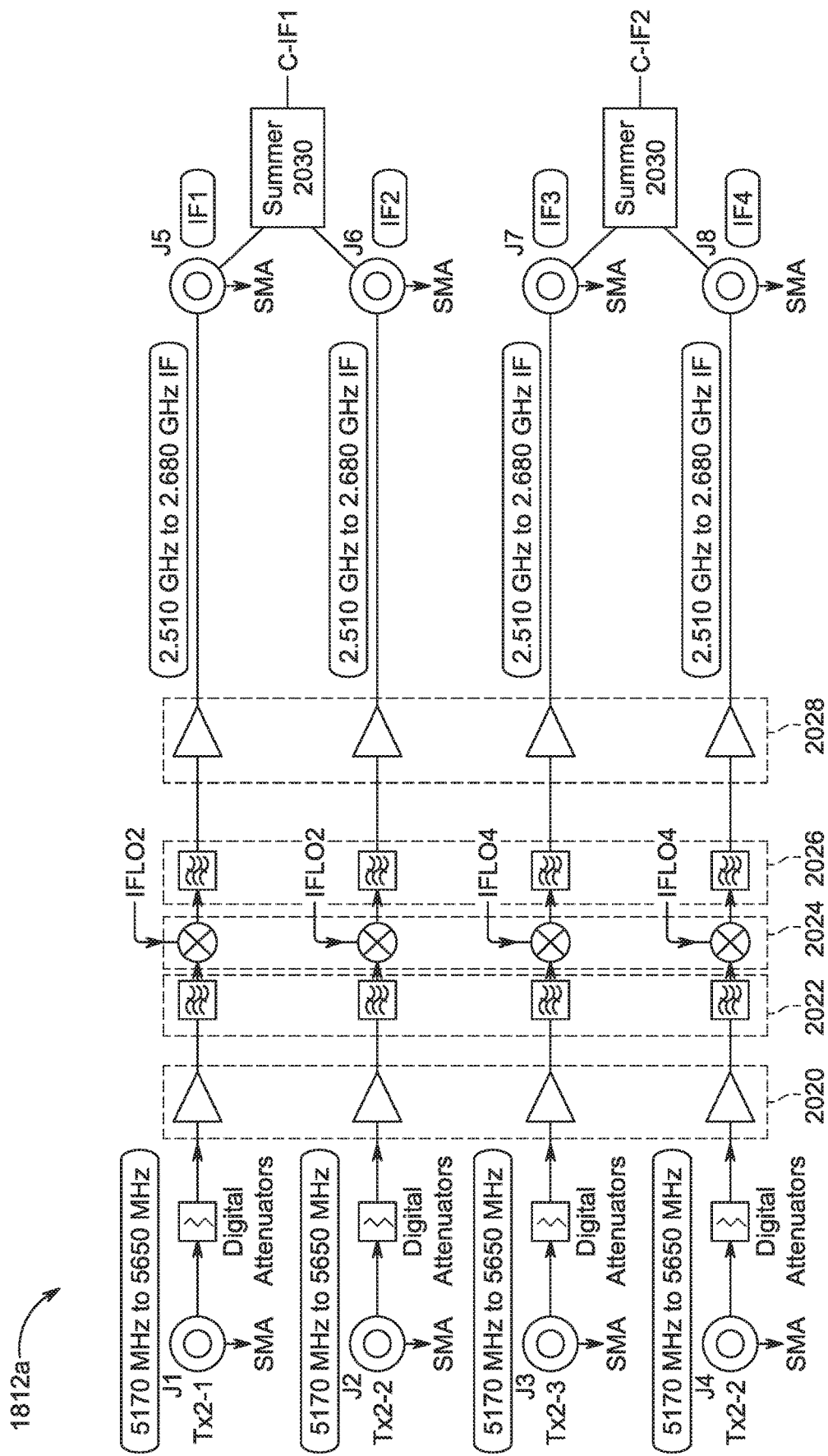
FIG. 20 is a circuit diagram for a transmit diplexer of a diplexer block associated with the sector head.

FIG. 20 illustrates a block diagram of a transmit diplexer (for example, Tx diplexer 1812*a*, 1812*b* of FIG. 18) of diplexer block 1704, according to one embodiment. Four RF/WiFi signals are received at transmit diplexer 1812*a* from the modem block 1702. In particular, transmit diplexer 1812*a* receives four multi spatial stream WiFi signals from the 4-port transmit mu-MIMO WiFi chipset 1810*a*. The four WiFi signals received have carrier frequencies in the 5170 MHz-5650 MHz range. At the transmit diplexer 1812*a*, the four WiFi signals are down-converted using local oscillator frequencies (IFLO2, IFLO4) to yield intermediate frequency (IF) signals IF1, IF2, IF3, IF4.

In detail, at transmit diplexer (e.g., 1812*a*), four WiFi signals (Tx2) from the second WiFi chipset 1810*b* are amplified in respective amplifiers 2020. They are then bandpass filtered by respective bandpass filters 2022 to remove any out of band interference. In mixers 2024, the filtered signals are mixed with local oscillator frequencies (IFLO2, IFLO4) from the synthesizer module 1880 to generate the IF signals. In some implementations, the IFLO signals operate in the range of 7.8-8.2 GHz. The outputs of the mixers 2024 are filtered by respective bandpass filters 2026. Amplifiers 2028 adjust the level of the intermediate frequency signals IF1, IF2, IF3, IF4. In some implementations, the intermediate frequency signals are in the 2.510-2.680 GHz range. Here, the IF signals are combined to yield two outputs for the block-up converters of FIG. 18. For example, IF1 and IF2 signals are combined at summer 2030 to yield combined IF signal C-IF1 and IF3 and IF4 signals are combined at summer 2030 to yield combined IF signal C-IF2. The two combined IF signals are provided as input to the block-up converters, where the two combined IF signals are converted to high frequency signals.

As will be appreciated, the transmit diplexer 1812*b* includes the same components as and functions in a manner similar to transmit diplexer 1812*a*. As such, the description of FIG. 20 applies to transmit diplexer 1812*b*, where the WiFi signals are mixed with local oscillator frequencies (IFLO1, IFLO3) at mixers 2024 to generate the IF signals.

Figure 21:
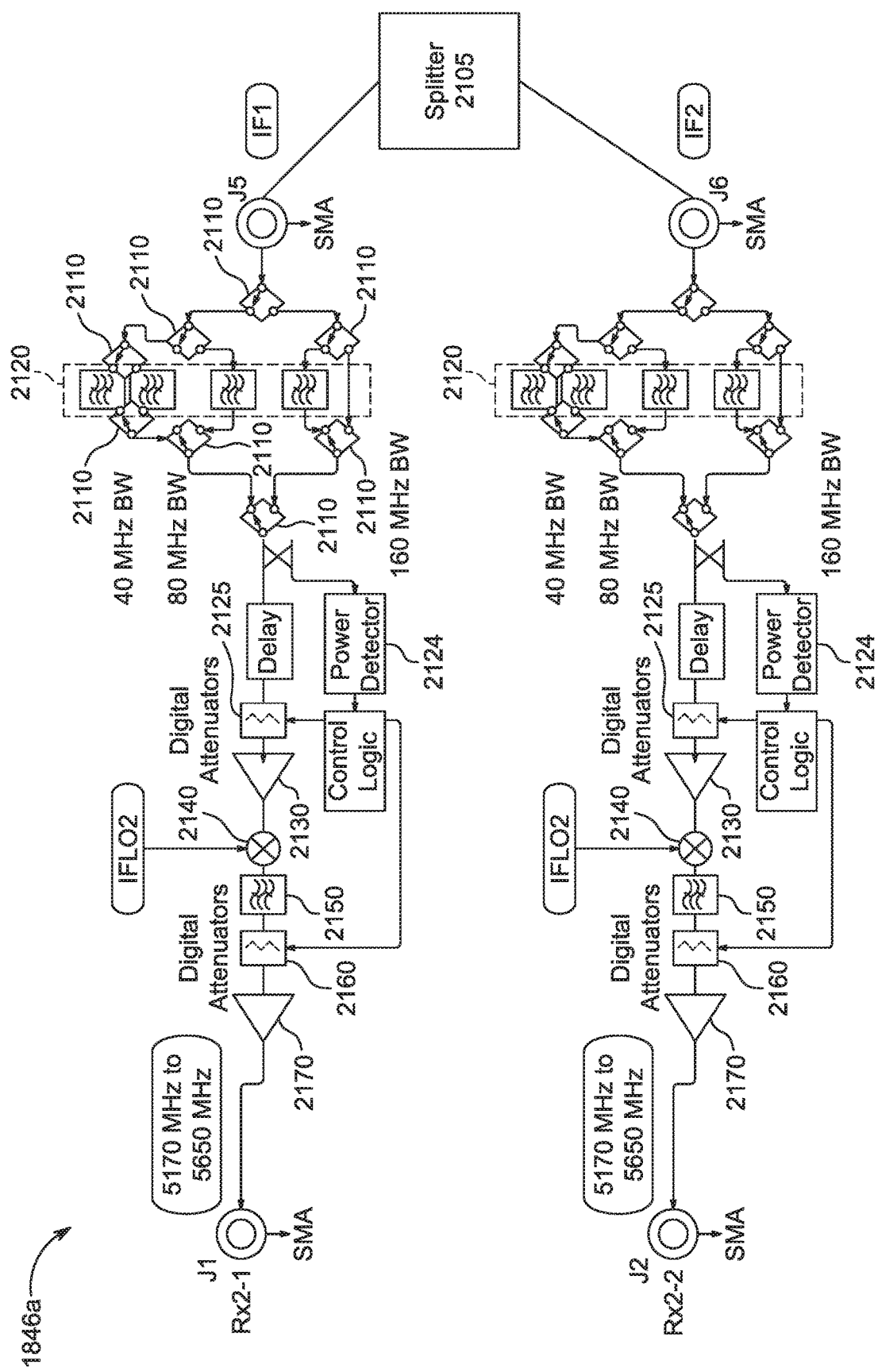
FIG. 21 is a block diagram for a receive diplexer of the diplexer block.
Figure 21:
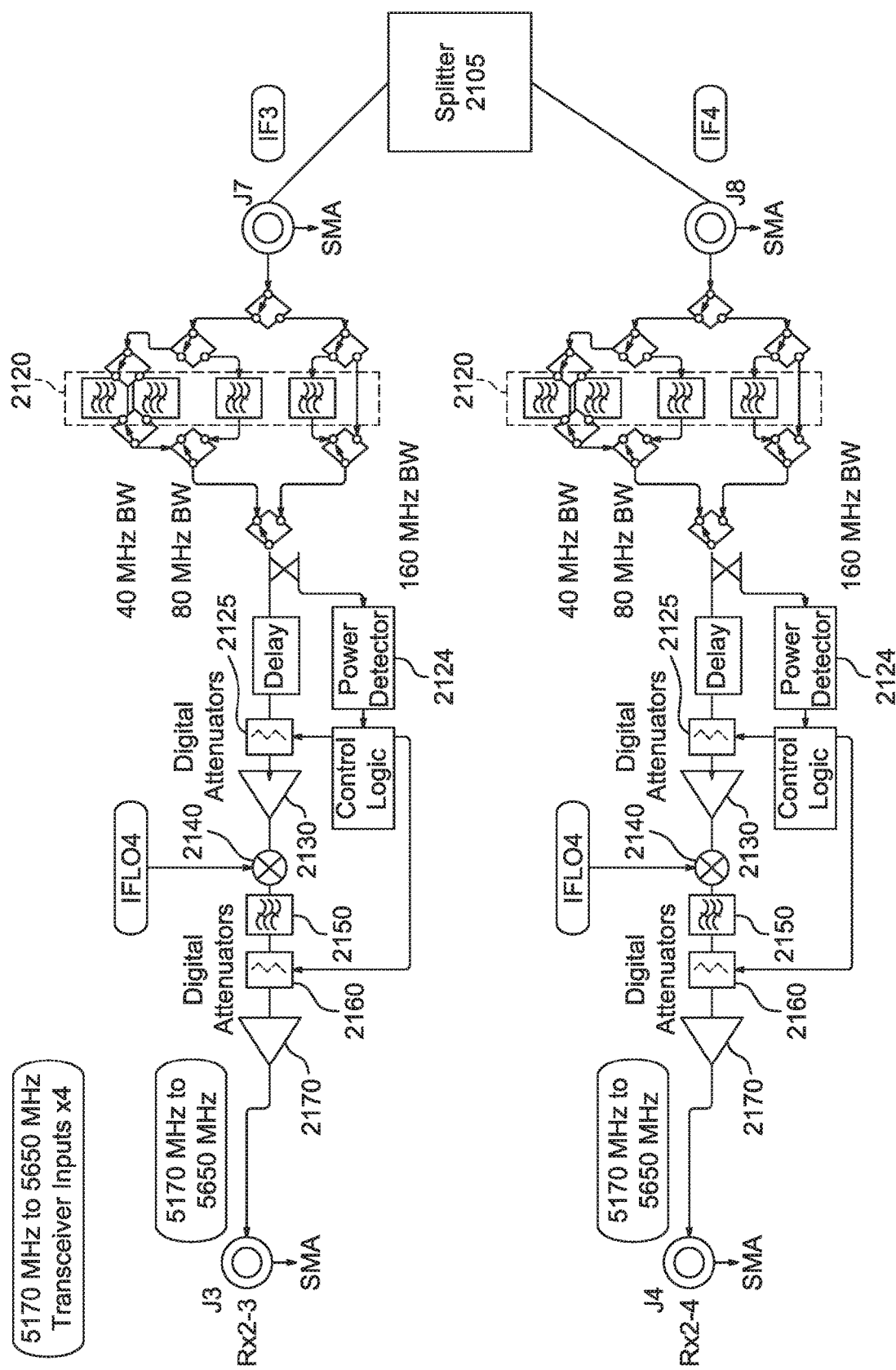

FIG. 21 illustrates a block diagram of a receive diplexer (e.g., Rx diplexer 1846*a*, 1846*b* of FIG. 18) of diplexer block 1704, according to one embodiment. Two IF signals are received at receive diplexer 1846*a* from the LNBs of FIG. 18. The IF signals are converted into multi spatial stream WiFi signals at the appropriate frequency for reception and decoding by the mu-MIMO WiFi chipset 1810*b*. In some implementations, the IF signals are in the range of 2.510-2.680 GHz In detail, at receive diplexer 1846*a*, two IF signals are received from the LNBs. The two IF signals are split into four IF signals (IF1, IF2, IF3, IF4) at splitter 2105. The four IF signals are the converted to four WiFi signals (4 Rx1 for RX diplexer 1846*a*, 4 Rx2 for RX Diplexer 1846*b*). Each IF signal goes through similar processing to yield the corresponding WiFi signals. The processing for the IF1 signal is described below, however, the same description applies to other IF signals (IF2, IF3, IF4) as well.

Considering the IF1 signal switches 2110 switch the IF1 signal depending on the mode of operation. For example, if the signal quality of the link between the aggregation node 102 and subscriber node(s) 104 is low, then more robust 40 MHz bandwidth channels are used. Depending on the signal quality of the link, 80 MHz or 160 MHz bandwidth modulation and channels are used. The switches 2110 are set based on which of the modulation modes/schemes. Bandpass filters 2120 are provided for the respective the modulation scheme used. The output from the selected bandpass filter 2120 is amplified at amplifier 2130.

In some implementations, power detector 2124 measures the power of the signal output from the selected bandpass filter 2120. Programmable attenuation is provided by attenuator 2125 based on the measured power.

Output from the amplifier 2130 is provided to mixer 2140 that converts the IF1 signal to a WiFi signal in the 5 GHz frequency range that is expected by the modem block 1702. The mixer 2140 mixes the IF1 signal with IFLO2 from the synthesizer module 1880 to generate the WiFi signal. The signal is passed through filter 2150 and attenuator 2160, and amplified by amplifier 2170 prior to being provided as output Rx2-1 to the WiFi chipset 1810*a*.

Each of the other IF signals IF2, IF3, and IF4 for the receive diplexer 1846*a* pass through similar components described with respect to IF1 signal to generate respective WiFi signals Rx2-2, Rx2-3, Rx2-4 for the modem block 1702. In particular, IF2 signal is mixed with IFLO2 to generate WiFi signal Rx2-2, IF3 signal is mixed with IFLO4 to generate WiFi signal Rx2-3, and IF4 signal is mixed with IFLO4 to generate WiFi signal Rx2-4. As will be appreciated, the receive diplexer 1846*b* includes the same components as and functions in a manner similar to receive diplexer 1846*a*. As such, the description of FIG. 21 applies to receive diplexer 1846*b*, where the WiFi signals are mixed with local oscillator frequencies (IFLO1, IFLO3) at mixers 2140 to generate the IF signals.

Figure 22:
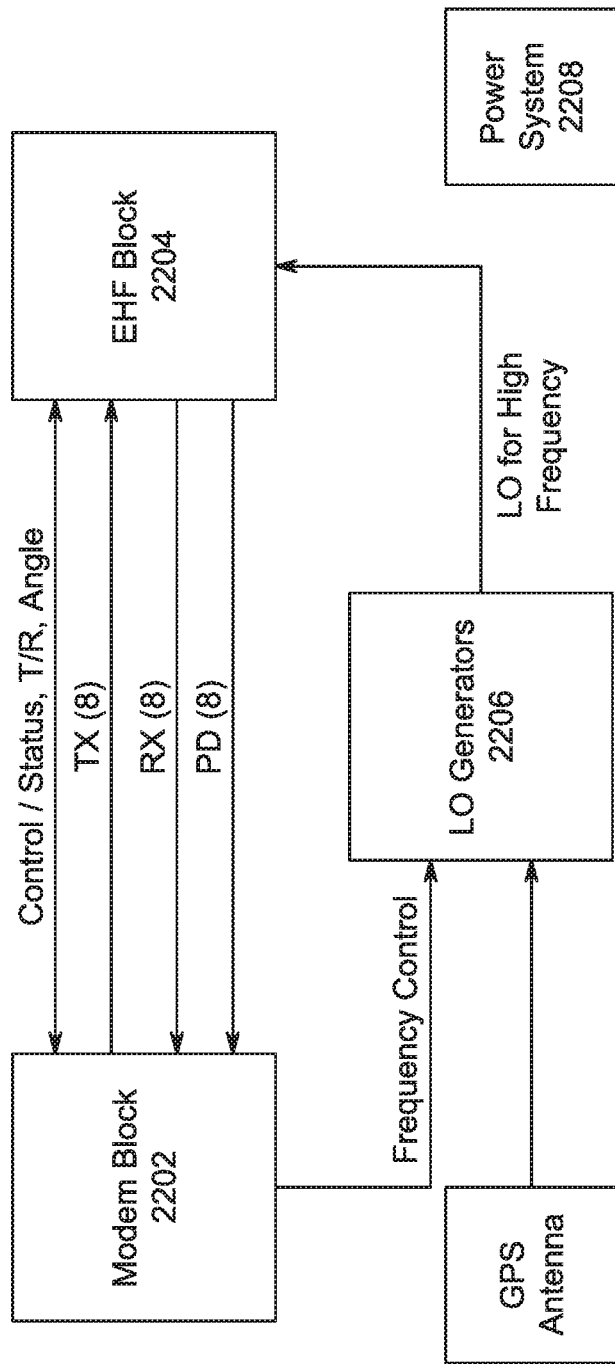
FIG. 22 is a block diagram showing a second embodiment of the components of the sector head of the aggregation node.

FIG. 22 depicts components of another embodiment of the sector head 1602 in detail. The sector head 1602, in this embodiment, includes circuitry for performing direct conversion between WiFi and high frequencies, without the intervening IF conversion. In particular, the sector head 1602 includes the following components and functions:

1) SH modem block 2202 includes 802.11ac radios (transceivers), network processor(s), network interfaces, and system control circuitry. The components of the SH modem block 2202 are similar to the modem block 1702, except that two units of 8×8 802.11ac (i.e., 8×8 MIMO) Primary Radios or WiFi chipsets are used (as described below with respect to FIG. 23).

2) SH EHF block 2204 includes high frequency up/down converters (for performing WiFi to high frequency conversion and vice versa), beam forming network, RF switches, power amplifiers, LNBs, antennas, and a LO network for distributing LO signals.

3) SH LO generators block 2206 include high fidelity clock sources for up/down frequency conversion, where a GPS carrier is used to discipline a 100 MHz oscillator. The SH LO generators block 2206 generates RFLO signals for WiFi—high frequency conversion.

4) SH power system 2208 that includes DC power supplies and filtering as required for the other component blocks.

Figure 23:
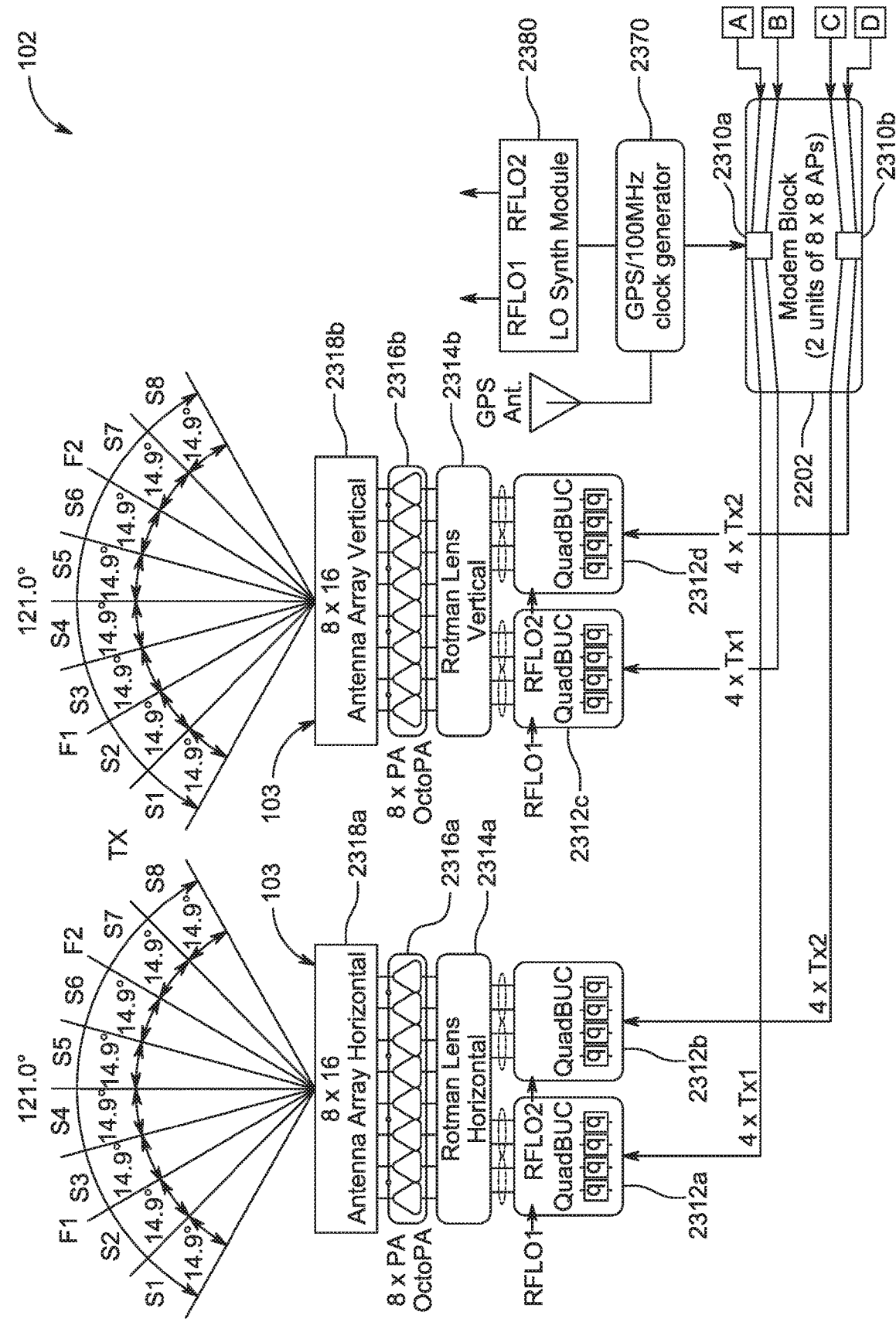
FIG. 23 is an exemplary schematic diagram for the aggregation node of a second embodiment.
Figure 23:
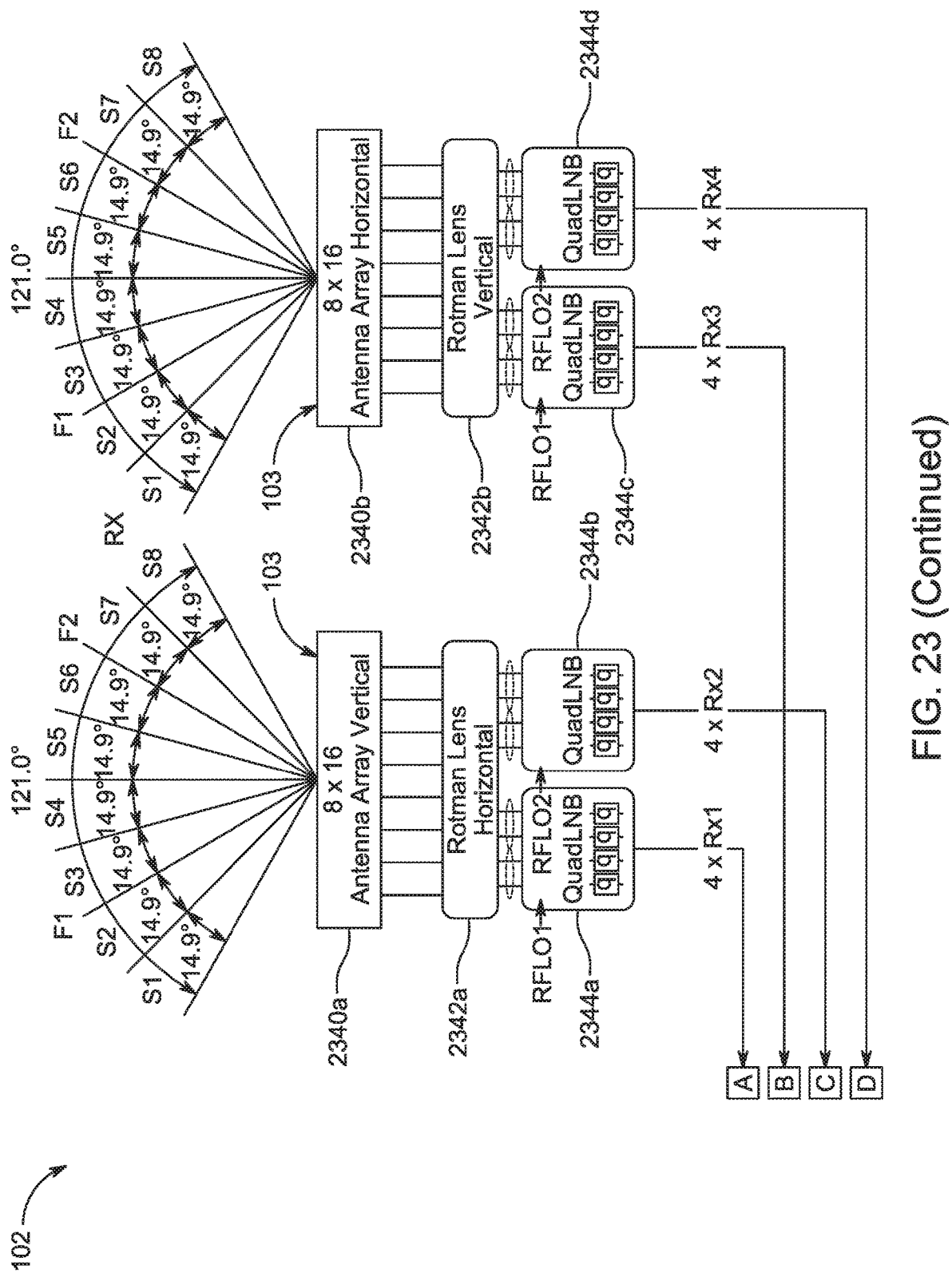

FIG. 23 shows an embodiment that leverages 8-port mu-MIMO WiFi chipsets 2310a, 2310b implemented at the SH modem block 2202. Specifically, on the transmit side, the 8-port mu-MIMO WiFi chipsets 2310a, 2310b feed into four quad block-up convertors (BUCs) 2312a, 2312b, 2312c, 2312d. The WiFi signals from the Win chipsets are fed directly to the block-up converters without conversion to IF signals as in the case of FIG. 18. The block-up converters 2312a, 2312c, use local oscillator signal RFLO1; the block-up converters 2312b, 2312d use local oscillator signals RFLO2. RFLO1 and RFLO2 are frequency shifted from each other by 380 MHz).

The four quad block-up convertors (BUCs) 2312a, 2312b, 2312c, 2312d convert WiFi signals to high frequency signals for transmission. The offset between RFLO1 and RFLO2 has the effect of offsetting the center frequency used to transmit and receive the high frequency signals used for the two mu-MIMO chipsets 2310a, 2310b with respect to each other. This reduces interference between the two chipsets.

In some implementations, a 100 megahertz signal received from GPS disciplined 100 MHz clock generator 2370 is converted to RFLO synthesizer signals (RFLO1, RFLO2) by driving a synthesizer module 2380.

Each BUC 2312a, 2312b, 2312c, 2312d produces four outputs. Two BUCs 2312a, 2312b) provide eight inputs to a horizontal polarization Rotman lens 2314a. The other two BUCs (e.g., 2312c, 2312d) provide the eight inputs to the vertical polarization Rotman lens 2314b. The Rotman lens 2314a, 2314b form the transmit side phase control device that functions in a manner similar to the phase control device of FIG. 18, except that each of the two Rotman lenses 2314a, 2314b receive eight inputs from the quad BUCs rather than two inputs.

The eight output ports of each of the two Rotman lenses 2314a, 2314b feed into eight parallel amplifiers 2316a, 2316b for each antenna array 2318a, 2318b. The power amplifiers 2316a, 2316b form the amplifier system that functions in a manner similar to the amplifier system of FIG. 18. The amplifiers should form a matched-set group, in that they are factory aligned to be equivalent to each other with respect to insertion gain (dBS21) and insertion phase (angS21). These eight amplifiers 2316a, 2316b for each of the Rotman lenses 2314a, 2314b feed into two 8×16 antenna arrays 2318a and 2318b (i.e., transmit antenna arrays of the phased array antenna system 103). It should be noted that 8×8, 8×10, 8×12, 8×18 arrays might be used, depending on the link budget requirements, to list a few examples. One of the transmit antenna arrays then transmits the high frequency signals associated with Rotman lens 2314a with a horizontal polarization and the other transmit antenna array 2318b transmits the high frequency signals associated with Rotman lens 2314b with a vertical polarization.

The eight discrete inputs to each antenna array 2318a, 2318b, derived from the four 5 GHz WiFi signals from each of two WiFi chipsets 2310a, 2310b, result in eight subsectors that divide the 120 degree area coverage for the antenna arrays 2318a, 2318b. The subsectors for each of the antenna arrays 2318a and 2318b are coextensive with each other but separated by polarization. There is also frequency diversity between the first four subsectors of each of the antenna arrays 2318a, 2318b and the last four subsectors.

On the receive side, two 8×8 or 8×16 or other n'm receive antenna arrays 2340a, 2340b of the phased array antenna system 103 are provided. Antenna array 2340a operates at a horizontal polarization and the other antenna array 2340b operates at a vertical polarization. The eight output ports of each of the two antenna arrays 2340a, 2340b feed into two 8-port Rotman lens 2342a, 2342b. The Rotman lens 2342a, 2342b form the receive side phase control device that functions in a manner similar to the receive side phase control device of FIG. 18, except that each of the two Rotman lenses 2342a, 2342b produce eight outputs that yield eight subsectors that divide the 120 degree area coverage for the two receive antenna arrays 2340a, 2340b. Each of these outputs corresponds to one of the eight subsectors of the receive antenna arrays 2340a, 2340b. These eight output feed into two 4-port (quad) low noise block-down converters (LNBs). For example, Rotman lens 2342a feeds into Quad LNBs 2344a, 2344b, and Rotman lens 2342b feeds into Quad LNBs 2344c, 2344d.

The Quad LNBs 2344a, 2344b, 2344c, 2344d use the local oscillator signals RFLO1 and RFLO2 for converting the high frequency signals received at the antenna arrays 2340a, 2340b to WiFi signals that are expected by/can be decoded by the two 8-port receive mu-MIMO chipsets 2346a, 2346b of the modem block 2202. In some implementations, the block-up converters, the block-down converters, the Rotman lens on the transmit and receive side, the amplifiers on the transmit side, and the antenna arrays on the transmit and receive side are part of the SH EHF block 2204.

Since the subsectors are assigned to different WiFi chipsets 2310a, 2310b, they operate at different frequencies. As a result, quad LNBs 2344a, 2344c, receive RFLO1; whereas quad LNBs 2344b, 2344d receive RFLO2.

Figure 24:
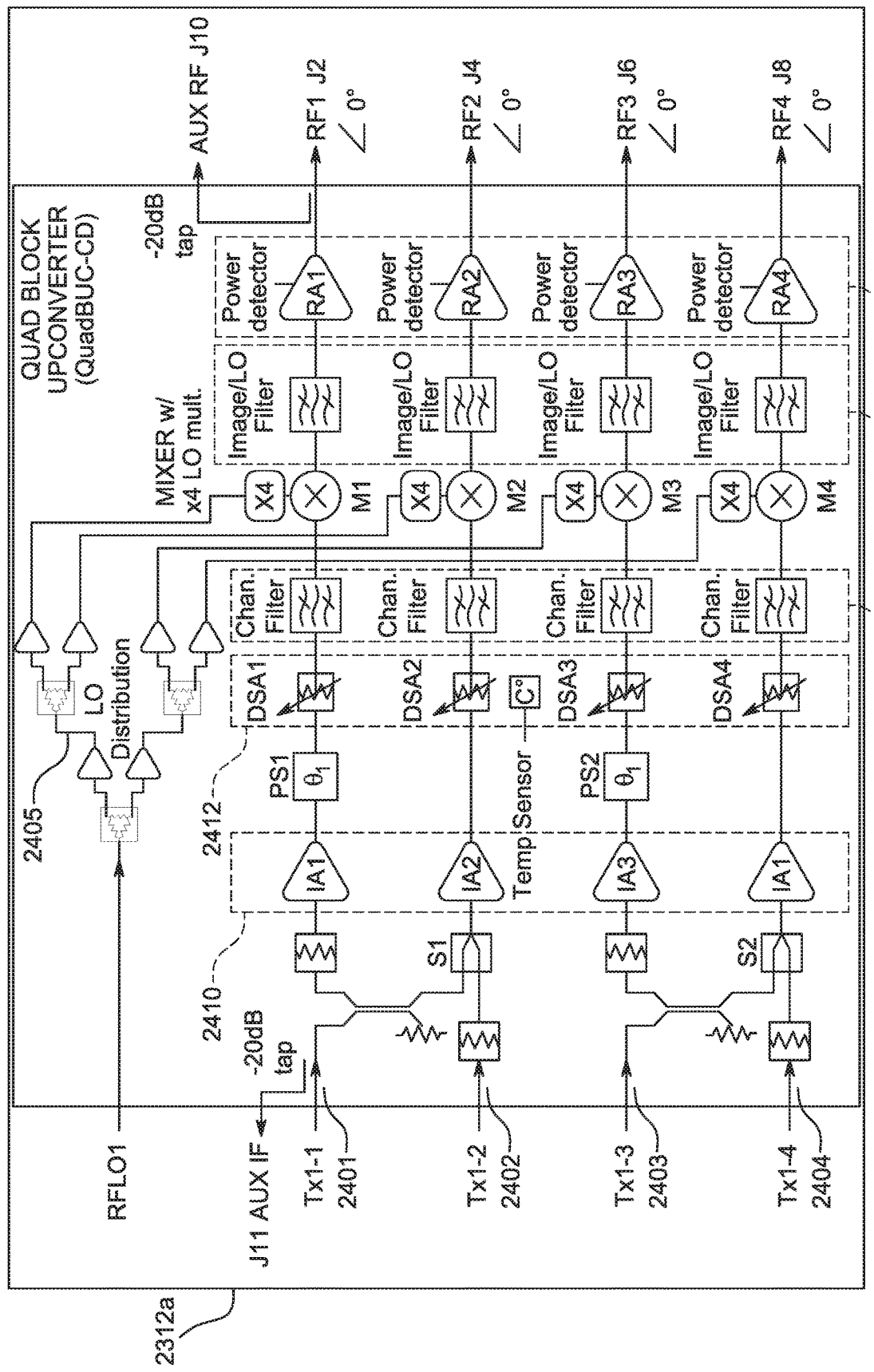
FIG. 24 is a circuit diagram for a quad block-up converter.

FIG. 24 illustrates a block diagram of a quad block-up converter (e.g., Quad BUC 2312a) of FIG. 23, according to one embodiment. Four WiFi signals are received at each QuadBUC 2312a-2312d from the modem block 2202. In particular, each QuadBUC 2312a-2312d receives four multi spatial stream WiFi signals from the 8-port mu-MIMO WiFi chipsets 2310a, 2310b. The received WiFi signals have carrier frequencies in the 51.70 MHz-5650 MHz range. At each QuadBUC 2312a-2312d, the four WiFi signals are up-converted using local oscillator frequencies (RFLO1, RFLO2) to yield high frequency signals RF1, RF2, RF3, RF4.

Considering QuadBUC 2312a, the WiFi signals (Tx1-1 to Tx1-4) on each path 2401-2404 are amplified by respective amplifiers 2410. The amplified signals are passed to respective digital attenuators 2412 for adjusting the level of the WiFi signals. In some implementations, the amplified signals in path 2401 and 2403 are phase adjusted prior to being passed to the digital attenuators 2412. After the signals are filtered by channel filters 2414, the signals are mixed with oscillator frequency signals RFLO1 or RFLO2 (here RFLO1) at respective mixers M1-M4 to upconvert the WiFi signals to high frequency signals. The RFLO1 and RFLO2 signals from the synthesizer module 1880 are distributed to the paths 2401-2404 via LO network 2405. In some implementations, the outputs of the mixers are filtered (by respective filters 2416) and amplified (by amplifiers 2418) prior to be being output as high frequency signals RF1-RF4 to the Rotman lens (e.g., Rothman lens 2314a).

As will be appreciated, each QuadBUC 2312b-2312d includes the same components as and functions in a manner similar to QuadBUC 2312a. As such, the description of FIG. 24 applies to QuadBUCs 2312b-2312d as well.

It will be understood that the QuadBUC described in FIG. 24 can also be utilized to implement alternate embodiments. For example, the QuadBUC can be used to implement the embodiment described in FIG. 18 (e.g., BUCs 1814a-1814d). In this embodiment, the QuadBUC is driven by one or more IF signals instead of WiFi signals, where the IF signals are up-converted to high frequency signals. In some embodiments, the QuadBUC can be driven by one IF signal. For example, one or more paths 2401, 2402 can be driven by the IF signal (e.g., IF1/C-IF1). In other embodiments, the QuadBUC can be driven by two or more IF signals, as will be appreciated. This operation is achieved by control of the two switches S1, S2.

Figure 25:
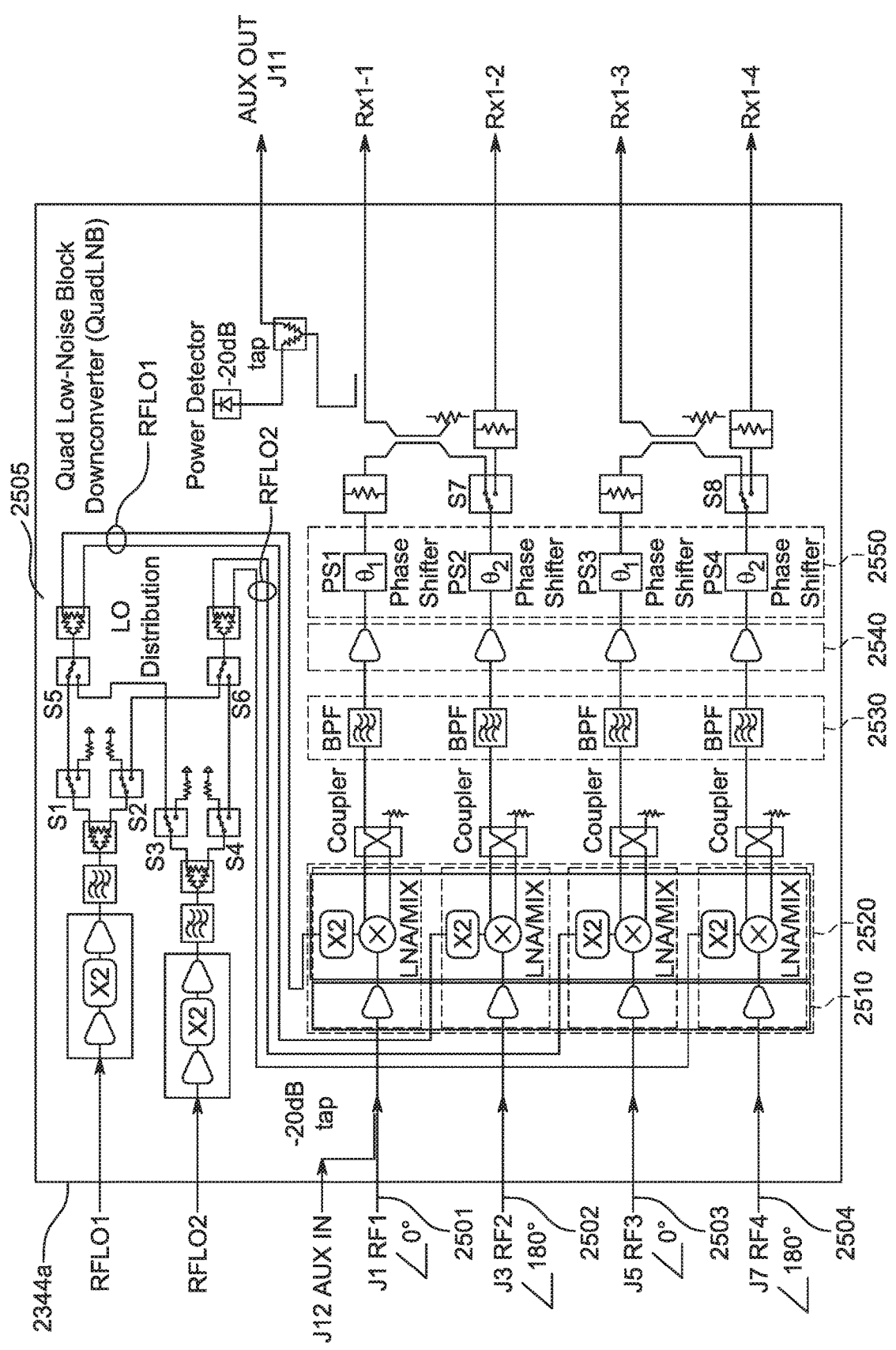
FIG. 25 is a circuit diagram for a quad block-down converter.

FIG. 25 illustrates a block diagram of a quad block-down converter (e.g., Quad LNB 2344a) of FIG. 23, according to one embodiment. Four high frequency signals (RF1-RF4) are received at each QuadLNB 2344a-2344d from Rotman lens 2342a, 2342b. At each QuadLNB 2344a-2344d, the four high frequency signals are down-converted using local oscillator frequencies (RFLO1 or RFLO2) to yield WiFi signals that can be decoded by the 8-port receive mu-MIMO chipsets 2346a, 2346b.

Considering QuadLNB 2344a, the high frequency signals (RF1-RF4) on each path 2501-2504 are amplified by respective amplifiers 2510 prior to being mixed with oscillator frequency signals RFLO1. The amplified signals are mixed with RFLO1 at respective mixers 2520 to downconvert the high frequency signals to the WiFi signals (Rx1-1-Rx1-4). The RFLO1 and RFLO2 signals from the synthesizer module 2380 are distributed to the paths 2501-2504 via LO network 2505, that controls which of RFLO1 and RFLO2 is used for the LNB and further conditions the signals. The WiFi signals are filtered (by bandpass filters 2530), amplified (by amplifiers 2540), and phase adjusted (by phase shifters 2550) prior to being output to the WiFi chipset 2346a.

As will be appreciated, each QuadLNB 2344b-2344d includes the same components as and functions in a manner similar to QuadLNB 2344a. As such, the description of FIG. 25 applies to QuadLNBs 2344b-2344d as well.

It will be understood that the QuadLNB described in FIG. 25 can also be utilized to implement alternate embodiments. For example, the QuadLNB can be used to implement the embodiment described in FIG. 18 (e.g., LNBs 1844a, 1844b, 1844c, 1844d). In this embodiment, the QuadLNB outputs one or more IF signals instead of WiFi signals, where the IF signals are up-converted to WiFi signals. In some embodiments, the QuadLNB can be driven by one high frequency signal (RFD. For example, path 2501 can be driven by RF1 (i.e., the formed beam of FIG. 18) to generate one IF signal (e.g., IF1) that is provided as input to receive diplexer 1846a. In other embodiments, the QuadLNB can be driven by two or more RF signals to generate two or more IF signals, as will be appreciated.

Figure 26:
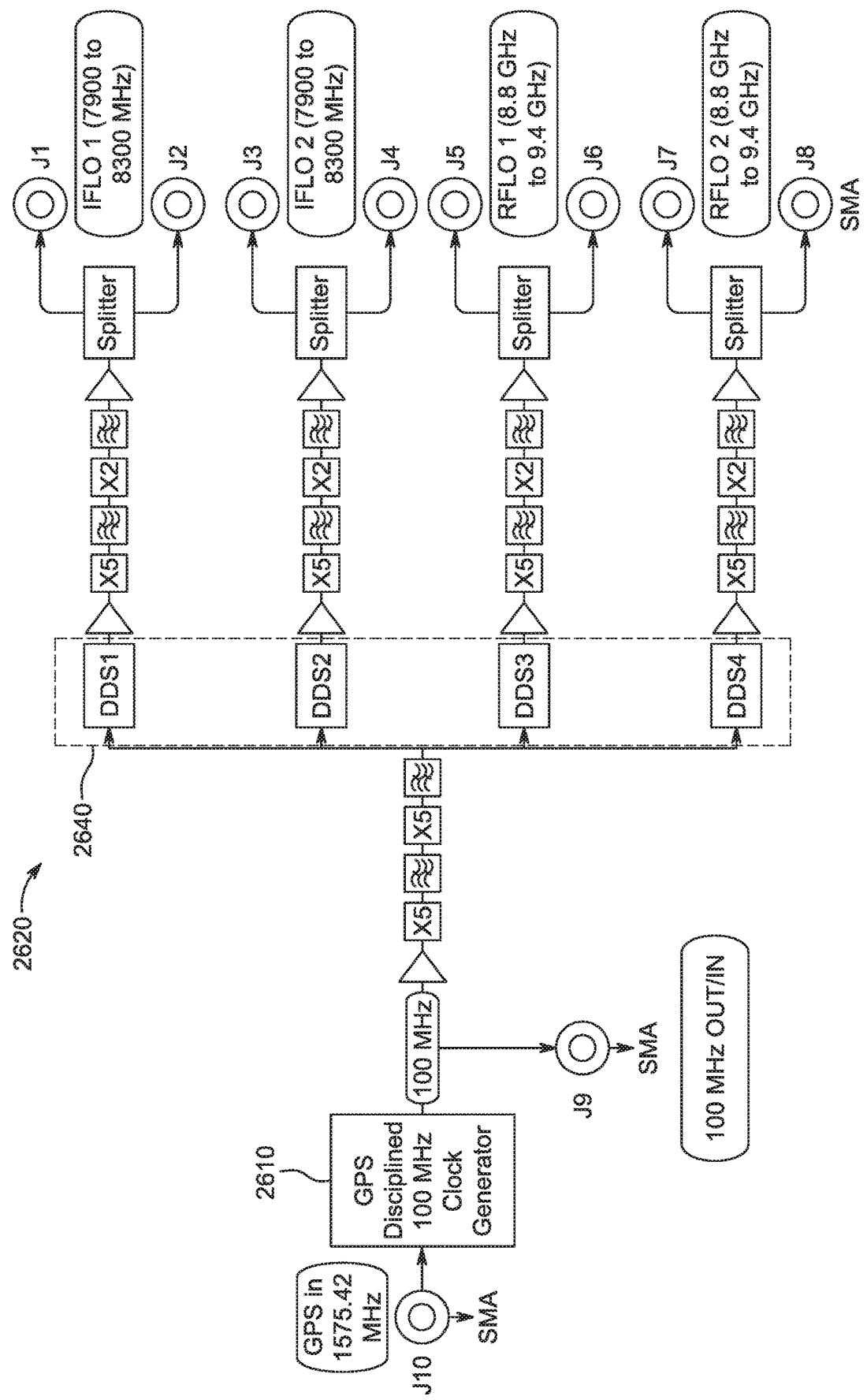
FIG. 26 is a circuit diagram showing a clock generator and a synthesizer module.

FIG. 26 illustrates a block diagram of the clock generator and the synthesizer module of the SH LO generators block 1708, 2206, according to one embodiment. A GPS signal (operating at approximately 1.5 GHz) is used to control/discipline a 100 MHz clock generator 2610 (including clock generators 1870, 2370). The 100 MHz reference signal from the clock generator 2610 is used by synthesizer module 2620 (including synthesizer modules 1880, 2380) to generate various LO signals that are used by transmit and receive diplexers, block-up converters, and block-down converters (depicted in FIGS. 18 and 23, for example). Direct digital synthesizers 2640 of the synthesizer module 2620 are used to generate the LO signals (IFLO1, IFLO2, RFLO1, and RFLO2) based on the 100 MHz reference signal. In some implementations, IFLO1 and IFLO2 signals operating at 7.9-8.3 GHz frequencies are generated for the transmit and receive diplexers of FIG. 18. The RFLO1 and RFLO2 signals operating at 8.8 GHz-9.4 GHz frequencies are generated for the BM and LNBs of FIG. 18, and the QuadBUCs and QuadLNBs of FIG. 23. While FIG. 22 depicts two IFLO signals (IFLO1 and IFLO2) being generated, it will be appreciated that additional IFLO signals (e.g., IFLO3 and IFLO4 depicted in FIG. 18) can also be generated based on the 100 MHz reference signal.

Figure 27:
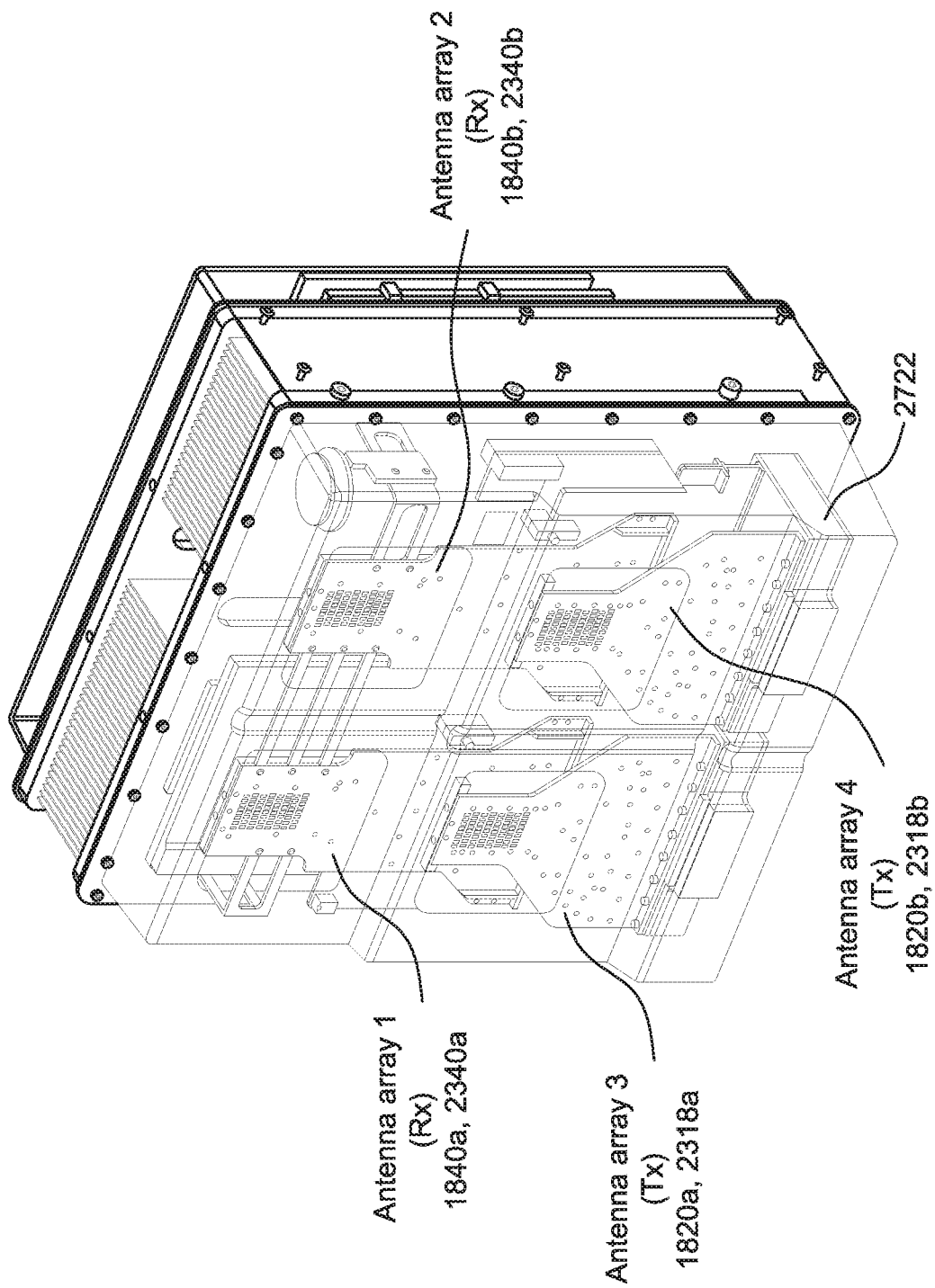
FIG. 27 is a perspective view of a sector head of an aggregation node with a housing shown in phantom illustrating aspects of the mechanical layout and layout of the antenna arrays.

FIG. 27 shows the layout of the sector head including the antenna arrays used at the aggregation node 102. Two receive (Rx) antenna arrays (e.g., 1840a, 1840b of FIG. 18 or 2340a, 2340b of FIG. 23) and two transmit (Tx) antenna arrays (e.g., 1820a, 1820b of FIG. 18 or 2318a, 2318b of FIG. 23) are layout in a 2 by 2 array. Each transmit antenna arrays is coupled to the respective amplifier system 2722 comprising power amplifiers (e.g., 1818a, 1818b of FIG. 18 or 2316a, 2316b of FIG. 23). Each receive antenna array is a slotted waveguide antenna array that has an integrated phase control device ( ). Each transmit antenna array is coupled to a separate phase control device. These phase control devices control the phase of the high frequency signals being transmitted from or received at the antenna arrays, thereby making the antenna arrays phased antenna arrays.

Figure 28B:
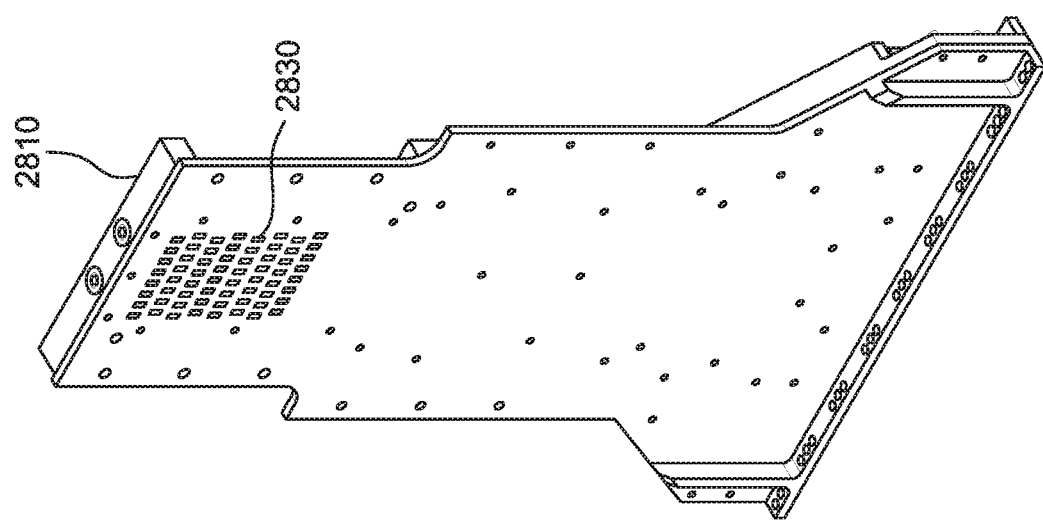

FIGS. 28A and 28B depict an exemplary receive antenna array (e.g., antenna array 2340a) and its associated frontplate 2810. High frequency signals from endpoint nodes 104 are received at antenna apertures or slots 2830 of the receive antenna array 2340a. These slots are arranged in a 8×8 array, in illustrated embodiment, although 8×8, 8×10, 8×12, 8×16, and 8×18 arrays are possible depending on the link budget requirements. The signals feed into integrated Rotman lens 2342a via feedlines 2825. Outputs from the Rotman lens 2342a are provided to LNBs (e.g., QuadLNBs 2344a-2344b of FIG. 23) via feedlines 2826. The receive antenna arrays 2340b, 1840a, and 1840b (described with respect to FIGS. 18 and 23) are implemented in the same manner as receive antenna array 2340a. The receive antenna arrays 2340a, 2340b with their integrated Rotman lenses 2342a, 2342b form the receive side of the phased array antenna system 103 in FIG. 23. Similarly, the receive antenna arrays 1840a, 1840b with their integrated Rotman lenses 1842a, 1842b form the receive side of the phased array antenna system 103 in FIG. 18.

Figure 28C:
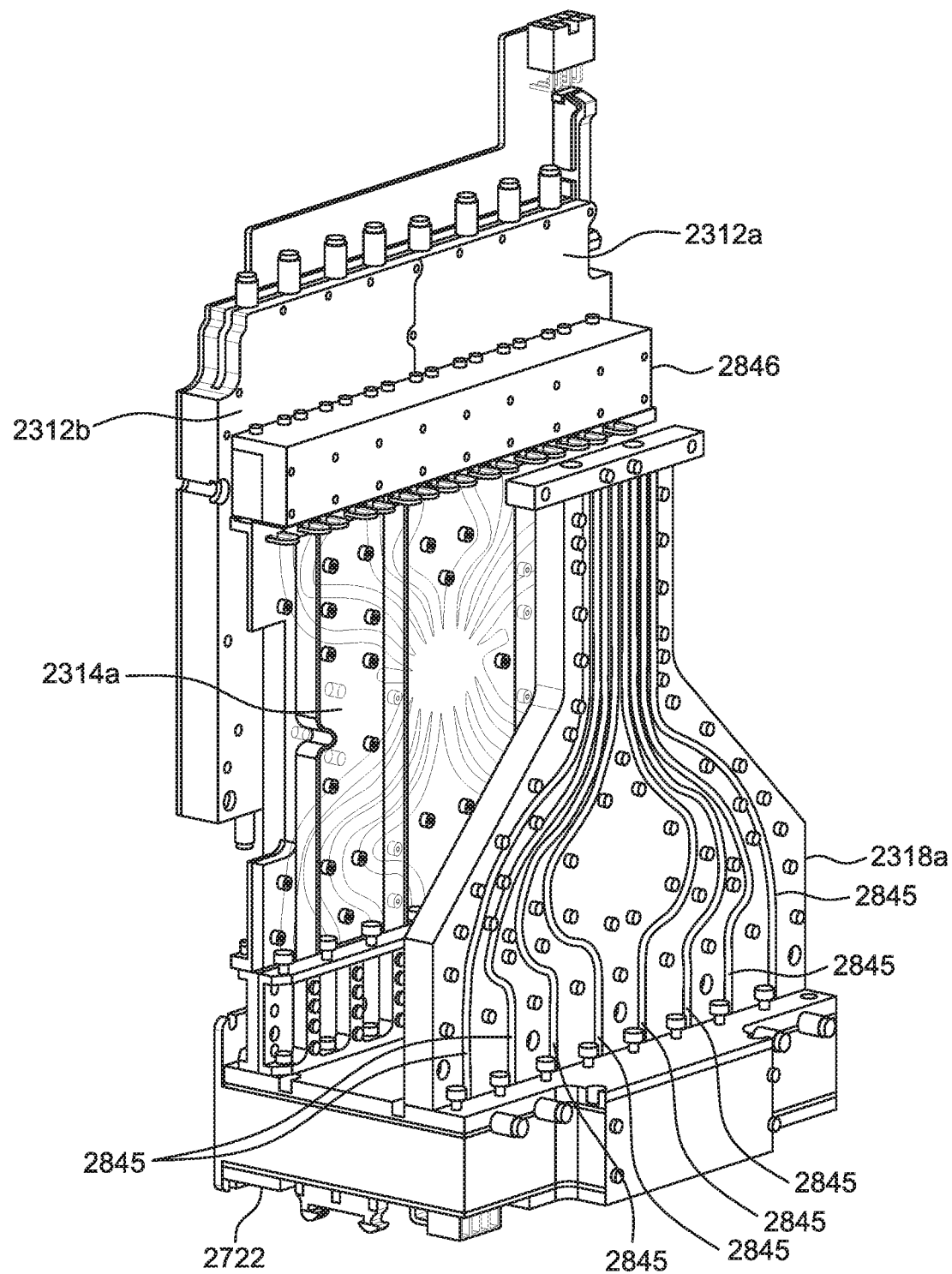
FIG. 28C-28D are a perspective scale view of an exemplary transmit side of the phased array antenna system and its front plate, respectively.
Figure 28D:
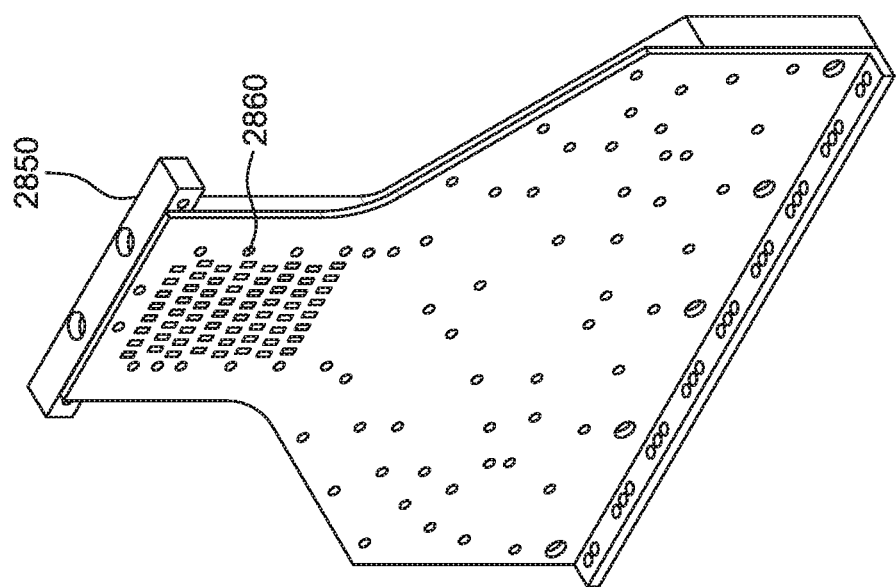

Transmit antenna arrays 2318a, 2318b, with their corresponding Rotman lens 2314a, 2314b and power amplifiers 2316a, 2316b form the transmit side of the phased array antenna system 103 of FIG. 23. FIGS. 28C and 28D depict an assembly of components forming one part of the transmit side of the phased array antenna system 103 of FIG. 23. For example, FIG. 28C shows the backplate of one transmit antenna array (e.g., antenna array 2318a) coupled to the Rotman lens 2314a via the amplifier system 2722. The amplifier system 2722 is an 8 channel power amplifier assembly that includes 8 power amplifiers (e.g., 2316a). Rotman lens 2314a electronically steers the high frequency signals from BUCs (e.g., QuadBUCs 2312a-2312b) by controlling the phase of the high frequency signals. Signals from the BUCs 2312a, 2312b are fed to the Rotman lens 2314a via a 90 degrees waveguide bend 2846. The Rotman lens 2314a is configured to feed the transmit antenna array 2318a via antenna and waveguide feedlines 2845. Signals from the feedlines 2845 are then emitted from antenna slots 2860 of frontplate 2850 associated with the transmit antenna array 2318a. These slots are arranged in an 8×8 array. This phase control by the Rotman lens 2314a causes the signals from the transmit antenna array 2318a to be emitted as beams to particular sub-sector(s) and/or specific endpoint node(s) 104. The high frequency signals are amplified by the amplifier system 2722 prior to transmission. The transmit antenna arrays 2318b, 1820a, and 1820b (described with respect to FIGS. 18 and 23) are implemented in the same manner as transmit antenna array 2318a.

The transmit antenna arrays yield a steerable beam in the azimuth direction. That is, the beam can be steered by rotation around the z-axis and in the x-y plane. This is achieved by controlling the phase of the signal emitted from each of the eight vertically extending (extending in the direction of the z-axis) columns of slots. On the other hand, the beam is pancaked in the z-axis or elevation direction. This is achieved by setting the phase of the signal emitted from the rows of slots.

In the illustrated embodiments, the receive and transmit antenna arrays are slotted waveguide antenna arrays, where the antenna slots 2380, 2860 are half wavelength long openings across the waveguide channel to create horizontally polarized electromagnetic waves.

While the antenna slots 2830, 2860 associated with the receive and transmit antenna arrays are depicted as 8×8 arrays, other size arrays can be used depending on the link budget requirements. Different sizes of the same configuration like 8×8, 8×10, 8×12, 8×16, 8×18 can be used, such that the number of columns is often 8, but the number of rows varies. As the number of rows increase, more gain and directive radiation pattern is achieved.

Figure 29:
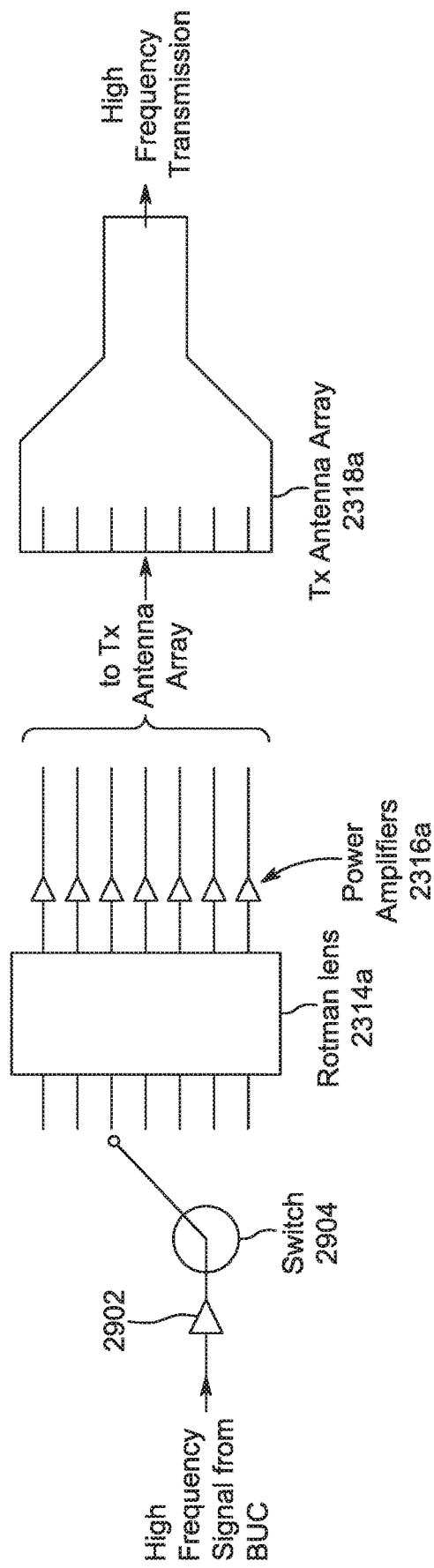
FIG. 29 is a schematic diagram for high frequency transmission at a transmit antenna array according to a different embodiment.

FIG. 29 illustrates a schematic diagram for high frequency transmission at a transmit antenna array (e.g. antenna array 2318a), according to one a different embodiment. In some implementations, a high frequency signal (after up-conversion at a block-up converter) amplified at a pre-amplifier 2902 and provided to a switch 2904. The switch 2904 can be connected to any of the eight input ports of a Rotman lens 2314a. By varying the phases of the signals propagating through the Rotmans lens 2314a, the direction of the overall signal output can be controlled (as determined by the constructive and destructive interferences of the signals). Thus, a signal can be transmitted by a transmit antenna array 2318a of the phased antenna array system 103 and directed to particular sub-sector(s) and/or specific endpoint node(s) 104.

Power amplifiers 2316a are provided at each output port of the Rotman lens 2314a for amplifying the signals. Although it is possible to have the power amplifiers at the input ports of the Rotman lens 2314a, the configuration of the power amplifiers at the lens output ports results in lower loss compared to the other configuration (i.e., power amplifiers at lens inputs). Because these eight power amplifiers are meant to be used as a matched-set group, they are to be factory aligned to be equivalent to each other with respect to insertion gain (dBS21) and insertion phase (angS21).

Electronic steering of a high frequency signal is performed by the Rotman lens 2314a, which couples the high frequency signal from any one of the eight Rotman lens inputs to the corresponding transmitting antenna array.

While this invention has been particularly shown and described with references to preferred embodiments thereof, it will be understood by those skilled in the art that various changes in form and details may be made therein without departing from the scope of the invention encompassed by the appended claims.

What is claimed is:

1. An aggregation node for a wireless access system, the node comprising:
    two transmit phased array antennas and two receive phased array antennas for transmitting high frequency signals with a horizontal polarization and a vertical polarization, respectively, to and receiving high frequency signals with a horizontal polarization and a vertical polarization, respectively, from subscriber nodes;
    Rotman lenses coupled to each transmit phased array antenna and each receive phased array antenna via a set of feedlines;
    amplifiers for amplifying the feeds on the feedlines between the transmit phased array antennas and the Rotman lenses; and
    WiFi chipsets for providing WiFi signals to and receiving WiFi signals from the Rotman lenses via upconverters and downconverters, wherein the upconverters upconvert the WiFi signals provided by the WiFi chipsets to the high frequency signals in a frequency range of 10 GHz to 300 GHz for transmission by the at least one transmit phased array antenna and the downconverters downconvert the high frequency signals received by the at least one receive phased array antenna in the frequency range of 10 GHz to 300 GHz to the WiFi signals received by the WiFi chipset.

2. The aggregation node of claim 1, wherein the Rotman lenses control phases of signals to be fed to the amplifiers and then to the transmit phased array antennas to direct the high frequency signals to different portions of an area of coverage.

3. The aggregation node of claim 1, wherein the Rotman lenses control phases of signals received from the receive phased array antennas to direct high frequency signals received from different portions of an area of coverage to different output ports of the Rotman lenses.

4. The aggregation node of claim 1, wherein the Rotman lenses vary phases of signals to steer the signals towards one or more sectors in the area of coverage.

5. The aggregation node of claim 1, wherein the amplifiers comprise power amplifiers provided at ports of the Rotman lenses.

6. The aggregation node of claim 5, wherein the power amplifiers are phase matched with respect to each other.

7. The aggregation node of claim 1, further comprising a global positioning system antenna that receives a global positioning system signal that is used to generate a local oscillator signal that is used by the upconverters to upconvert the WiFi signals.

8. A communication method for an aggregation node and subscriber nodes in a wireless access system, the method comprising:
   generating high frequency signals for different subscriber nodes by upconverting WiFi signals from WiFi chipsets with upconverters that upconvert the WiFi signals from the WiFi chipsets to the high frequency signals in a frequency range of 10 GHz to 300 GHz;
   feeding the high frequency signals into a transmit Rotman lens;
   amplifying feeds at the output ports of the transmit Rotman lens; and
   beaming the high frequency signals to different subscriber nodes within an area of coverage with two transmit phased array antennas for transmitting high frequency signals with a horizontal polarization and a vertical polarization, respectively; and
   receiving high frequency signals from the different subscriber nodes with two receive phased array antennas for receiving the high frequency signals with a horizontal polarization and a vertical polarization, respectively.

9. The method of claim 8, further comprising:
   amplifying the high frequency signals received from the different subscriber nodes;
   feeding the high frequency signals into receive Rotman lenses; and
   decoding the high frequency signals provided at the output ports of the receive Rotman lenses by downconverting the high frequency signals with downconverters that downconvert the high frequency signals in the frequency range of 10 GHz to 300 GHz to down-converted signals and providing the down-converted signals to the WiFi chipsets.

10. The method of claim 8, further comprising the Rotman lenses controlling the phases of signals to direct the high frequency signals to different portions of the area of coverage.

11. The method of claim 8, further comprising receiving a global positioning system signal that is used to generate a local oscillator signal that is used by the upconverters to upconvert the WiFi signals.

* * * * *